(12) United States Patent
Tokutani et al.

(10) Patent No.: US 8,413,211 B2
(45) Date of Patent: Apr. 2, 2013

(54) ACCESS CONTROL POLICY COMPLIANCE CHECK PROCESS

(75) Inventors: Takashi Tokutani, Kawasaki (JP);
Takahisa Hatakeyama, Kawasaki (JP);
Takayuki Hasebe, Kawasaki (JP);
Takeaki Terada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 12/361,269

(22) Filed: Jan. 28, 2009

(65) Prior Publication Data

US 2009/0300711 A1    Dec. 3, 2009

(30) Foreign Application Priority Data

May 30, 2008    (JP) ................................ 2008-142646

(51) Int. Cl.
*G06F 17/30* (2006.01)
(52) U.S. Cl. .......................................... 726/2; 713/156
(58) Field of Classification Search .................. 726/1, 2, 726/3, 4, 5, 11, 25, 3.4, 27, 26, 29, 30, 32; 713/156; 380/30, 277, 258
See application file for complete search history.

(56) References Cited

U.S. PATENT DOCUMENTS

| 7,010,691 | B2 * | 3/2006 | Wheeler et al. ............... 713/170 |
|---|---|---|---|
| 7,143,284 | B2 * | 11/2006 | Wheeler et al. ............... 713/155 |
| 7,177,839 | B1 * | 2/2007 | Claxton et al. ................... 705/44 |
| 8,256,004 | B1 * | 8/2012 | Hill et al. .......................... 726/25 |
| 2003/0050718 | A1 * | 3/2003 | Tracy et al. ....................... 700/91 |
| 2003/0126437 | A1 * | 7/2003 | Wheeler et al. ............... 713/168 |
| 2003/0131235 | A1 * | 7/2003 | Wheeler et al. ............... 713/168 |
| 2004/0139315 | A1 * | 7/2004 | Tokutani et al. .............. 713/156 |
| 2004/0193546 | A1 * | 9/2004 | Tokutani et al. ................. 705/59 |
| 2005/0185792 | A1 * | 8/2005 | Tokutani et al. ................. 380/30 |
| 2005/0193430 | A1 * | 9/2005 | Cohen et al. ..................... 726/25 |
| 2005/0203881 | A1 | 9/2005 | Sakamoto et al. |
| 2006/0005254 | A1 * | 1/2006 | Ross ............................... 726/27 |
| 2006/0129587 | A1 * | 6/2006 | Renfro et al. ................. 707/102 |
| 2006/0253709 | A1 * | 11/2006 | Cheng et al. ................... 713/182 |
| 2007/0143827 | A1 | 6/2007 | Nicodemus et al. |
| 2007/0143851 | A1 * | 6/2007 | Nicodemus et al. ............ 726/25 |
| 2008/0091978 | A1 | 4/2008 | Brodsky et al. |
| 2008/0189788 | A1 * | 8/2008 | Bahl ............................... 726/25 |
| 2008/0263654 | A1 * | 10/2008 | Bahl et al. ....................... 726/15 |
| 2008/0263662 | A1 * | 10/2008 | Cheng et al. .................... 726/22 |
| 2008/0288330 | A1 * | 11/2008 | Hildebrand et al. ........... 705/10 |

(Continued)

FOREIGN PATENT DOCUMENTS

| JP | A 2007-41881 | 2/2007 |
|---|---|---|
| JP | A 2007-72581 | 3/2007 |

OTHER PUBLICATIONS

Sandhu et al.; "Access Control: Principles and Practice;" IEEE Comm. Magazine, IEEE Service Center; pp. 40-48; Sep. 1, 1994.

(Continued)

*Primary Examiner* — Eleni Shiferaw
*Assistant Examiner* — Abu Sholeman
(74) *Attorney, Agent, or Firm* — Greer, Burns & Crain, Ltd.

(57) ABSTRACT

A storage medium on which is recorded a program for causing an information processing device. The program executes, an access right management information obtainment process for obtaining access right management information, a violation detection process for obtaining a policy from a policy storing unit for storing the policy set for the resource or the access to the resource, for checking whether or not the access right management information complies with the policy, and for detecting access right management information, a policy compliance level calculation process for calculating a risk score in accordance with a degree of risk of the violation, and for calculating a level of compliance with the policy.

10 Claims, 53 Drawing Sheets

U.S. PATENT DOCUMENTS

2009/0172773 A1* 7/2009 Moore .............................. 726/1
2011/0131658 A1* 6/2011 Bahl .............................. 726/25
2011/0167474 A1* 7/2011 Sinha et al. ....................... 726/1

OTHER PUBLICATIONS

Notice of Rejection Ground mailed May 22, 2012 for corresponding Japanese Patent Application No, 2008-142646 (translation enclosed).

"Someone is Aiming at You! 24-Hour Security, I", *Windows NT World*, vol. 4, Japan, IDG Communication, Inc., Apr. 1, 1999, vol. 4, pp. 166-169 (partial translation).

"Get Virus-Resistant and Intrusion-Resistant Network! How to Create 'Safe' Intracompany LAN from Scratch", *Network Magazine*, vol. 10, No. 4, Japan, ASCII Inc., Apr. 1, 2005, vol. 10, pp. 150-153 (partial translation).

\* cited by examiner

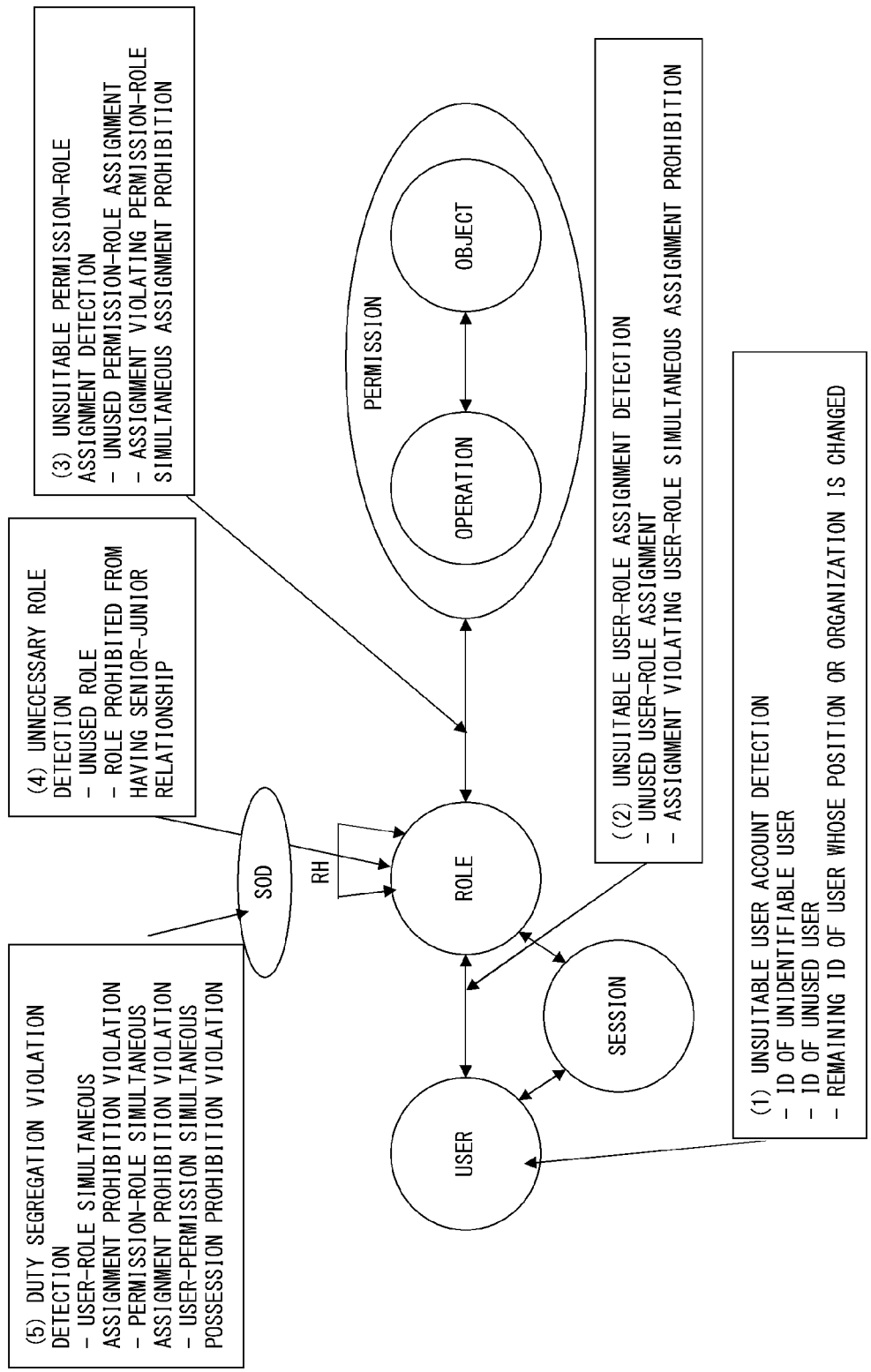
F I G. 2

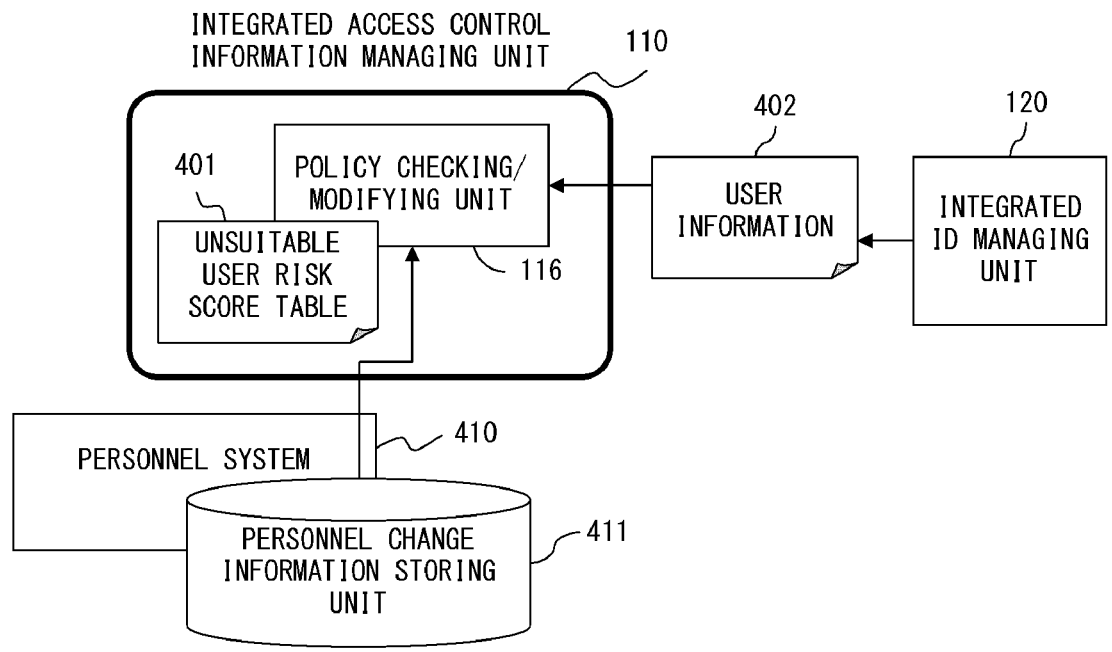
F I G. 4

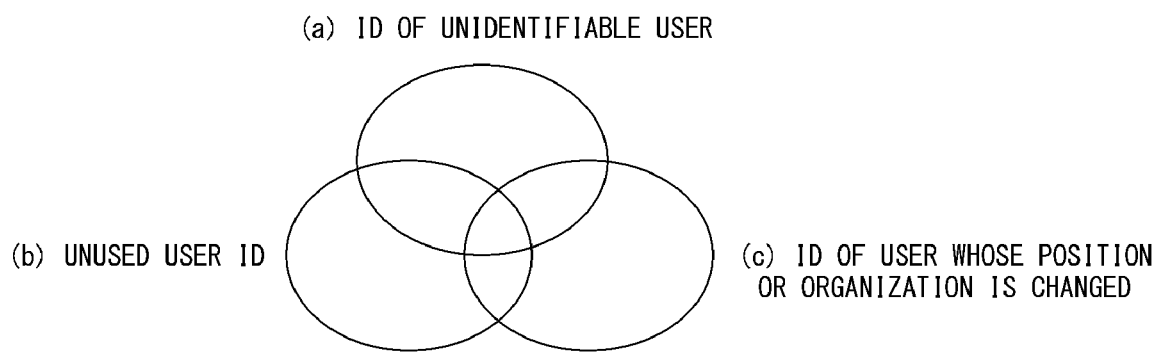
F I G. 5

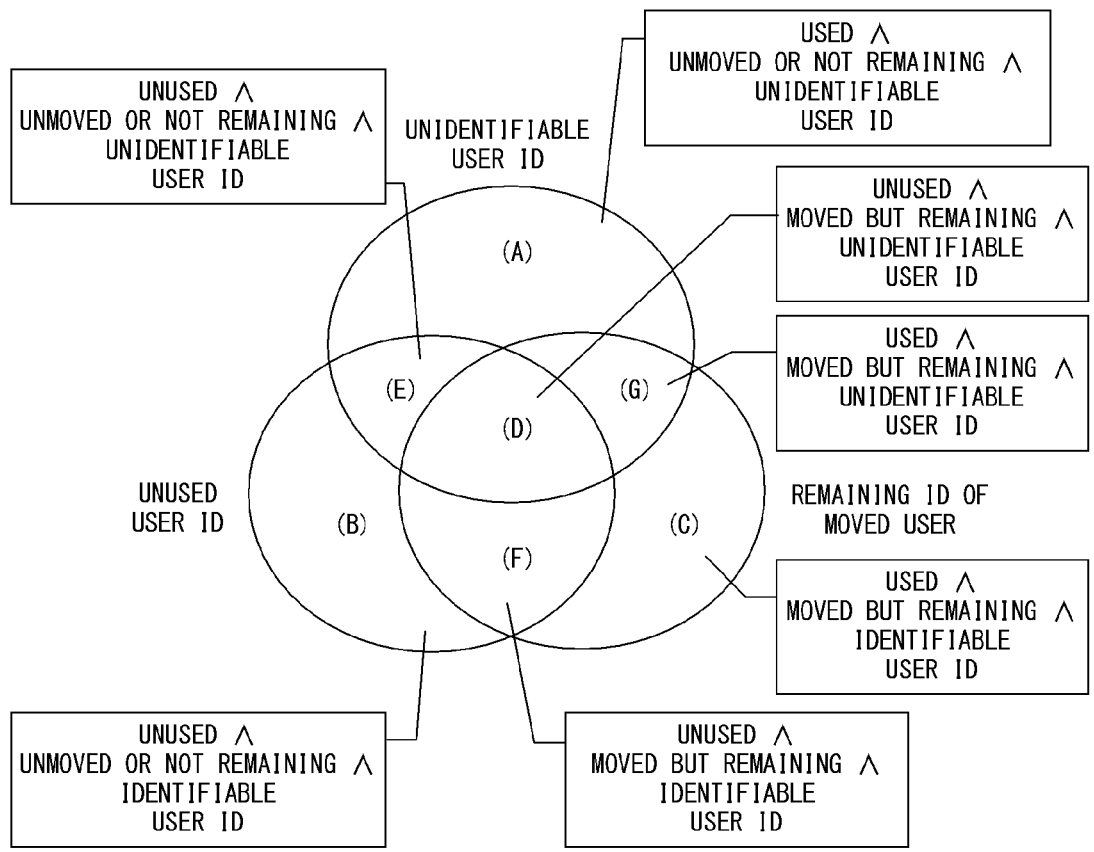
F I G. 7

| xxx SYSTEM | USER MANAGEMENT ERROR RISK EVALUATION | | RISK EVALUATION VALUE : | 53 |
|---|---|---|---|---|

DETECTION RESULTS OF [MARCH] , [2008]

NUMBER OF VIOLATIONS : [23]    2008/3/18

SORT BY : [USER NAME ▶]

| No | USER ID | VIOLATION DESCRIPTION | RISK SCORE |
|---|---|---|---|
| 1 | ando1 | · UNUSED FOR SIX MONTHS OR MORE<br>· ID REMAINS ALTHOUGH POSITION OR ORGANIZATION OF USER IS CHANGED | 2 |
| 2 | aki.sato | · ID REMAINS ALTHOUGH POSITION OR ORGANIZATION OF USER IS CHANGED<br>· USED | 3 |
| 3 | asai | · UNUSED FOR SIX MONTHS OR MORE<br>· UNIDENTIFIABLE USER | 2 |
| 4 | date | · UNUSED FOR SIX MONTHS OR MORE<br>· UNIDENTIFIABLE USER | 2 |

[OUTPUT] [BACK] [OK]

F I G. 8

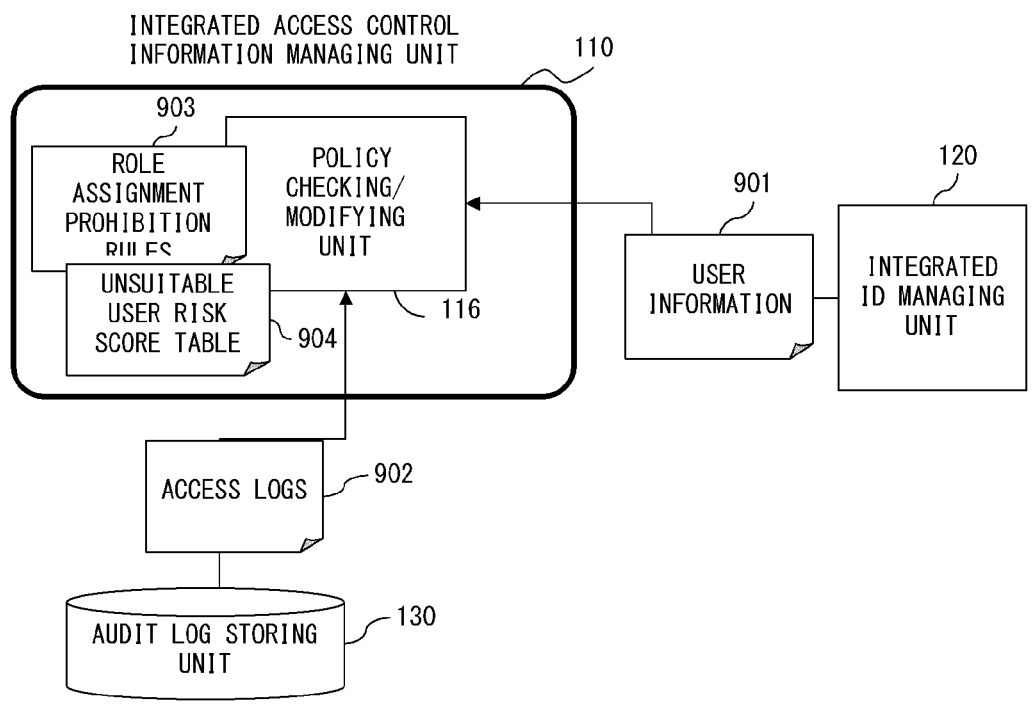
F I G. 9

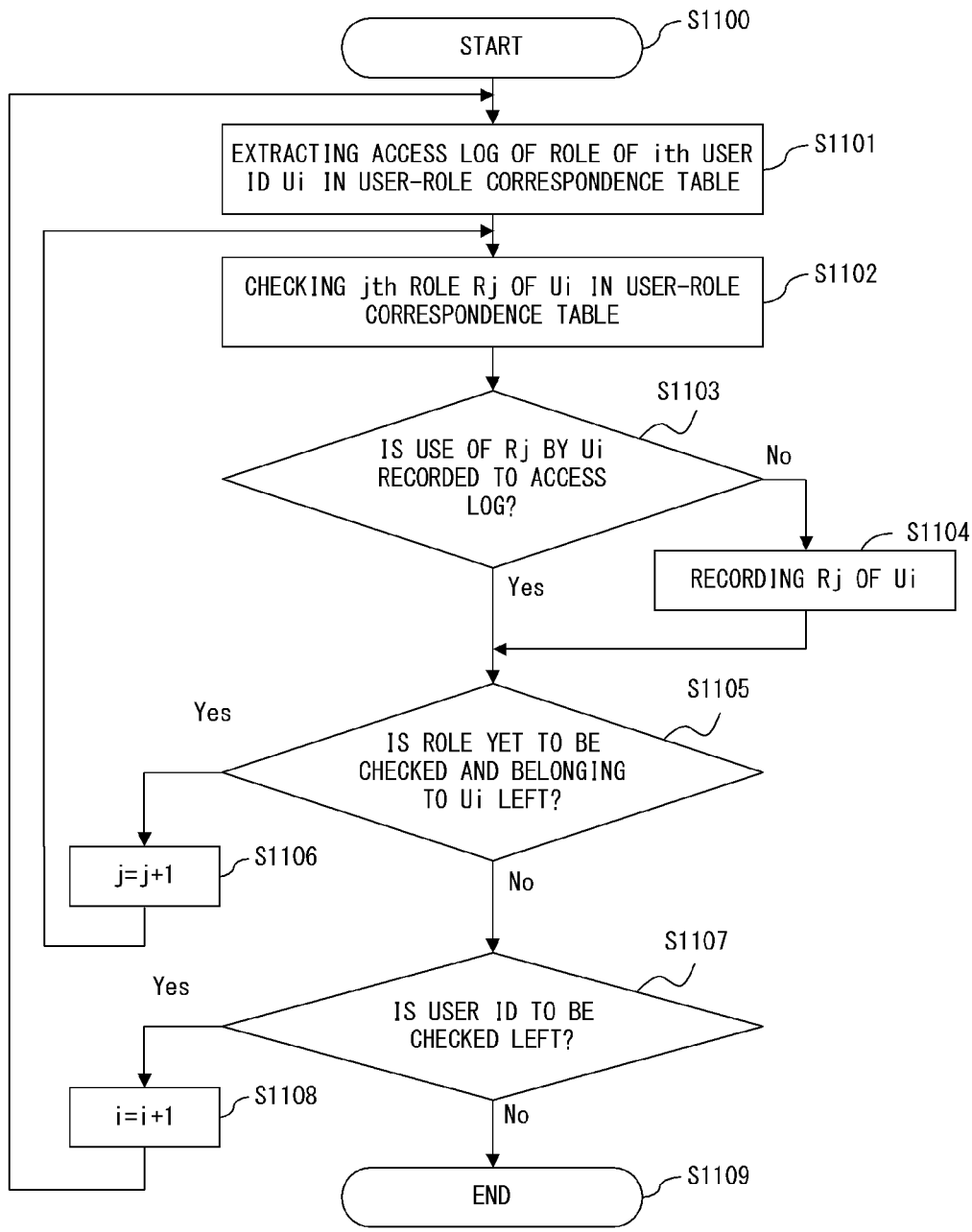
F I G. 1 1

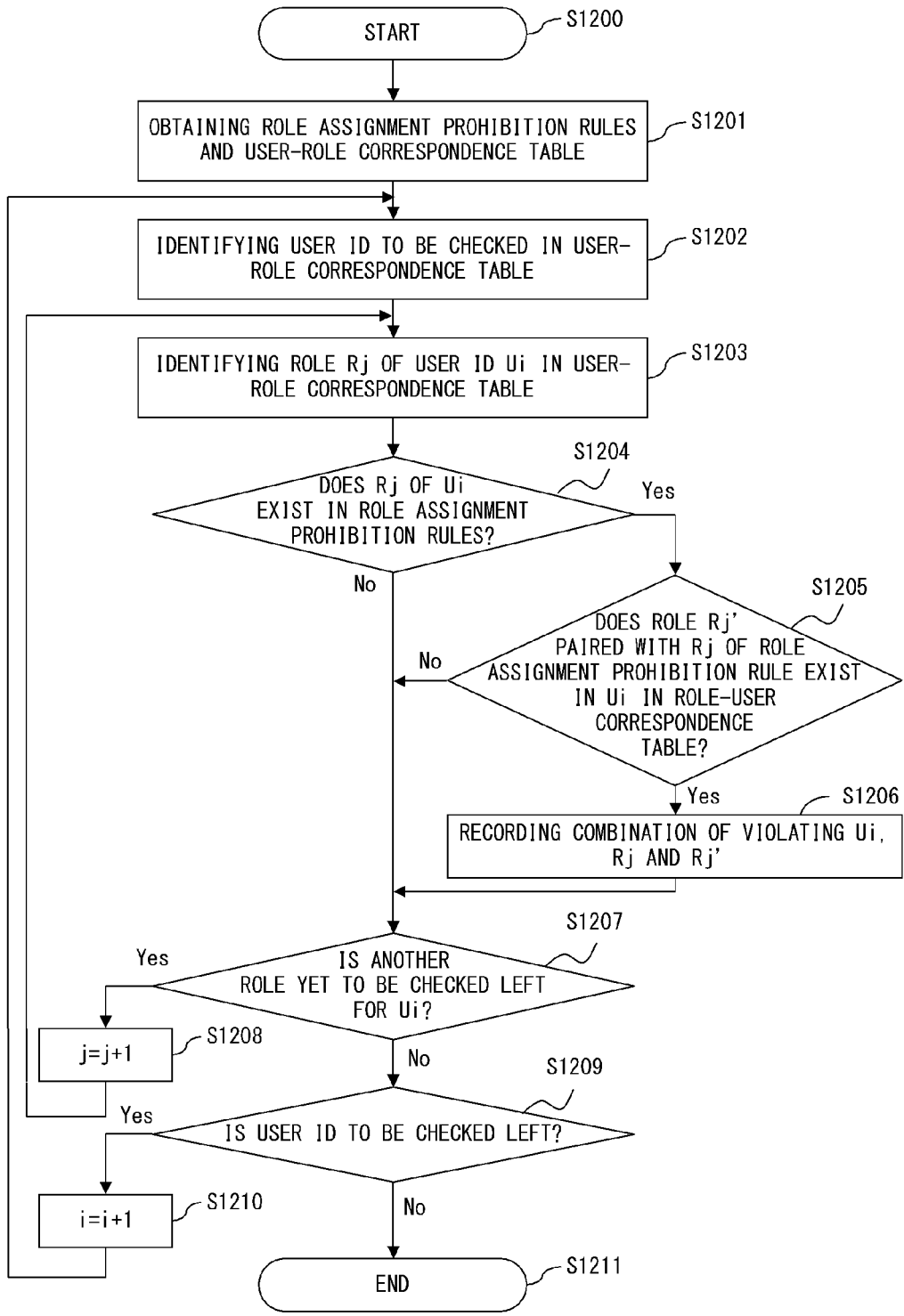
F I G. 1 2

FIG. 13 xxx SYSTEM / USER MANAGEMENT ERROR RISK EVALUATION

DETECTION RESULTS OF [ MARCH ] , [ 2008 ]    RISK EVALUATION VALUE : [ 39 ]

NUMBER OF VIOLATIONS : [ 17 ]    2008/3/18

SORT BY : [ USER NAME ▶ ]

| no | USER NAME | SIMULTANEOUS ASSIGNMENT PROHIBITION ROLE SETTINGS | UNUSED ROLE | VIOLATION DESCRIPTION | RISK SCORE |
|---|---|---|---|---|---|
| 1 | ando1 | SysXDev, SysYDev | SysXDev, SysYDev | · VIOLATING ASSIGNMENT. DOES NOT USE ROLES | 1 |
| 2 | ando1 | — | Admin | · NON-VIOLATING SETTING. DOES NOT USE ROLES | 1 |
| 3 | aki.sato | Admin, SysXDev | — | · VIOLATING ASSIGNMENT. USES BOTH ROLES | 3 |
| 4 | date | — | SysYDev | · NON-VIOLATING SETTING. DOES NOT USE ROLES | 1 |
| 5 | endo | SysXDev, SysYDev | SysXDev | · VIOLATING ASSIGNMENT. USES EITHER OF ROLES | 2 |

[ OUTPUT ]    [ BACK ]    [ OK ]

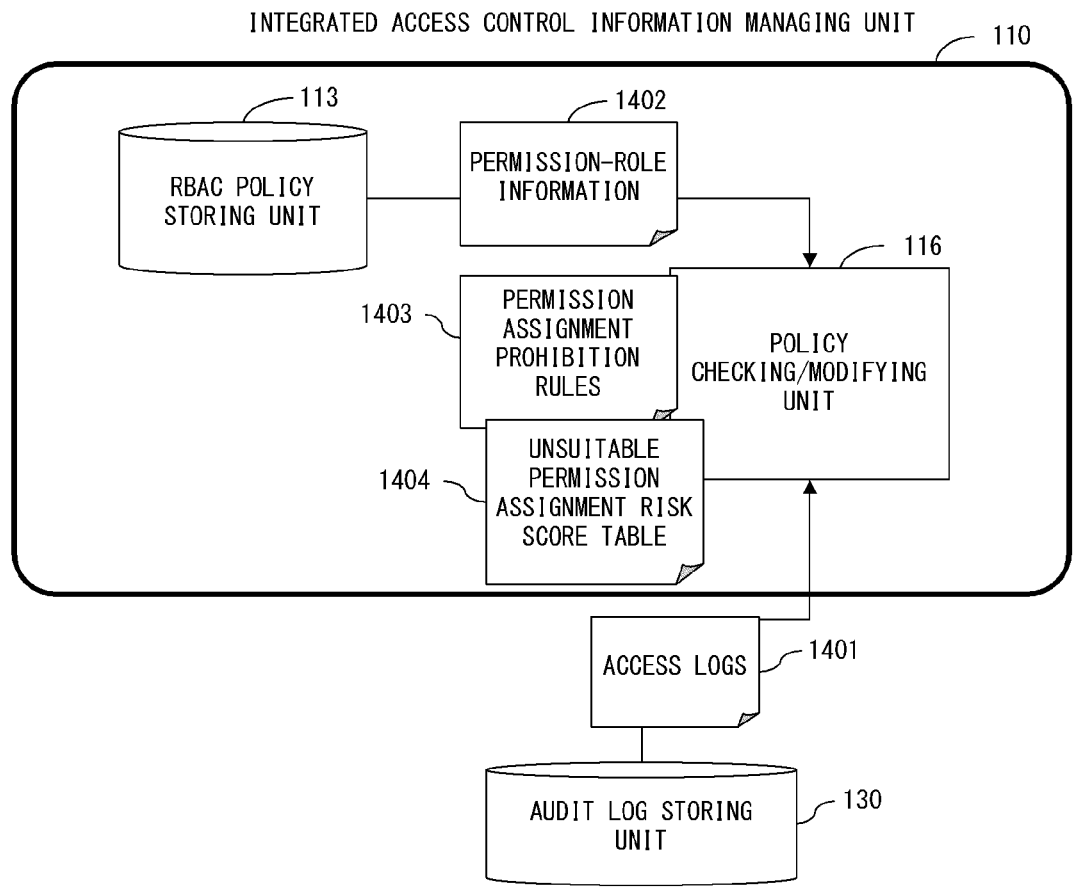
F I G. 1 4

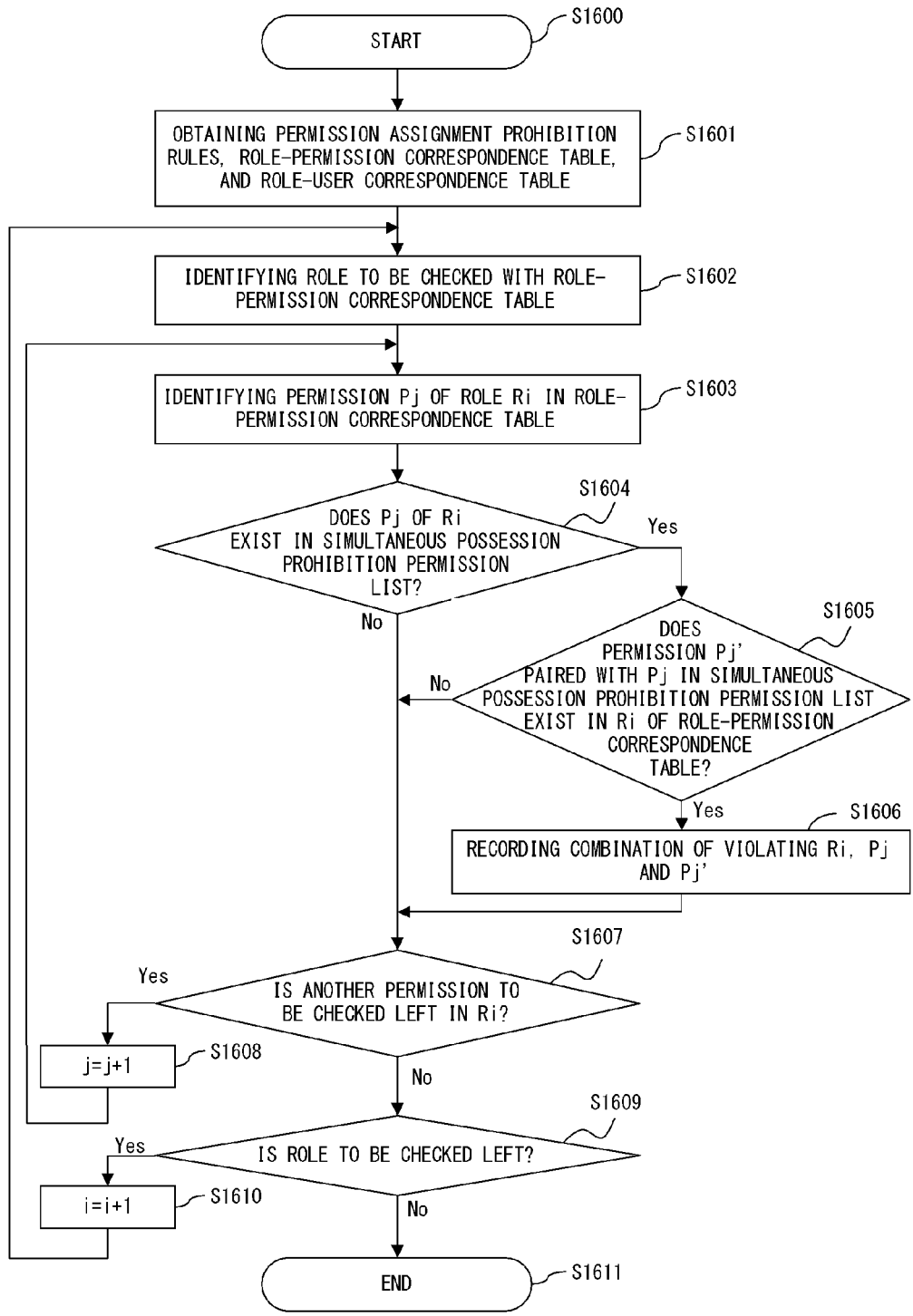
F I G. 16 xxx SYSTEM    ROLE-PERMISSION MANAGEMENT ERROR RISK EVALUATION    RISK EVALUATION: 7

DETECTION RESULTS OF   MARCH , 2008                                 2008/3/18

NUMBER OF VIOLATIONS: 4

SORT BY: ROLE NAME ▶

| no | ROLE NAME | SIMULTANEOUS ASSIGNMENT PROHIBITION PERMISSION SETTINGS | UNUSED PERMISSION | VIOLATION DESCRIPTION | RISK SCORE |
|---|---|---|---|---|---|
| 1 | ArchG | PermX, PermY | PermX | · VIOLATING ASSIGNMENT. USES ONLY ONE PERMISSION | 2 |
| 2 | SysXDev | — | PermI | · NON-VIOLATING SETTING. DOES NOT USE PERMISSION | 1 |
| 3 | SysYDev | PermX, PermY | — | · VIOLATING ASSIGNMENT. USES BOTH PERMISSIONS | 3 |
| 4 | SysZDev | — | PermK | · NON-VIOLATING SETTING. DOES NOT USE PERMISSION | 1 |

OUTPUT    BACK    OK

F I G. 17

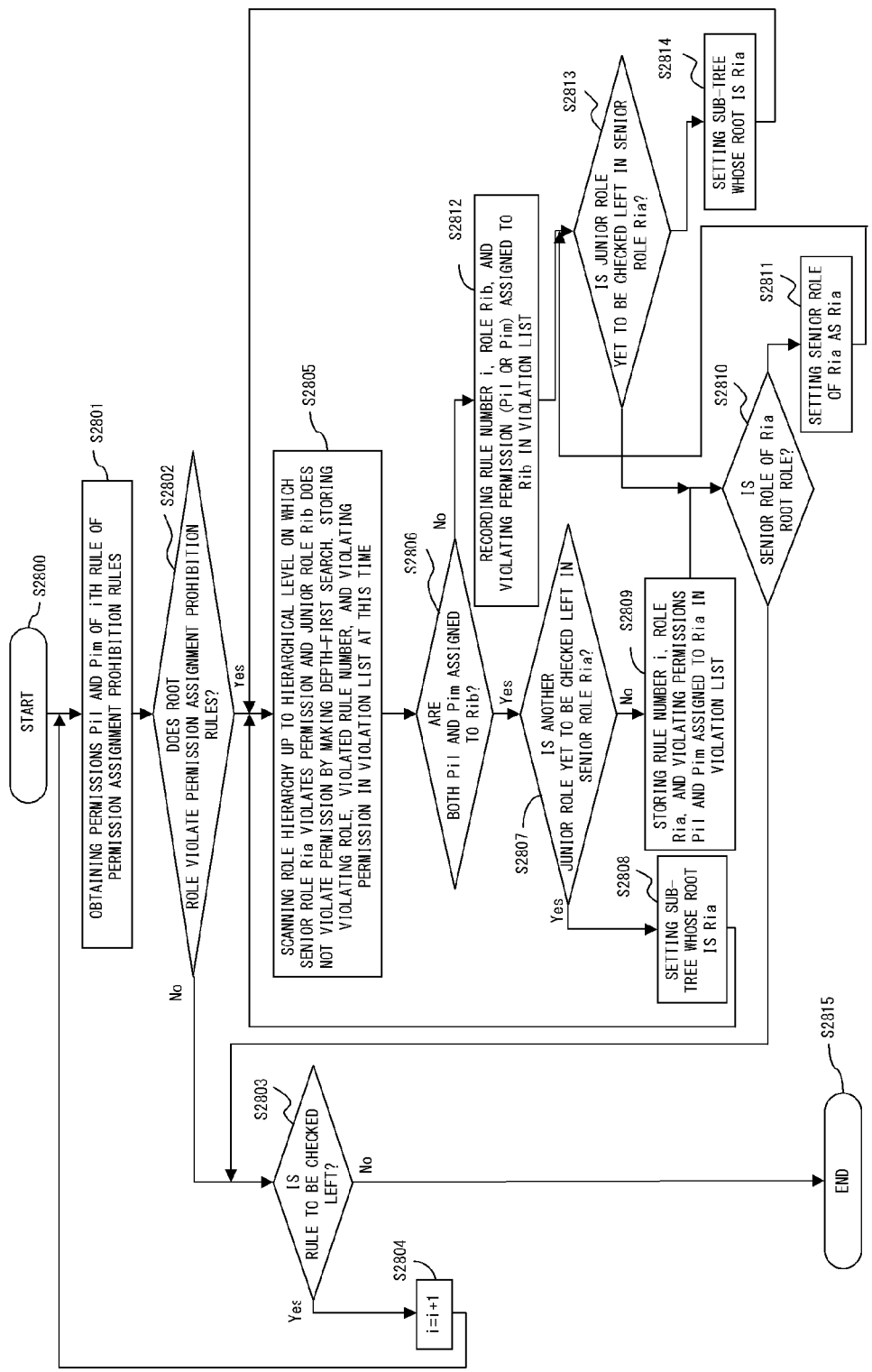
F I G. 2 8

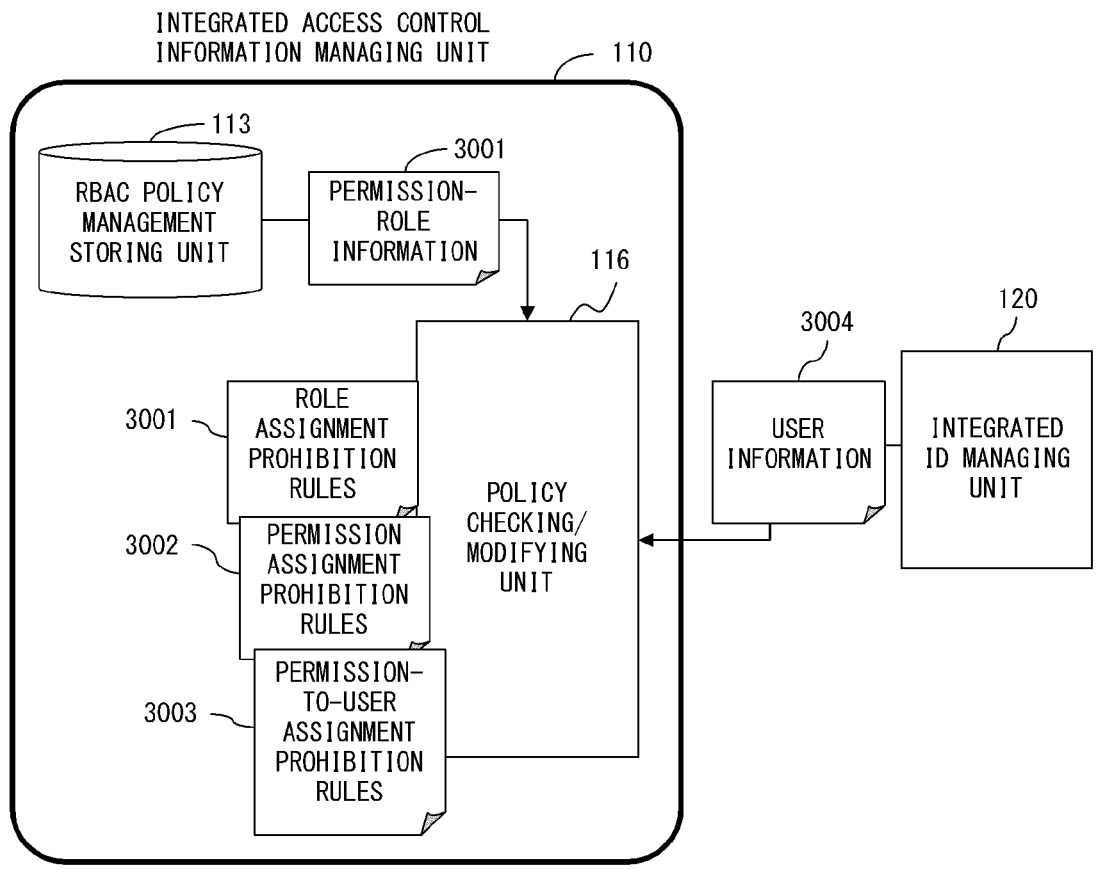
F I G. 30

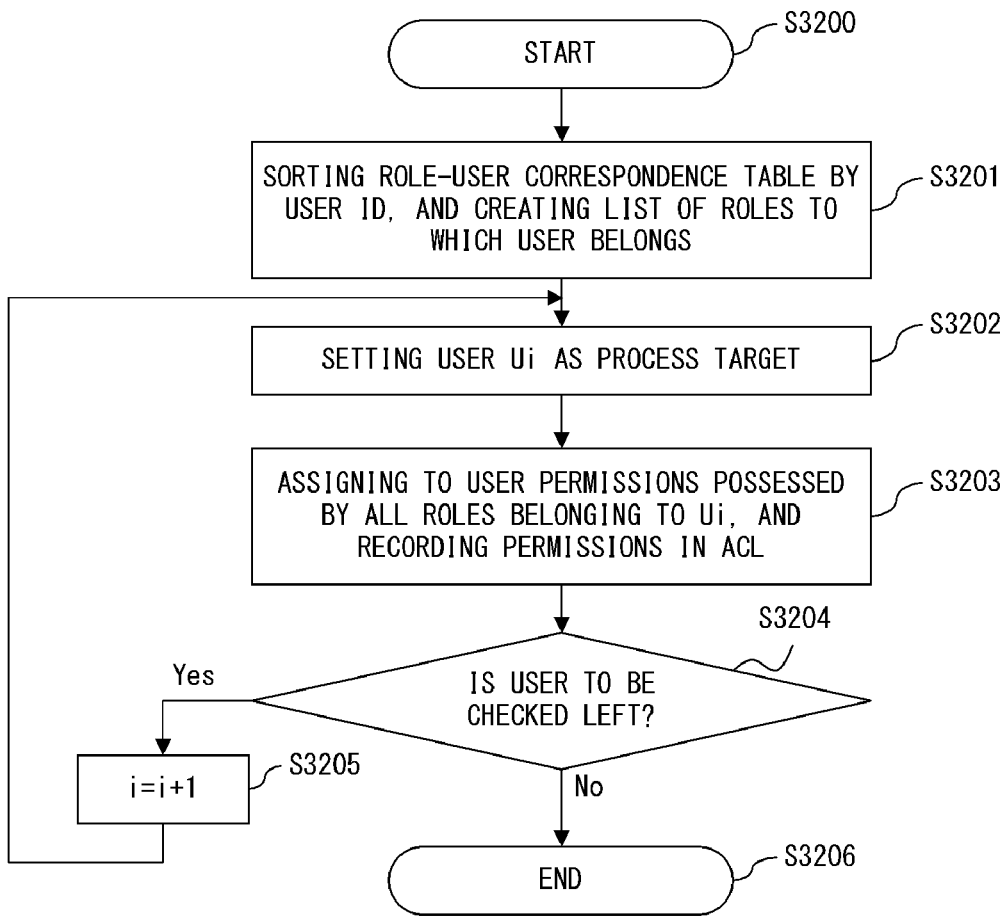
F I G. 3 2 xxx SYSTEM | DETECTION RESULTS OF | DUTY SEGREGATION VIOLATION RISK EVALUATION | RISK EVALUATION VALUE : 84

MARCH , 2008　2008/3/18

NUMBER OF VIOLATIONS : 28

SORT BY : RULE TYPE ▶

| no | VIOLATION RULE TYPE | VIOLATING USER | ASSIGNMENT PROHIBITION ROLES | VIOLATING ROLE | ASSIGNMENT PROHIBITION PERMISSIONS | VIOLATION DESCRIPTION | RISK SCORE |
|---|---|---|---|---|---|---|---|
| 1 | USER-ROLE ASSIGNMENT | ando1 | SysXDev, SysYDev | — | — | ・USER-ROLE ASSIGNMENT VIOLATES ROLE ASSIGNMENT PROHIBITION RULES | 3 |
| 2 | USER-ROLE ASSIGNMENT | aki.sato | Admin, SysXDev | — | — | ・USER-ROLE ASSIGNMENT VIOLATES SIMULTANEOUS ASSIGNMENT PROHIBITION | 3 |
| 3 | ROLE-PERMISSION ASSIGNMENT | — | — | ArchG | PermX, PermY | ・PERMISSIONS ARE SIMULTANEOUSLY ASSIGNED TO ROLE | 3 |
| 4 | ROLE-PERMISSION ASSIGNMEN | — | — | SysYDev | PermX, PermY | ・NON-VIOLATING SETTING. CAUSES VIOLATING SETTING | 3 |

OUTPUT　BACK　OK

F I G. 34

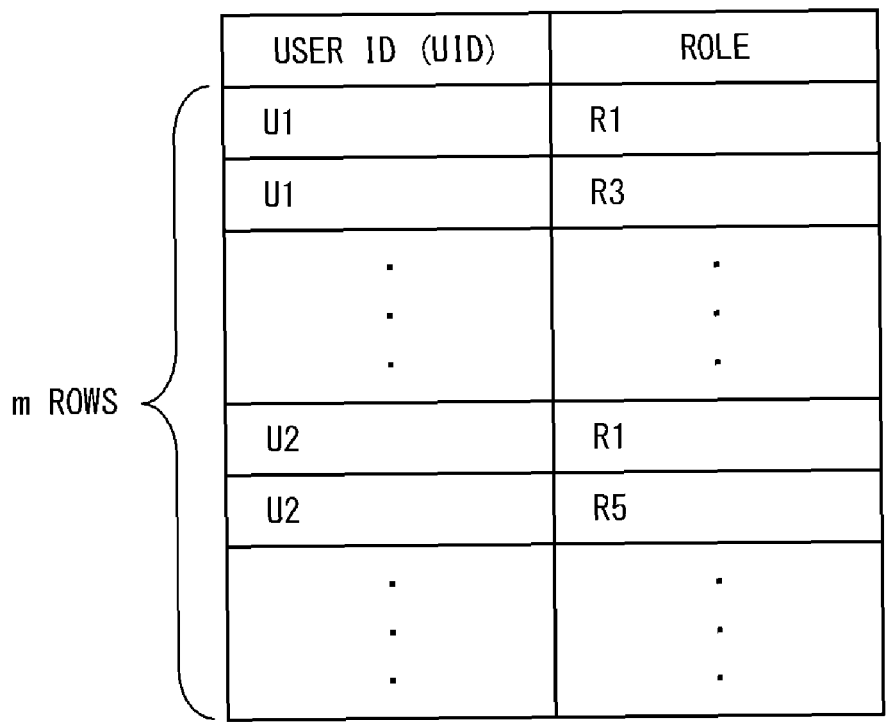
F I G. 3 5

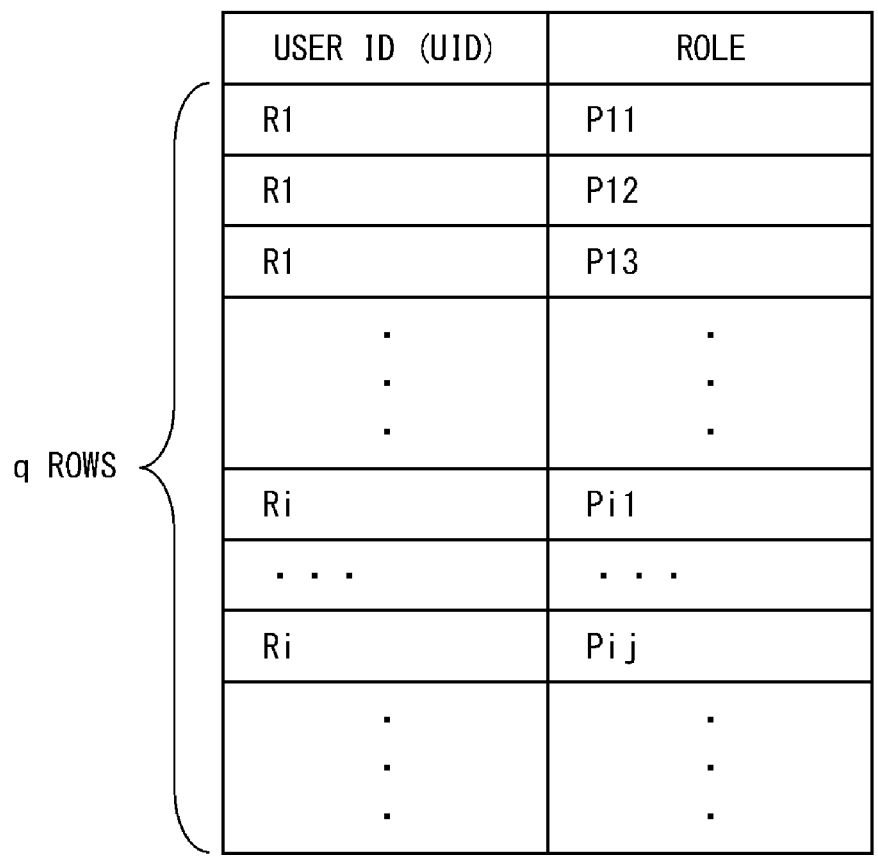
F I G. 36 xxx SYSTEM    RISK EVALUATION TOP SCREEN

2008/3/18

RISK SCORE THIS MONTH    255

| ENTRY | RISK SCORE | NUMBER OF ERROR SETTINGS | RISK SCORE RATIO | POSSIBLE CAUSE |
|---|---|---|---|---|
| USER MANAGEMENT ERROR RISK | 53 | 23 | 20.8 | DETAILS |
| ROLE MANAGEMENT ERROR RISK | 39 | 17 | 15.3 | DETAILS |
| PERMISSION MANAGEMENT ERROR RISK | 7 | 4 | 2.7 | DETAILS |
| ROLE MANAGEMENT ERROR RISK | 72 | 24 | 28.2 | DETAILS |
| DUTY SEGREGATION VIOLATION RISK | 84 | 28 | 32.9 | DETAILS |

MONTHLY TRANSITIONS DISPLAY

OUTPUT    BACK    OK

F I G. 3 8

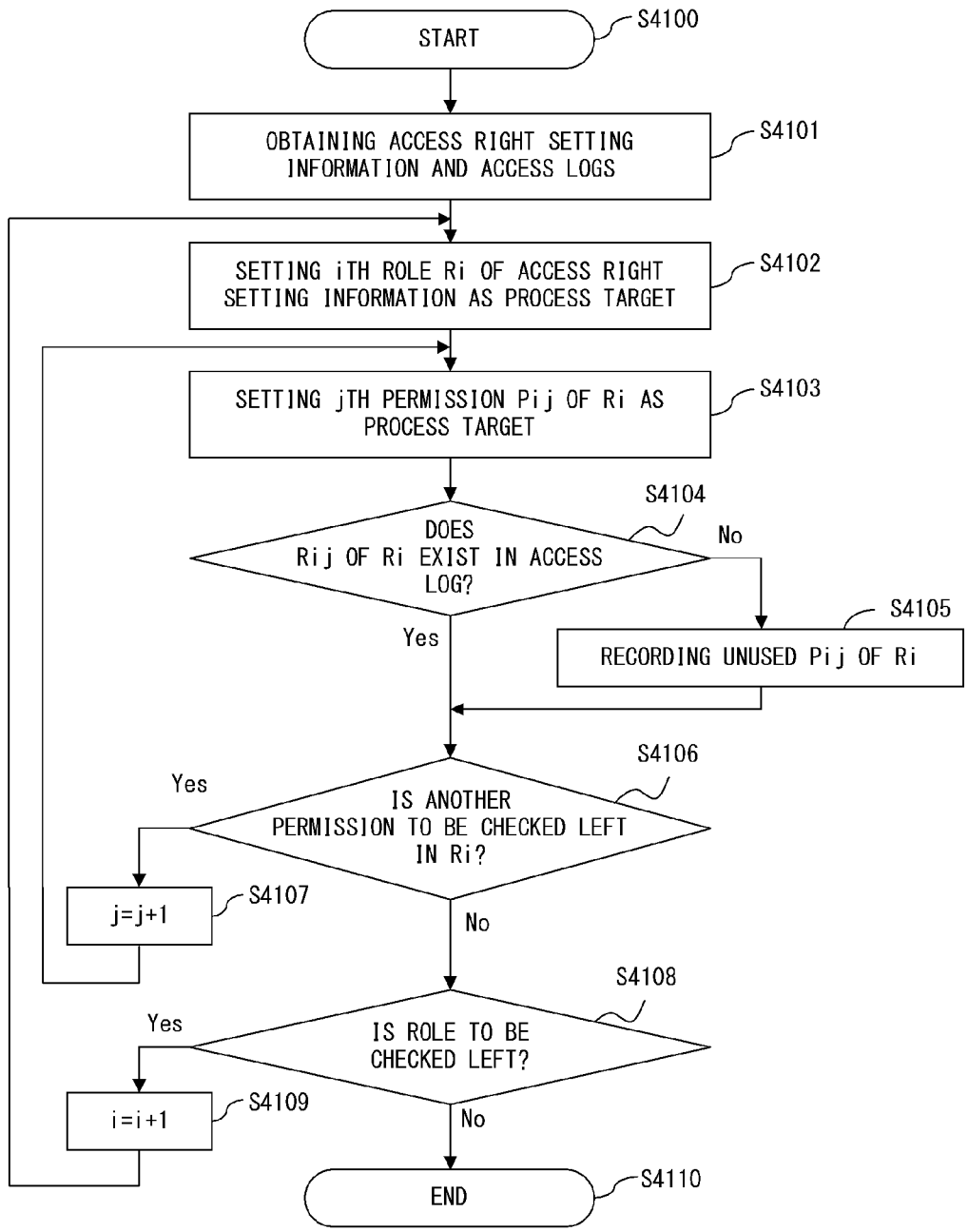
F I G. 4 1

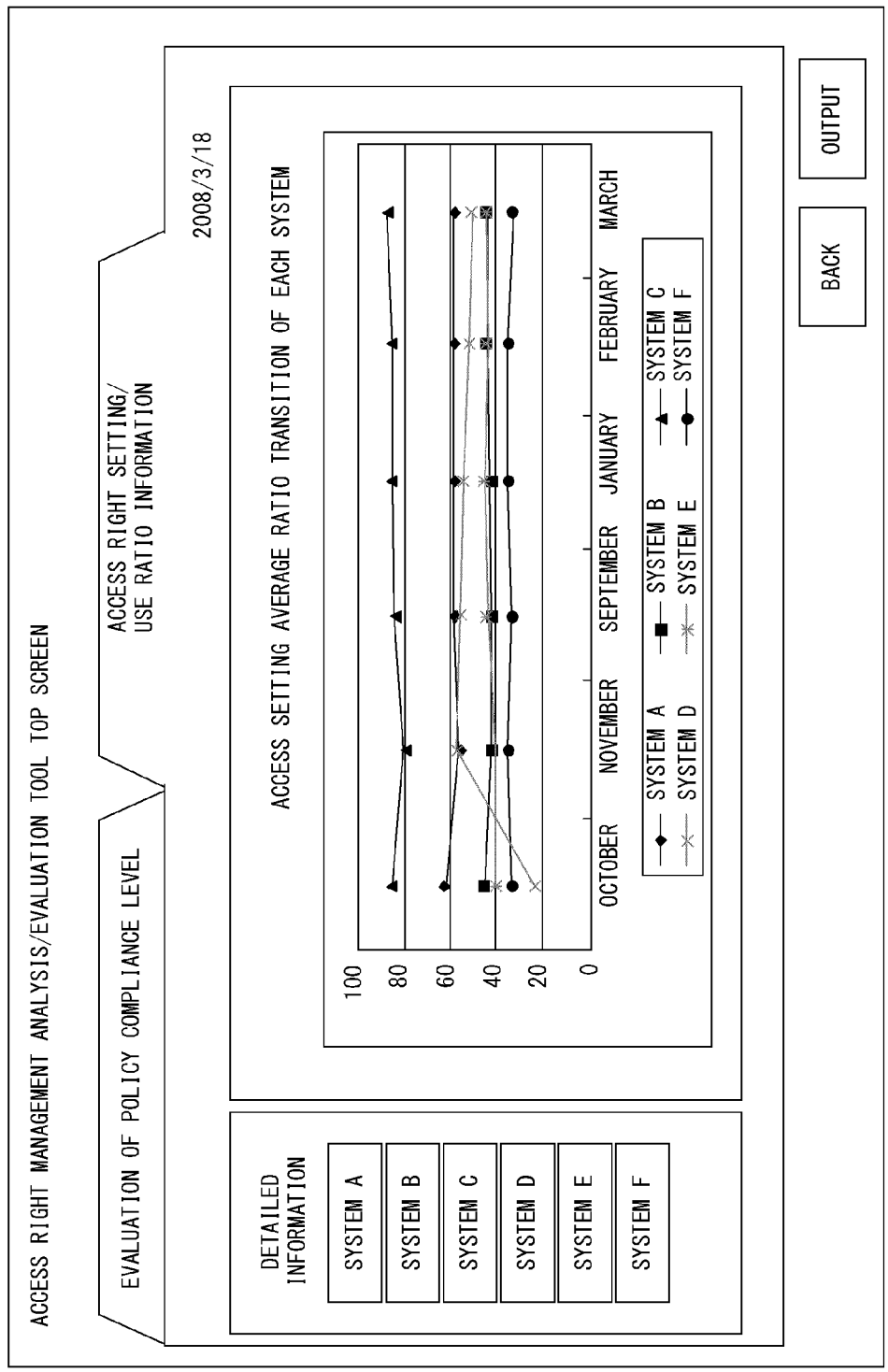
F I G. 4 5 xxx SYSTEM | ACCESS RIGHT SETTING/USE RATIO INFORMATION TOP SCREEN

2008/3/18

SUMMARY OF ACCESS RIGHT SETTINGS

| NUMBER OF ACCOUNTS | NUMBER OF ROLES | USE RATIO (%) |
|---|---|---|
| 1456 | 380 | 78 |

SORT BY: ORGANIZATION NAME ▶  RUN

FILTERING CONDITIONS: ROLE RATIO  15 ▲▼ % OR MORE  USE RATIO  40 ▲▼ % OR LESS

| ORGANIZATION | NUMBER OF ACCOUNTS | NUMBER OF ROLES | ROLE RATIO (%) | USE RATIO (%) | |
|---|---|---|---|---|---|
| DEPARTMENT A | 153 | 23 | 15.0 | 29.8 | DETAILS |
| DEPARTMENT C | 39 | 17 | 43.6 | 33.3 | DETAILS |
| DEPARTMENT E | 79 | 14 | 17.7 | 22.7 | DETAILS |
| DEPARTMENT H | 172 | 37 | 21.5 | 38.2 | DETAILS |
| DEPARTMENT K | 84 | 28 | 33.3 | 17.9 | DETAILS |

◀ ≡ ▶

OUTPUT  BACK  OK

F I G. 4 6

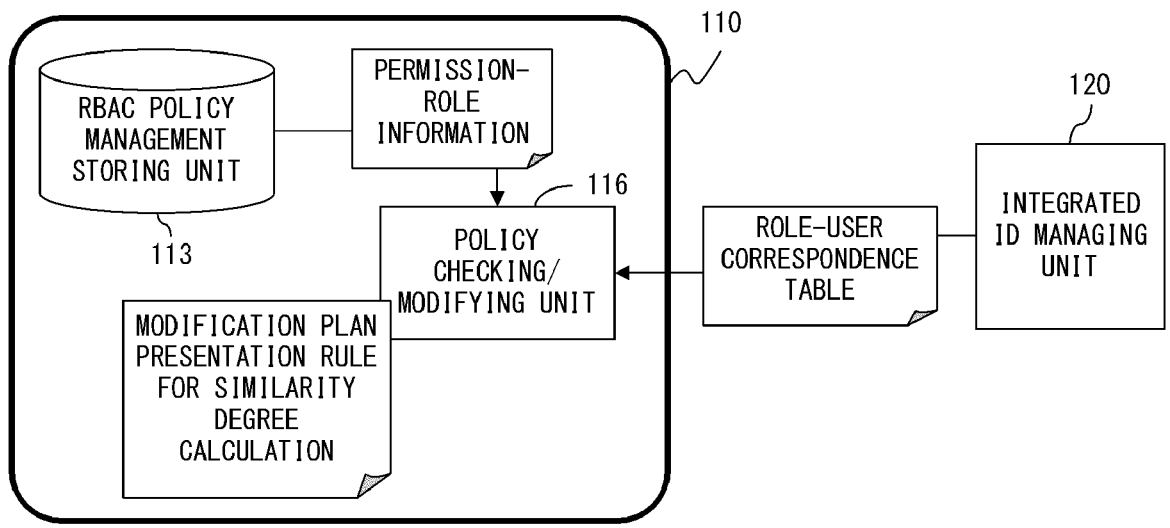
F I G. 4 7 xxx SYSTEM | DEPARTMENT A | DETAILS DISPLAY SCREEN

2008/3/18

SUMMARY OF ACCESS RIGHT SETTINGS

NUMBER OF ACCOUNTS: 153  NUMBER OF ROLES: 23  ROLE RATIO (%): 15.0  USE RATIO (%): 29.8

SORT BY: ROLE NAME ▶

FILTERING CONDITIONS: NUMBER OF USERS  45 ◀▶ OR LESS   USE RATIO  35 ◀▶ % OR LESS   RUN

| ROLE NAME | NUMBER OF USERS | NUMBER OF PERMISSIONS | USE RATIO | |
|---|---|---|---|---|
| RoleA | 43 | 23 | 20.8 | DETAILS |
| RoleD | 39 | 17 | 15.3 | DETAILS |
| RoleE | 7 | 4 | 2.7 | DETAILS |
| RoleJ | 22 | 24 | 28.2 | DETAILS |
| RoleK | 34 | 28 | 32.9 | DETAILS |

◀ ≡ ▶

ROLE SIMILARITY DEGREE CALCULATION

OUTPUT    BACK    OK

F I G. 4 9

| xxx SYSTEM | DEPARTMENT A | ROLE SIMILARITY DEGREE CALCULATION RESULTS SCREEN | | | | | | | 2008/3/18 |
|---|---|---|---|---|---|---|---|---|---|

TARGET ROLES: 10 ROLES

CONDITIONS: NUMBER OF USERS  45  OR LESS   USE RATIO  35  % OR LESS

| ROLE NAME | RoleA | | RoleD | | RoleE | | RoleJ | |
|---|---|---|---|---|---|---|---|---|
| | US$_{mc}$ | PS$_{mc}$ | US$_{mc}$ | PS$_{mc}$ | US$_{mc}$ | PS$_{mc}$ | US$_{mc}$ | PS$_{mc}$ |
| RoleA | – | – | – | – | – | – | – | – |
| RoleD | 0.8 | 0.2 | – | – | – | – | – | – |
| RoleE | 0.7 | 0.9 | 0.8 | 0.2 | – | – | – | – |
| RoleJ | 0.3 | 0.5 | 1.0 | 0.2 | 0.7 | 0.8 | – | – |

MODIFICATION PLAN DISPLAY

OUTPUT    BACK    OK

F I G. 5 0

| xxx SYSTEM | DEPARTMENT A | ROLE MODIFICATION PLAN PRESENTATION SCREEN |
|---|---|---|

2008/3/18

MODIFICATION TARGET ROLE CONDITIONS : USER SIMILARITY DEGREE ($US_{ms}$) ◄ 45 ► USERS OR LESS
OR
PERMISSION SIMILARITY DEGREE ($US_{ms}$) ◄ 35 ► OR LESS    RUN

| TARGET ROLES | | MODIFICATION PLAN | | SIMILARITY DEGREE | |
|---|---|---|---|---|---|
| | | | | $US_{mc}$ | $PS_{mc}$ |
| RoleA | RoleD | DELETING USER PRESENTED ON DETAILS SCREEN, OR ADDING THE USER TO THE OTHER ROLE, AND MERGING ROLES | DETAILS | 0.8 | 0.2 |
| RoleA | RoleE | DELETING PERMISSION PRESENTED ON DETAILS SCREEN, OR ADDING THE PERMISSION TO THE OTHER ROLE, AND MERGING ROLES | DETAILS | 0.7 | 0.9 |
| RoleD | RoleE | DELETING USER PRESENTED ON DETAILS SCREEN, OR ADDING THE USER TO THE OTHER ROLE, AND MERGING ROLES | DETAILS | 0.8 | 0.2 |
| RoleD | RoleJ | MERGING TWO ROLES AFTER MERGING PERMISSIONS | DETAILS | 1.0 | 0.2 |
| RoleE | RoleJ | DELETING PERMISSION PRESENTED ON DETAILS SCREEN, OR ADDING THE PERMISSION TO THE OTHER ROLE, AND MERGING ROLES | DETAILS | 0.7 | 0.8 |

OUTPUT    BACK    OK

F I G. 5 1 xxx SYSTEM　　DEPARTMENT A

2008/3/18

ROLE MODIFICATION PLAN DETAILS SCREEN OF [ Role A ] AND [ Role D ]

MODIFICATION PLAN

ASSIGNING SAME USER TO ROLES BY MAKING MODIFICATIONS TO FOLLOWING USERS. MERGING PERMISSIONS ASSIGNED TO THE ROLES, AND DELETING ONE ROLE

| USER | ROLE | MODIFICATION PLAN | USE RATIO |
|---|---|---|---|
| abel | RoleA | DELETING USER FROM ROLE TO WHICH THE USER BELONGS | 0.2 |
| kato | RoleA | MAKING USER BELONG TO THE OTHER SIMILAR ROLE | 0.8 |
| sasaki | RoleD | DELETING USER FROM ROLE TO WHICH THE USER BELONGS | 0.1 |
| nakamura | RoleD | MAKING USER BELONG TO THE OTHER SIMILAR ROLE | 0.9 |
| oda | RoleD | DELETING USER FROM ROLE TO WHICH THE USER BELONGS | 0.4 |

[ OUTPUT ]　[ BACK ]　[ OK ]

F I G. 5 2

ACCESS CONTROL POLICY COMPLIANCE CHECK PROCESS

CROSS-REFERENCE TO RELATED APPLICATION

This application is based upon and claims the benefit of priority of the prior Japanese Patent Application No. 2008-142646, filed on May 30, 2008, the entire contents of which are incorporated herein by reference.

FIELD

The embodiments discussed herein are relates to a process for checking whether or not an access control policy based on an internal control, etc. is suitably complied within an information processing system.

BACKGROUND

With the recent enforcement of J-SOX (Financial Instruments and Exchange Law), not only the demand for an internal control and compliance but also the demand for the strict performance and the strengthening of a control over IDs and access rights has been increasing.

Conventionally, products such as Sun Java Identity Manager, etc., having the function to integrally manage ID information managed by each system within an enterprise, and systems such as Oracle Role Manager, etc. for integrally managing roles managed by a system within an enterprise are provided in this field. The function to check a security policy (duty segregation) is embedded in such products or systems in order to reinforce control.

As to the function, checks are made by using the following matrix.

TABLE 1

|        | ROLE A | ROLE B | ROLE C | ROLE D |
|--------|--------|--------|--------|--------|
| ROLE A |        |        |        |        |
| ROLE B | X      |        |        |        |
| ROLE C | ○      | X      |        |        |
| ROLE D | ○      | X      | ○      |        |

Each circle within the table indicates that a user can simultaneously use (belong to) two roles indicated by a row and a column in terms of security policy. Each cross indicates that a user is prohibited from simultaneously using two roles indicated by a row and a column in terms of security policy.

For example, a user cannot simultaneously use the roles A and B. However, the user can simultaneously use the roles A and C. Based on such definitions, a system that integrally manages IDs and roles makes checks by using user-role assignment information indicating to which role a person managed by the system itself belongs.

As for the above described technique, Japanese Laid-open Patent Publication No. 2007-041881 discloses an information processing device for verifying that the settings of a forcible access control based on an RBAC (Role Based Access Control) model and a TE (Type Enforcement) model are suitable. Additionally, Japanese Laid-open Patent Publication No. 2007-072581 discloses a policy set generating apparatus for generating a policy set that can replace two policy sets.

SUMMARY

According to an aspect of the embodiment, an information processing device is caused to execute an access right management information obtainment process for obtaining access right management information from an access right management information storing unit for storing the access right management information that collectively or partially restricts an access to an arbitrary resource, a violation detection process for obtaining a policy from a policy storing unit for storing the policy set for the resource or the access to the resource, for checking whether or not the access right management information complies with the policy, and for detecting access right management information which does not comply with the policy as a violation, a policy compliance level calculation process for calculating a risk score in accordance with the degree of risk of the violation, and for calculating a level of compliance with the policy from a result of the risk calculation, and a result output process for outputting a result of the policy compliance level calculation process.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram for explaining policy compliance level measurement targets in the integrated security managing system according to the embodiment;

FIG. 4 is a schematic diagram depicting the outline of an unsuitable user account detection process in the embodiment;

FIG. 5 is a schematic diagram for explaining the definitions of unsuitable user accounts in the embodiment;

FIG. 7 is a schematic diagram for explaining classifications of user accounts in the embodiment;

FIG. 8 is a schematic diagram depicting a configuration example of a screen for displaying a policy compliance level in the unsuitable user account detection process;

FIG. 9 is a schematic diagram depicting the outline of an unsuitable user-role assignment detection process in the embodiment;

FIG. 11 is a flowchart depicting a specific example of an unused user-role assignment detection process (step S1001) in the embodiment;

FIG. 12 is a flowchart depicting a specific example of a process (step S1002) for detecting a role assignment that violates a role assignment prohibition rules in the embodiment;

FIG. 13 is a schematic diagram depicting a configuration example of a screen for displaying a policy compliance level in the unsuitable user-role assignment detection process;

FIG. 14 is a block diagram depicting a configuration example for detecting an unsuitable permission-role assignment in the embodiment;

FIG. 16 is a flowchart depicting a specific example of a process (step S1502) for checking whether or not a role possesses permission that is prohibited from being simultaneously used in the embodiment;

FIG. 17 is a schematic diagram depicting a configuration example of a screen for displaying a policy compliance level in the unsuitable permission-role assignment process;

FIG. 28 is a flowchart depicting a process for detecting a role that violates a permission assignment prohibition rule in the embodiment;

FIG. 30 is a block diagram depicting a configuration example for detecting a duty segregation violation in the embodiment;

FIG. 32 is a flowchart depicting an ACL creation process in the embodiment;

FIG. 34 is a schematic diagram depicting a configuration example of a screen for displaying a policy compliance level in the duty segregation violation detection process in the embodiment;

FIG. 35 is a schematic diagram for explaining the size of a user-role correspondence table in the embodiment;

FIG. 36 is a schematic diagram for explaining the size of a role-permission correspondence table in the embodiment;

FIG. 38 is a schematic diagram depicting a configuration example of a screen for results of a policy compliance level evaluation of each system, which is displayed when a details button is pressed;

FIG. 41 is a flowchart depicting a process for detecting permission that is set for a user or a role and is not used in the embodiment;

FIG. 45 is a schematic diagram depicting a configuration example of a screen for displaying an average ratio transition of an access right setting in each system;

FIG. 46 is a schematic diagram depicting a configuration example of a screen for displaying access right settings/use ratio information for each system in the embodiment;

FIG. 47 is a block diagram depicting a configuration example for detecting a matching or similar role in the embodiment;

FIG. 49 is a schematic diagram depicting a configuration example of a similarity degree calculation screen in the embodiment;

FIG. 50 is a schematic diagram depicting a configuration example of a screen for displaying results of the similarity degree calculation in the embodiment;

FIG. 51 is a schematic diagram depicting a configuration example of a screen for displaying a role modification plan presentation in the embodiment;

FIG. 52 is a schematic diagram depicting a configuration example of a screen for displaying the details of a role modification plan in the embodiment.

DESCRIPTION OF EMBOSSMENTS

As described previously, many systems currently adopt an access control model such as RBAC model, etc. With this model, a relationship between a user and a role, a relationship between a role and permission, a hierarchical relationship among roles, a relationship of duty segregation, and the like are managed.

If such an RBAC system is assumed, the function provided by the products of the above described conventional techniques checks only a security policy for a relationship between an ID and a role, and does not check the other relationships. Therefore, the policy is not thoroughly complied with.

Additionally, not only system experts such as system administrators or security management personnel who are well acquainted with the system but also system in experts such as auditors, members responsible for compliance, or the management within an enterprise are involved in the enforcement of internal control. Therefore, whether or not an ID/access right control of the system is enforced must be put into numerical values for each system in order to let every body learn the control state.

According to numerical values, which system among systems within an organization and how properly manages IDs and access rights in comparison with the other systems is exhibited, producing the effect of urging a system that does not properly manage IDs and access rights to make thorough management, and the effect of clarifying the management objective of each system by putting the control state into numerical values. These effects lead to the strengthening of control within the organization.

An embodiment according to the present invention is described below with reference to FIGS. 1 through 53.

1. Outline of an Embodiment

Figure 1:
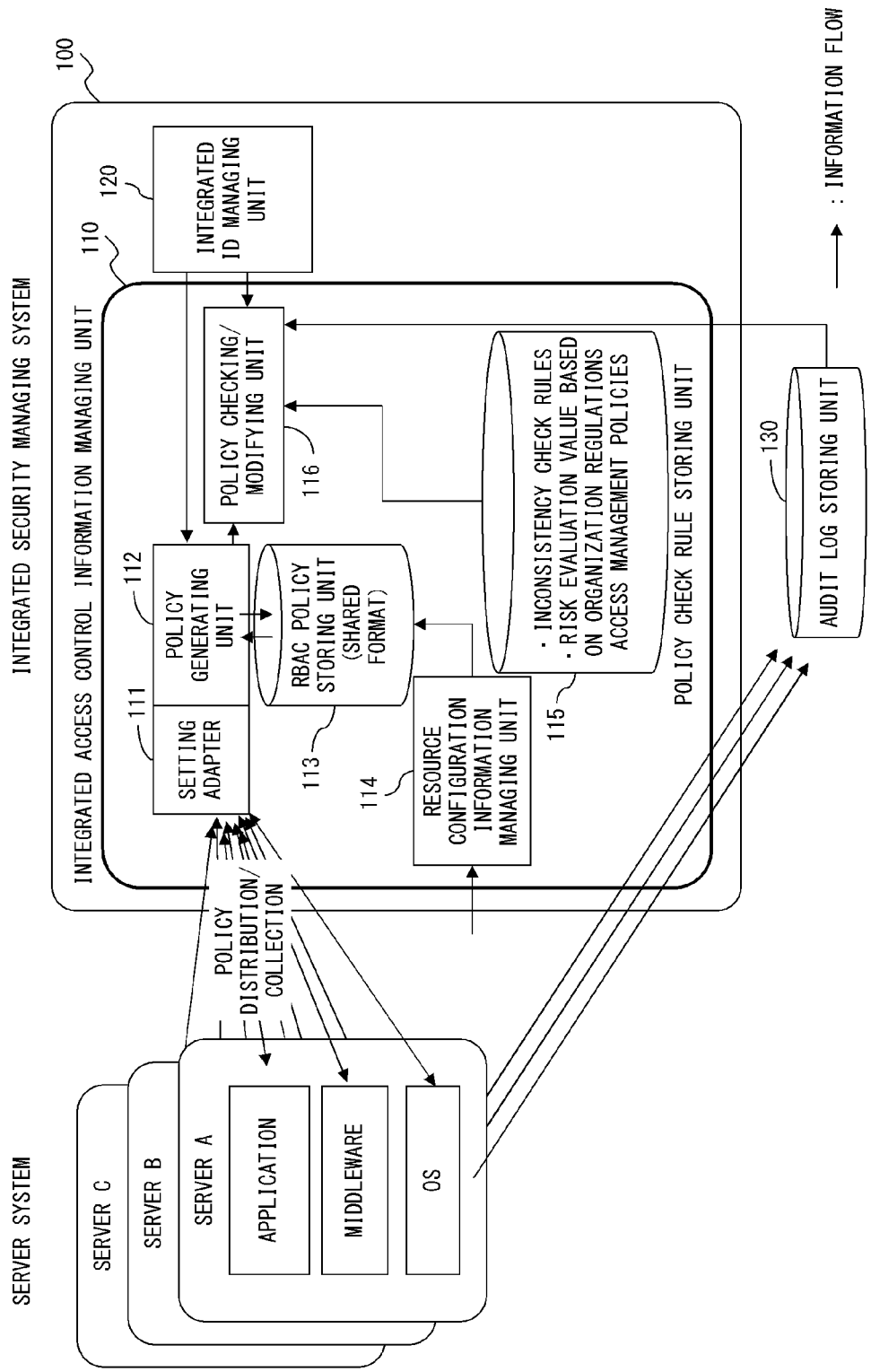
FIG. 1 is a block diagram depicting a configuration example of an integrated security managing system having an access control policy compliance checking mechanism according to an embodiment.

FIG. 1 is a block diagram depicting a configuration example of an integrated security managing system 100 having an access control policy compliance checking mechanism in the embodiment.

The integrated security managing system 100 depicted in FIG. 1 comprises an integrated access control information managing unit 110 for distributing/collecting an access control policy (hereinafter referred to as a policy as needed) for performing an access control for servers A, B and C, and an integrated ID managing unit 120 for integrally managing user accounts, etc. in the servers A, B and C.

All or some of logs output from the servers A, B and C are stored in an audit log storing unit 130 as audit logs. The audit log storing unit 130 may be a constituent element of the integrated security managing system 100 as needed. FIG. 1 depicts the server system composed of the servers A, B and C. Naturally, however, the number of servers configuring the server system is not particularly limited to three.

The integrated access control information managing unit 110 includes a setting adapter 111 for distributing/collecting a policy to/from the servers A, B and C, a policy generating unit 112 for generating a policy, an RBAC policy storing unit 113 for storing a generated policy, an RBAC policy, etc., a resource configuration information managing unit 114 for respectively obtaining/managing the configuration information of resources in the servers A, B and C from the servers, a policy check rule storing unit 115 for storing policy check rules, etc., and a policy checking/modifying unit 116 for checking/modifying a policy in accordance with the policy check rules stored in the policy check rule storing unit 115. With this configuration, the integrated access control information managing unit 110 manages (generates, edits, deletes, etc.) an access right to perform an access control consistent in the entire system, and distributes the access right in a format readable by access control mechanisms of the server systems.

The policy checking/modifying unit 116 obtains, for example, an RBAC policy stored in the RBAC policy storing unit 113 and access right setting information stored in the RBAC policy storing unit 113 or the integrated ID managing unit 120, and also obtains an access log, which is stored as an audit log, from the audit log storing unit 103.

The access right setting information include, for example, user information such as a role-user correspondence table to be described later, etc., user-role assignment information, permission-role assignment information, role information, and the like, and may include duty segregation rule information, etc. as needed.

A role is a logical intermediate, and a group of settings, etc. for accesses to an object such as a resource, etc. For example, in an RBAC system, a role is a group of access rights (read, write, change, deletion, etc.).

The policy checking/modifying unit 116 obtains predetermined policy check rules from the policy check rule storing unit 115. Moreover, the policy checking/modifying unit 116 detects whether or not there is a setting violating the policy check rules, and calculates a policy compliance level (puts the setting into a numerical value). Furthermore, the policy checking/modifying unit 116 presents a modification plan to the detected violation.

The policy check rules include, for example, a role-to-user assignment prohibition rule to be described later, a permission-to-role assignment prohibition rule, a permission-to-user assignment prohibition rule, and the like.

The resource configuration information managing unit 114 collects from the servers A, B and C whose resources configuration information are required to implement the integrated access control and for which the access control is to be performed, and manages the collected information in the integrated access information management unit in order to create a policy.

The resources are management targets of the integrated security managing system 100 according to this embodiment, and are constituent elements that configure each server or run on each server. The resources are, for example, a memory and data files provided in each server, an application running on each server, and the like.

The accesses are operations performed for the resources. The accesses are, for example, read/write operations from/to a file stored in an arbitrary server or a storage device, etc. provided in a server.

The integrated ID managing unit 120 intensively manages exclusive user IDs and their attribute information (qualification, role, etc.) in the entire system including the server system composed of the servers A, B and C, and the integrated security managing system 100, synchronizes with the system to be managed, and notifies the integrated access control information managing unit 110 of a user ID, etc. required to create a policy, in order to implement integrated access control.

Additionally, the integrated ID managing unit 120 manages user information such as the role-user correspondence table, etc., and distributes the user information to the integrated access control information managing unit 110 as needed.

2. Policy Compliance Level Measurement Targets

The integrated access control information managing unit 110 in this embodiment detects whether or not the user information, the user-role assignment information, the permission-role assignment information, the role information, and the duty segregation rule information (these items of information are hereinafter referred to collectively as access right management information), for which an access right is to be managed, comply with a policy, and makes scoring in accordance with the degree of risk of detected setting information, etc. Moreover, policy compliance levels can be compared in the management of another server or resources set by calculating a total score in units of servers or resources sets to be protected.

The case where a policy compliance level in the RBAC system is measured in the integrated security managing system 100 according to this embodiment is described. Since the RBAC system is a conventional technique, its detailed explanation is omitted.

FIG. 2 is a schematic diagram for explaining policy compliance level check targets in the integrated security managing system 100 according to this embodiment. As depicted in this figure, the number of violations of policy check rules is obtained for the following items, and compliance levels are put into numerical values by using the results.

(1) Unsuitable User Account Detection

Unsuitable user accounts include, for example, an account of an unidentifiable user, an account of an unused user, a remaining account of a user whose position or organization is changed, etc.

(2) Unsuitable User-Role Assignment Detection

Unsuitable user-role assignments include, for example, an unused user-role assignment, a user-role assignment of a role prohibited from simultaneous assignment of a user, and the like.

(3) Unsuitable Permission-Role Assignment Detection

Unsuitable permission-role assignments include, for example, an unused permission-role assignment, a permission-role assignment of permission prohibited from simultaneous assignment of a user, and the like.

(4) Unnecessary Role Detection

Unnecessary roles include, for example, an unused role, a role prohibited from having a parent-child relationship, and the like.

(5) Duty Segregation Violation Detection

Duty segregation violations include, for example, a user-role assignment of a role prohibited from being simultaneously assigned with users, a permission-role assignment to a role or a user that is prohibited from being simultaneously assigned with permissions, and the like.

3. Outline of a Process in this Embodiment

Figure 3:
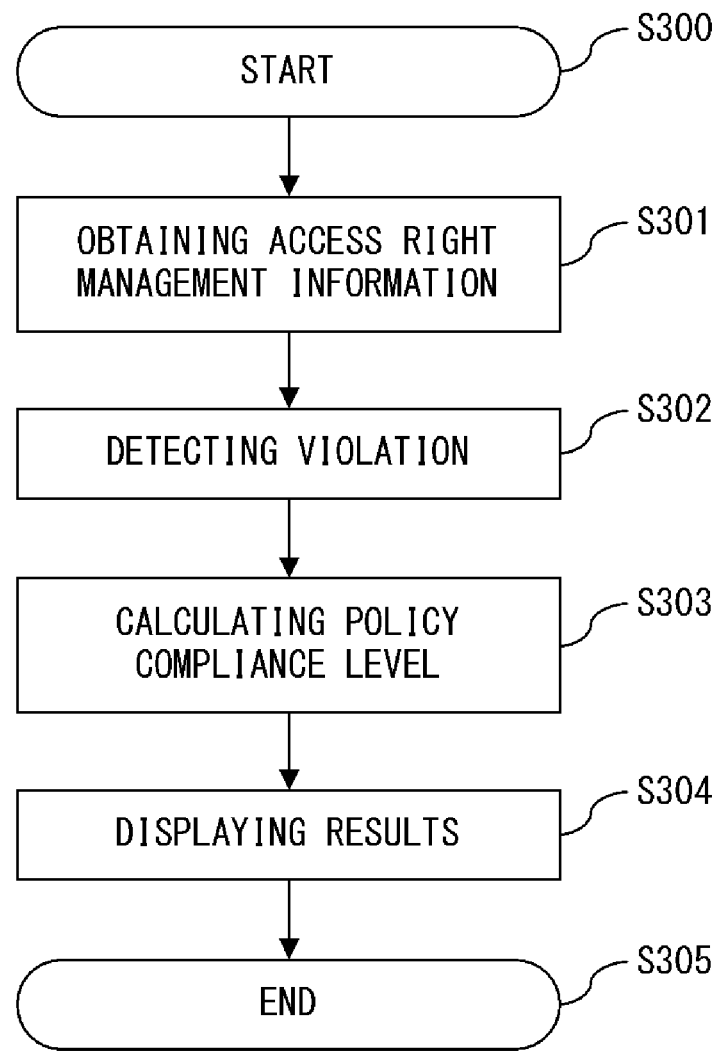
FIG. 3 is a flowchart depicting the outline of a process executed by the integrated security managing system according to the embodiment.

FIG. 3 is a flowchart depicting the outline of a process executed by the integrated security managing system 100 according to this embodiment.

After the integrated security managing system 100 starts the process for checking the compliance of an access control policy in step S300, the flow goes to step S301.

In step S301, the integrated security managing system 100 obtains access right management information from the integrated ID managing unit 120, the RBAC policy storing unit 113 or the policy check rule storing unit 115 as needed.

In this embodiment, the user information such as a user ID, etc. among the access right management information is stored in the integrated ID managing unit 120. Moreover, the user-role assignment information, the permission-role assignment information and the role information are stored in the RBAC policy storing unit 113, and the duty segregation rule information is stored in the policy check rule storing unit 115.

In step S302, the integrated security managing system 100 obtains policy check rules from the policy check rule storing unit 115 in accordance with the access right management information obtained in step S301, and detects a violation of the rules, etc.

In this embodiment, (1) an unsuitable user account, (2) an unsuitable user-role assignment, (3) an unsuitable permission-role assignment, (4) an unnecessary role, and (5) a duty segregation violation are detected as violations in accordance with the access right management information obtained in step S301 as described with reference to FIG. 2. Processes for (1) through (5) will be described later.

In step S303, the integrated security managing system 100 calculates a policy compliance level on the basis of the number of violations detected in step S302, and the like.

In step S304, the integrated security managing system 100 outputs the results of the calculation made in step S303 to a display device, etc., which in turn displays the results. The flow then goes to step S305, in which the integrated security managing system 100 terminates the process.

Specific processes of steps S302 through S304 are described below.

3.1 Unsuitable User Account Detection Process

If there is an unsuitable user ID in the access right management, it can possibly cause an illegal access, information leakage or falsification. Therefore, user IDs must be suitably managed.

In this embodiment, user IDs can be suitably managed by defining an unused user ID, an ID of an unidentifiable user, and a user whose account is remaining even after his/her position or organization is changed as unsuitable users, by detecting such unsuitable users, and by classifying and scoring the results of the detection in accordance with the degree of risk.

FIG. 4 is a schematic diagram depicting the outline of the unsuitable user ID detection process in this embodiment.

The policy checking/modifying unit 116 obtains the role-user correspondence table depicted in Table 21 from the integrated ID managing unit 120. The policy checking/modifying unit 116 also obtains a list of moved or retired users (hereinafter referred to as a personnel change list), which is created from information about employees stored, for example, in a personnel change information storing unit 411 such as a personnel system 410, etc.

The personnel change information storing unit 411 may be provided, for example, in the integrated security managing system 100 or in the server A, B, C, or the like configuring the personnel system 410.

The policy checking/modifying unit 116 obtains the user information 402 from the integrated ID managing unit 120. Then, the policy checking/modifying unit 116 detects an unsuitable user account by using the obtained information. Moreover, the policy checking/modifying unit 116 puts the results of the detection into numerical values on the basis of an unsuitable user risk score table 501 depicted in Table 3.

FIG. 5 is a schematic diagram for explaining the definitions of unsuitable user accounts in this embodiment.

As depicted in this figure, unsuitable user accounts in this embodiment are defined as follows.

(a) an "ID of an unidentifiable user" ∪

(b) an "unused user ID" ∪

(c) a "remaining ID of a user whose position or organization is changed"

Here, a user ID list of the system (hereinafter referred to as a user list) is used as the user information 302 in this embodiment. A specific example is depicted in Table 2. Table 2 includes entries such as a user ID, a mail address, and the last use date and time.

TABLE 2

| USER ID | MAIL ADDRESS | LAST USE DATE AND TIME |
|---|---|---|
| 1 aaaaa | aaaaa@○○○○.com | 2008/1/22 20:08 |
| 2 bbbbb |  | 2008/1/20 14:28 |
| 3 ccccc | ccccc@○○○○.com | 2000/9/1 12:22 |
| 4 ddddd | ddddd@○○○○.com | 2007/12/26 11:34 |
| 5 eeeee | eeeee@○○○○.com | 2008/1/13 12:02 |
| ... | ... | ... |

With Table 2, (a) an "ID of an unidentifiable user" can be defined as a user who does not have a mail address. For example, since the second row "bbbbb" in Table 2 does not include a mail address, it is an ID of an unidentifiable user.

In this embodiment, a user who does not have a mail address is defined as an "ID of an unidentifiable user". However, the "ID of an unidentifiable user" is not limited to this one. For example, a user who does not have a contact unit such as an extension number or external number, a fax number, etc. may be defined as the "ID of an unidentifiable user".

Also with Table 2, (b) an "unused user ID" can be defined as a user ID if the last use date and time of which is in advance of a predetermined duration or more from the current time.

Also with Table 2, (c) the "remaining ID of a user whose position or organization is changed (including retirement) can be defined as an ID of a user who is enrolled in the user list (personnel change list) of moved or retired users, which is created from the information about employees such as the personnel system 410, etc.

The unsuitable user account detection process according to the above described definitions is described below.

Figure 6:
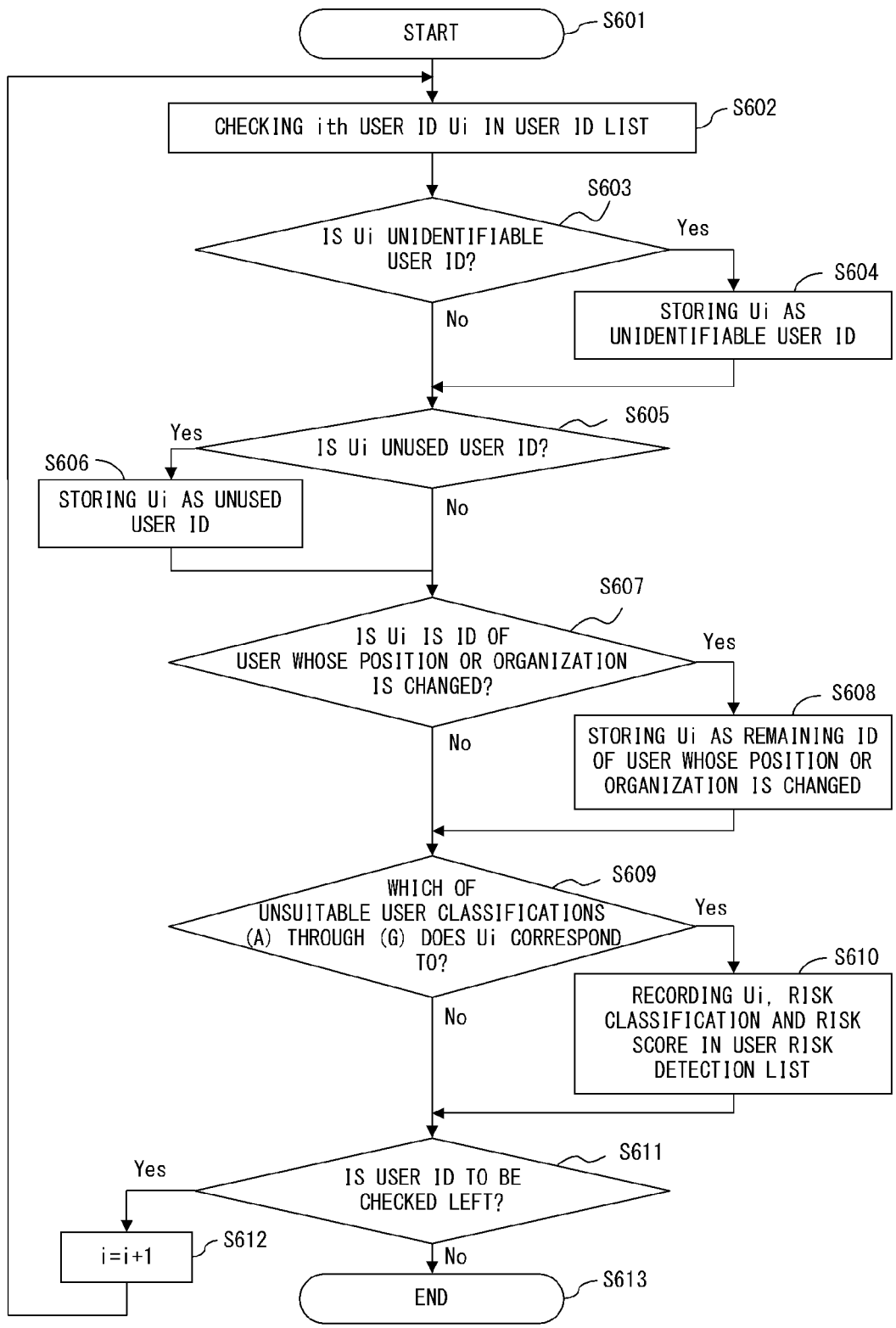
FIG. 6 is a flowchart depicting a specific process for detecting an unsuitable user account in the embodiment.

FIG. 6 is a flowchart depicting a specific process for detecting an unsuitable user account in this embodiment.

After the policy checking/modifying unit 116 obtains, for example, the user information (user list) depicted in Table 2 and the personnel change list respectively from the integrated ID managing unit 120 and the personnel system 410 in step S301 depicted in FIG. 3, the flow goes to step S601, in which the policy checking/modifying unit 116 starts the unsuitable user account detection process.

In step S602, the policy checking/modifying unit 116 sets the ith (i is a natural number equal to or larger than 1) user ID Ui in the user list as a user ID to be checked.

Then, the policy checking/modifying unit 116 checks whether or not a mail address is registered to the user ID Ui by referencing mail addresses in the user list. The policy checking/modifying unit 116 also checks whether or not the last use date and time is in advance of the predetermined duration from the current time by referencing the last use dates and times in the user list. Moreover, the policy checking/modifying unit 116 checks whether or not the user ID Ui (or the user corresponding to Ui) is registered to the personnel change list by referencing the personnel change list.

If the mail address is not registered to the user ID Ui in step S603, the flow goes to step S604, in which the policy checking/modifying unit 116 stores the user ID Ui in the storage device, etc. as an unidentifiable user account.

If the last use date and time is in advance of the predetermined duration or more from the current time in step S605, the flow goes to step S606, in which the policy checking/modifying unit 116 stores the user ID Ui in the storage device, etc. as an unused user account.

If the user ID Ui is registered to the personnel change list in step S607, the flow goes to step S610, in which the policy checking/modifying unit 116 stores the user ID Ui in the storage device, etc. as a remaining account of a user although his/her position or organization is changed.

In step S609, the policy checking/modifying unit 116 determines which of classifications (A) through (G) depicted in Table 3 the user ID Ui corresponds to. If the user ID Ui corresponds to any of the classifications in Table 3, the flow goes to step S610.

In step S610, the policy checking/modifying unit 116 records the user ID Ui, the risk classification and the risk score to a user risk detection list prepared in the storage device, etc.

In step S611, the policy checking/modifying unit 116 verifies whether or not all user IDs have been checked. If a user ID to be checked is left in the user list, the flow goes to step S612.

In step S612, the policy checking/modifying unit 116 increments i by 1, and the flow goes to step S602, in which the policy checking/modifying unit 116 sets the next user ID in the user list as a user ID to be checked.

In the meantime, if all of the user IDs have been checked in step S611, the flow goes to step S613, in which the policy checking/modifying unit 116 terminates the unsuitable user account detection process.

Here, a relationship between (a) an "ID of an unidentifiable user", (b) an "unused user ID", and (c) a "remaining ID of a user whose position or organization is changed" is depicted in FIG. 7.

A set (A) depicted in FIG. 7 indicates a set of an "ID of an unidentifiable user", a "using user ID", and an "ID of a user whose position or organization is not changed, a set (B) indicates a set of an "ID of an identifiable user", an "unused user ID", and an "ID of a user whose position or organization is not changed", and a set C indicates a set of an "ID of an identifiable user", a "using user ID", and a "remaining ID of a user whose position or organization is changed".

A set (D) indicates a set of an "ID of an unidentifiable user", an "unused user ID", and a "remaining ID of a user whose position or organization is changed".

A set (E) indicates a set of an "ID of an unidentifiable user", an "unused user ID", and an "ID of a user whose position or organization is not changed, a set (F) indicates a set of an "ID of an identifiable user", an "unused user ID", and a "remaining ID of a user whose position or organization is changed", and a set (G) indicates a set of an "ID of an unidentifiable user", a "using user ID", and a "remaining ID of a user whose position or organization is changed".

By considering the risks of the sets in this figure, for example, the risk score (high score if a risk is high) table depicted in Table 3 can be obtained.

TABLE 3

| DETECTED UNSUITABLE USER CLASSIFICATION | DESCRIPTION | RISK | SCORE |
| --- | --- | --- | --- |
| (A) | USED, UNMOVED OR NOT REMAINING IN USER LIST, AND UNIDENTIFIABLE USER | HIGH RISK BECAUSE UNIDENTIFIABLE USER USES SYSTEM | 3 |
| (B) | UNUSED, UNMOVED OR NOT REMAINING IN USER LIST, AND IDENTIFIABLE USER | LOW RISK BECAUSE USER (ID) IS NOT USED DESPITE BEING IDENTIFIABLE, AND NOT GHOST ID | 1 |
| (C) | USED, MOVED,. REMAINING IN USER LIST, AND IDENTIFIABLE USER | HIGH RISK BECAUSE GHOST ID IS USED | 3 |
| (D) | UNUSED, MOVED, REMAINING IN USER LIST, AND UNIDENTIFIABLE USER | HIGH RISK BECAUSE GHOST ID IS USED AND USER IS UNIDENTIFIABLE | 3 |

TABLE 3-continued

| DETECTED UNSUITABLE USER CLASSIFICATION | DESCRIPTION | RISK | SCORE |
|---|---|---|---|
| (E) | UNUSED, UNMOVED OR NOT REMAINING IN USER LIST, AND UNIDENTIFIABLE USER | MIDDLE RISK BECAUSE ID IS NOT USED AND UNIDENTIFIABLE | 2 |
| (F) | UNUSED, MOVED, REMAINING IN USER LIST, AND IDENTIFIABLE USER | MIDDLE RISK BECAUSE ID IS GHOST ID AND NOT USED, AND USER IS IDENTIFIABLE | 2 |
| (G) | USED, MOVED, REMAINING IN USER LIST, AND UNIDENTIFIABLE USER | HIGHEST RISK BECAUSE GHOST ID IS USED AND USER IS UNIDENTIFIABLE | 4 |

As the scores depicted in Table 3 increase, so does the risk of the classification of a detected unsuitable user account. However, scores are not limited to those depicted in Table 3. A higher score may be set for a user account of a higher risk as needed.

After the risk value of each user ID, and the total of all risk values are calculated with the above described process, the policy checking/modifying unit 116 outputs the results of the process as a policy compliance level to the display device, etc., which in turn displays the results.

FIG. 8 is a schematic diagram depicting a display example of a policy compliance level in the unsuitable user account detection process. In this embodiment, the risk scores of user IDs, and their total score are represented as a risk evaluation value.

3.2 Unsuitable User-Role Assignment Detection Process

If an unsuitable user-role assignment is made in the access right management, it can possibly cause an illegal access, information leakage or falsification. Accordingly, user-role assignments must be suitably managed.

In this embodiment, user-role assignments are suitably managed by defining unsuitable user-role assignment information as an unused user-role assignment and an assignment violating a role-to-user assignment prohibition if user-role assignment information, for which access right management is to be made, is unsuitable, by detecting the unsuitable user-role assignment information, and by classifying and scoring the results of the detection in accordance with the degree of risk.

FIG. 9 is a schematic diagram depicting the outline of an unsuitable user-role assignment detection process in this embodiment.

The policy checking/modifying unit 116 obtains user information 901 (such as a role-user ID correspondence table depicted in Table 21) from the integrated ID managing unit 120. The policy checking/modifying unit 116 also obtains, for example, access logs 902 depicted in Table 22 from the audit log storing unit 130.

Then, the policy checking/modifying unit 116 detects an unused user-role assignment from the user information 901 and the access logs 902. Moreover, the policy checking/modifying unit 116 detects a user-role assignment violating a role assignment prohibition on the basis of preset role assignment prohibition rules 903, for example, depicted in Table 5. Then, the policy checking/modifying unit 116 puts the results of the detection into numerical values by using an unsuitable user-role assignment risk score table 904 prepared in Table 7.

In this embodiment, an unsuitable user-role assignment is defined as follows.

(a) an "unused user-role assignment" ∪
(b) an "assignment violating a role-to-user assignment prohibition"

Figure 10:
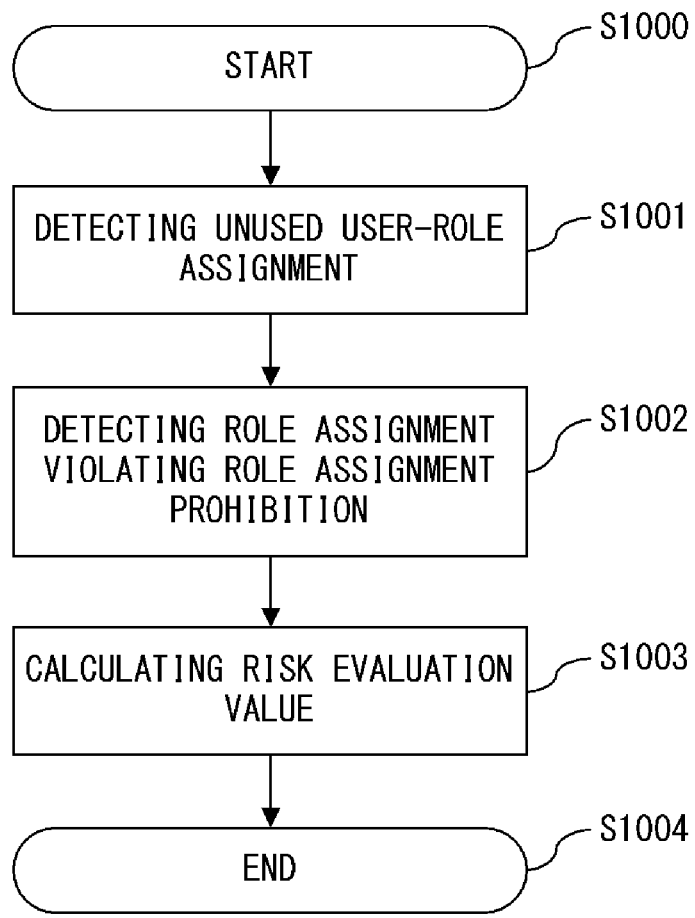
FIG. 10 is a flowchart depicting the outline of the unsuitable user-role assignment detection process in the embodiment.

FIG. 10 is a flowchart depicting the outline of an unsuitable user-role assignment detection process in this embodiment.

After the policy checking/modifying unit 116 obtains the user information 901 (such as the role-user correspondence table depicted in Table 21) and the access logs 902, for example, depicted in Table 22 respectively from the integrated ID managing unit 120 and the audit log storing unit 130 in step S301 depicted in FIG. 3, the flow goes to step S1001, in which the policy checking/modifying unit 116 starts the unsuitable user-role assignment detection process.

In step S1001, the policy checking/modifying unit 116 detects an unused user-role assignment from the user information 901 and the access logs 902.

In step S1002, the policy checking/modifying unit 116 detects a user-role assignment violating a role assignment prohibition as to the user-role assignment on the basis of the preset role assignment prohibition rules 903.

In step S1003, the policy checking/modifying unit 116 calculates a risk evaluation value from the results of the detection made in steps S1001 and S1002 on the basis of the unsuitable user-role assignment risk score table 904.

Upon completion of the above described process, the flow goes to step S304, in which the policy checking/modifying unit 116 outputs the risk evaluation value calculated as a policy compliance level to the display device, etc., which in turn displays the risk evaluation value.

Here, in the detection of an unused user-role assignment in step S1001, an unused user-role assignment is detected from the user-role correspondence table (obtained by sorting Table 21 by using a user ID as a key) depicted in Table 4 and the access logs depicted in Table 22.

TABLE 4

| USER ID (UID) | ROLE |
|---|---|
| U1 | R1 |
| U1 | R3 |
| . | . |
| . | . |
| . | . |
| U2 | R1 |
| U2 | R5 |
| . | . |
| . | . |
| . | . |

3.2.1 Unused User-Role Assignment Detection Process

FIG. 11 is a flowchart depicting a specific example of the unused user-role assignment process (step S1001) in this embodiment.

In step S1101, the policy checking/modifying unit 116 obtains Ui that is the ith user ID in the user-role correspondence table. Then, the policy checking/modifying unit 116 extracts an access log to which an access log of Ui is recorded by referencing the access logs 902.

In step S1102, the policy checking/modifying unit 116 obtains the jth (j is a natural number equal to or lager than 1) role Rj of Ui in the user-role correspondence table. Then, the policy checking/modifying unit 116 verifies whether or not the access log corresponding to Rj is recorded to the access log extracted in step S1101.

If the policy checking/modifying unit 116 cannot verify the access log to which the use of Rj by Ui is recorded, in step S1103 as a result of the verification made in step S1102, the flow goes to step S1104, in which the policy checking/modifying unit 166 stores Rj of Ui in the storage device, etc . . .

In step S1105, the policy checking/modifying unit 116 determines whether or not a role yet to be checked belonging to UIi is left in the user-role correspondence table. If the policy checking/modifying unit 116 determines that the role yet to be checked is left, the flow goes to step S1106.

The policy checking/modifying unit 116 increments j by 1 in step S1106. Then, the flow goes to step S1102.

In step S1107, the policy checking/modifying unit 116 determines whether or not a user yet to be checked is left in the user-role correspondence table. If the policy checking/modifying unit 116 determines that the user yet to be checked is left, the flow goes to step S1108.

Then, the policy checking/modifying unit 116 increments i by 1 in step S1108. The flow then goes back to step S1101.

In the meantime, if the policy checking/modifying unit 116 determines that the user yet to be checked is not left in step S1107, it terminates the process for detecting a role that is not used by a user (step S1109). Then, the flow goes back to step S1002.

With the above described process, a list of roles not used by a user is obtained.

Each of the role-to-user assignment prohibition rules 903 is defined as a role pair, for example, as depicted in Table 5 in the detection of an assignment violating a role-to-user assignment prohibition in step S1002.

The rule 1 in the following Table 5 stipulates that R1 and R2 cannot be assigned to the same user. The rule 2 stipulates that R1 and R5 cannot be assigned to the same user.

TABLE 5

| NUMBER | ROLE ASSIGNMENT PROHIBITION RULE |
|---|---|
| 1 | R1, R2 |
| 2 | R1, R5 |
| ... | ... |

3.2.2 Process for Detecting an Assignment Violating a Role-to-User Assignment Prohibition FIG. 12 is a flowchart depicting a specific example of the process (step S1002) for detecting a role assignment that violates a role assignment prohibition in the embodiment. In the process depicted in FIG. 12, the user-role correspondence table depicted in Table 4, and the role assignment prohibition rules 903 depicted in Table 5 are input.

Upon termination of the process in step S1001, the flow goes to step S1201, in which the policy checking/modifying unit 116 starts the process for checking whether or not a user-role assignment violates the role assignment prohibition rules 903.

In step S1201, the policy checking/modifying unit 116 obtains the role assignment prohibition rules 903 prestored in the storage device, etc.

In step S1202, the policy checking/modifying unit 116 identifies a user ID to be checked by referencing the user-role correspondence table. The following description is provided by assuming the ith user ID in the user-role correspondence table to be Ui.

In step S1203, the policy checking/modifying unit 116 identifies roles assigned to Ui by referencing the user-role correspondence table. The jth role assigned to Ui is hereinafter assumed to be Rj in the user-role correspondence table.

In step S1204, the policy checking/modifying unit 116 checks whether or not the role Rj identified in step S1203 is registered to the role assignment prohibition rules by referencing the role assignment prohibition rules, for example, depicted in Table 5.

If Rj is registered to the role assignment prohibition rules, the flow goes to step S1205.

In step S1205, the policy checking/modifying unit 116 obtains a role (hereinafter referred to as Rj') registered to the role assignment prohibition rules along with Rj. Then, the policy checking/modifying unit 116 checks whether or not Rj' is assigned to Ui by referencing the user-role correspondence table.

If Rj' is assigned to Ui in the user-role correspondence table, the flow goes to step S1206, in which the policy checking/modifying unit 116 stores the violating Ui, Rj and Rj' in the storage device, etc. as one data combination.

In step S1207, the policy checking/modifying unit 116 checks whether or not a role that is assigned to Ui and is not checked yet is left by referencing the user-role correspondence table. If the role yet to be checked is left, the flow goes to step S1208, in which the policy checking/modifying unit 116 increments j by 1. Then, the flow goes back to step S1203.

If the role yet to be checked is not left in step S1207, the flow goes to step S1209.

In step S1209, the policy checking/modifying unit 116 checks whether or not another user ID to be checked is left by referencing the user-role correspondence table. If the user ID to be checked is left, the flow goes to step S1210, in which the policy checking/modifying unit 116 increments i by 1. Then, the flow goes back to step S1202.

If the user ID to be checked is not left in step S1209, the flow goes to step S1211, in which the policy checking/modifying unit 116 terminates the process for checking whether or not a user-role assignment violates the role assignment prohibition rules.

A violation list output from the above described process is like that depicted in Table 6. For example, if the user ID is U2, Table 6 indicates that U2 violates the rule that prohibits R1 and R2 from being simultaneously assigned.

TABLE 6

| USER ID | ROLE ASSIGNMENT PROHIBITION RULE |
|---|---|
| U2 | R1, R2 |
| U5 | R1, R5 |
| ... | ... |

As described in detail with reference to FIGS. 11 and 12, assignments that violate the unused user-role assignment and the assignment violating the role assignment prohibition rules are detected with the processes in steps S1001 and S1002. Then, the policy checking/modifying unit 116 calculates risk evaluation values from the results of the detection depending on the cases classified in the following table. Risk scores are not limited to those represented in Table 7 as a matter of course.

TABLE 7

| No | CASE | RISK | SCORE |
|----|------|------|-------|
| 1 | USES TWO ROLES OF VIOLATING ROLE PROHIBITION ASSIGNMENT | HIGH RISK DUE TO DUTY SEGREGATION VIOLATION | 3 |
| 2 | USES ONE OF TWO ROLES OF VIOLATING ROLE PROHIBITION ASSIGNMENT | MIDDLE RISK BECAUSE ID IS UNUSED DESPITE BEING VIOLATION SETTING | 2 |
| 3 | DOES NOT USE TWO ROLES OF VIOLATING ROLE PROHIBITION ASSIGNMENT | HIGH RISK BECAUSE USER USES BOTH ROLES | 1 |
| 4 | NON-VIOLATION ASSIGNMENT. UNUSED | LOW RISK BECAUSE ID IS UNUSED AND NON-VIOLATION | 1 |

The policy checking/modifying unit 116 classifies the results of the processes executed in steps S1001 and S1002 in accordance with the classifications depicted in Table 7, and calculates scores.

For example, if the user ID is U2 in Table 6, U2 is proved to violate the role assignment prohibition rule 1 depicted in Table 5. In the meantime, R1 and R5 are set for U2 in the user-role correspondence table depicted in Table 4.

Namely, U2 uses one of the roles (R1 and R5) stipulated in the role assignment prohibition rule 1. Accordingly, the policy checking/modifying unit 116 determines that this corresponds to the case 2 depicted in Table 7, and obtains a score 2 as a risk evaluation value.

Additionally, the policy checking/modifying unit 116 calculates the total value of scores obtained for each user ID, outputs the total value to the display device, etc., which in turn displays the total value in a predetermined format.

FIG. 13 is a schematic diagram depicting a display example of a policy compliance level in the unsuitable user-role assignment detection process. In this embodiment, a role violating the role assignment prohibition rules, an unused role, a violation description, and a risk score are displayed for each user ID, and their total value is displayed as a risk evaluation value (FIG. 13 depicts the case where the risk evaluation value is 39).

3.3 Unsuitable Permission-Role Assignment Detection Process

If an unsuitable permission-role assignment is made in the access right management, it can possibly cause an illegal access, information leakage or falsification. Accordingly, permission-role assignments must be suitably managed.

In this embodiment, as to the permission-role assignment information for which an access right is to be managed, user-role assignments are suitably managed by defining an unsuitable permission-role assignment as an unused permission-role assignment and an assignment violating a permission assignment prohibition with the use of permission-role assignment information for which an access right is to be managed, by detecting a violating assignment, and by classifying and scoring the results of the detection in accordance with the degree of risk.

The policy checking/modifying unit 116 obtains access logs 1401, for example, depicted in Table 22 from the audit log storing unit 103. The policy checking/modifying unit 116 also obtains permission-role information 1402, for example, depicted in Table 20 from the RBAC policy storing unit 113.

Additionally, the policy checking/modifying unit 116 detects unused permission from the access logs 1401 and the permission-role information 1402.

Then, the policy checking/modifying unit 116 detects an unsuitable permission-role assignment on the basis of the detected unused permission, and the permission assignment prohibition rules 1403 preset, for example, in Table 8. Then, the policy checking/modifying unit 116 puts the results of the detection into numerical values by using a prepared unsuitable permission assignment risk score table 1404, for example, depicted in Table 11.

In this embodiment, an unsuitable permission-role assignment is defined as follows.

(a) unused permission ∪

(b) "permission that is prohibited from being possessed by a role in terms of duty segregation (work operations)"

Figure 15:
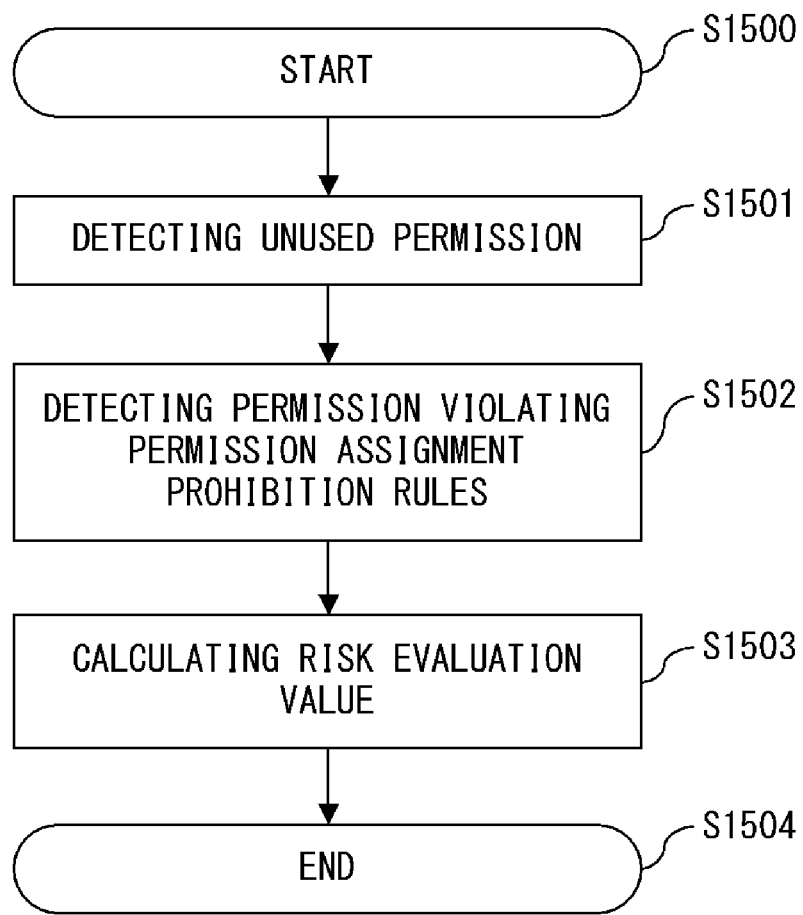
FIG. 15 is a flowchart depicting the outline of the unsuitable permission-role assignment detection process in the embodiment.
Figure 18:
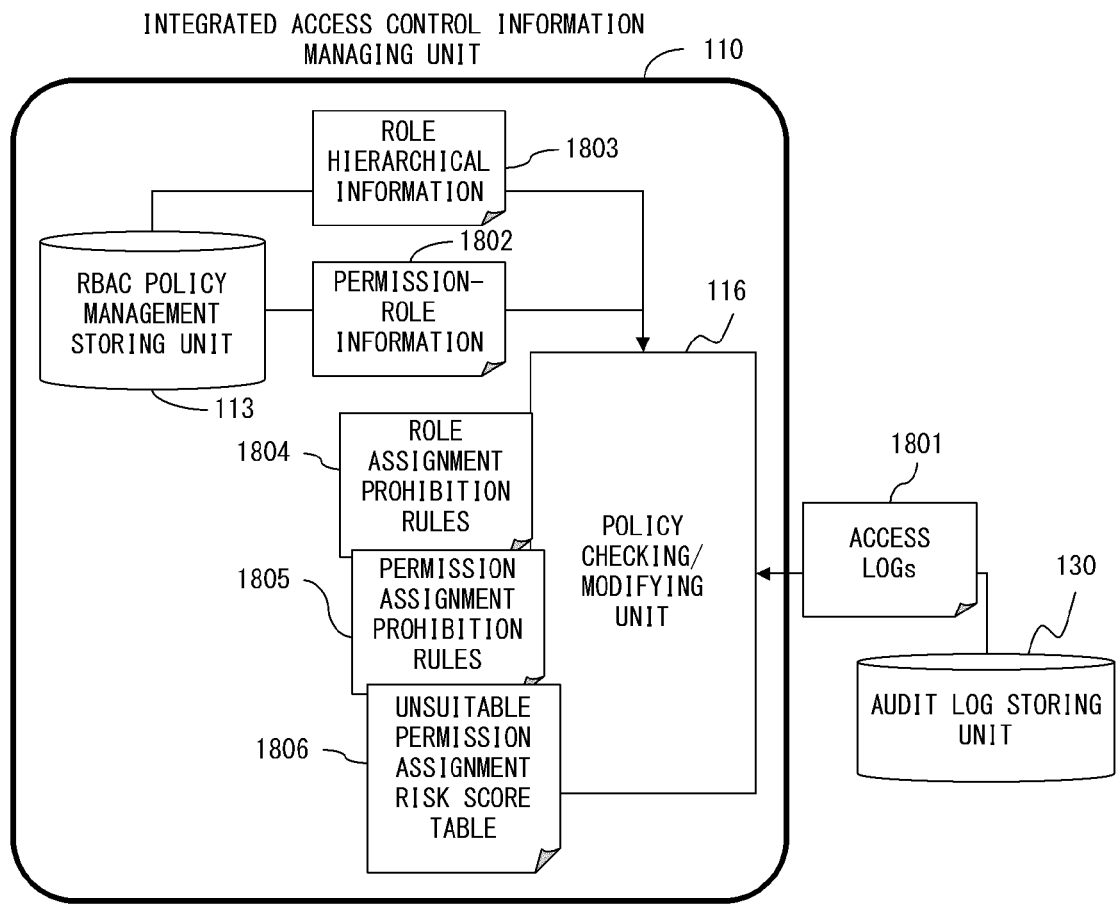
FIG. 18 is a block diagram depicting a configuration example for detecting an unsuitable role in the embodiment.

FIG. 15 is a flowchart depicting the outline of an unsuitable permission-role assignment detection process in this embodiment.

After the policy checking/modifying unit 116 obtains the access logs 1401, for example, depicted in Table 22 and the permission-role information 1402, for example, depicted in Table 20 respectively from the audit log storing unit 103 and the RBAC policy storing unit 113 in step S301 depicted in FIG. 3, the flow goes to step S1501, in which the policy checking/modifying unit 116 starts the unsuitable permission-role assignment detection process.

In step S1501, the policy checking/modifying unit 116 detects unused permission from the access logs 1401 and the permission-role information 1402.

In step S1502, the policy checking/modifying unit 116 detects a permission-role assignment violating a permission assignment prohibition on the basis of the preset permission assignment prohibition rules 1403, for example, depicted in Table 8.

In step S1503, the policy checking/modifying unit 116 calculates a risk evaluation value from the results of the detection made in steps S1501 and S1502 on the basis of the unsuitable permission-role assignment risk score table 1404.

Upon termination of the above described process, the flow goes to step S304, in which the policy checking/modifying unit 116 outputs the risk evaluation value calculated as a policy compliance level to the display device, etc., which in turn displays the risk evaluation value.

3.3.1 Unused Permission Detection Process

The unused permission detection process can be executed with a process similar to the unused user-role assignment detection process depicted in FIG. 11. In this case, the permission-role information 1402 may be used as a replacement for the user information 901, and the access log 1401 may be also used as a replacement for the access log 902.

In this embodiment, rules for permission that is prohibited from being simultaneously possessed in terms of duty segregation are used as an example of the permission assignment prohibition rules 1403. Table 8 depicts an example of the rules. In Table 8, the rules are respectively defined as a pair of permissions that are prohibited from being simultaneously possessed in terms of duty segregation.

For example, the rule 1 stipulates that the permissions p1 and p3 are prohibited from being simultaneously possessed.

TABLE 8

| RULE NUMBER | PERMISSION ASSIGNMENT PROHIBITION |
|---|---|
| 1 | p1, p3 |
| 2 | p2, p4 |
| 3 | p1, p6 |
| ... | ... |

A process for detecting whether or not (b) "permission that is prohibited from being simultaneously possessed by roles in terms of duty segregation (work operations)" is set in an RBAC system is described below. However, a similar process may be executed for a system other than the RBAC system.

An example of a table that is used here and indicates a correspondence between a role and permission (hereinafter referred to as a role-permission correspondence table) is represented by the following Table 9. In this table, "0"indicates that an assignment is not made, whereas "1" indicates that an assignment is made. This table indicates, for example, that the permissions p1, p4 and p5 are assigned to R1.

TABLE 9

| ROLE | p1 | p2 | p3 | p4 | p5 | p6 |
|---|---|---|---|---|---|---|
| R1 | 1 | 0 | 0 | 1 | 1 | 0 |
| R2 | 0 | 0 | 1 | 0 | 0 | 0 |
| R3 | 0 | 1 | 1 | 1 | 0 | 1 |
| ... | ... | ... | ... | ... | ... | ... |

3.3.2 Process for Detecting Permission that is Prohibited from Being Simultaneously Possessed by Roles in Terms of Duty Segregation FIG. 16 is a flowchart depicting a specific example of the process (step S1502) for checking whether or not permission that is prohibited from being simultaneously used is possessed by roles in this embodiment.

Upon termination of the process in step S1501, the flow goes to step S1601, in which the policy checking/modifying unit 116 starts the process for checking whether or not permission that violates the permission assignment prohibition rules 1403 (permission that is prohibited from being simultaneously possessed by roles) is possessed.

In step S1601, the policy checking/modifying unit 116 obtains the permission assignment prohibition rules 1403 prestored in the storage device etc. Additionally, the policy checking/modifying unit 116 obtains the role-user correspondence table, for example, depicted in Table 21, and the role-permission correspondence table, for example, depicted in Table 9 from the integrated ID managing unit 120, etc.

In step S1602, the policy checking/modifying unit 116 identifies a role to be checked by referencing the role-permission correspondence table. The following description is provided by hereinafter assuming that the ith role in the role-permission correspondence table is Ri.

In step S1603, the policy checking/modifying unit 116 identifies permissions assigned to Ri by referencing the role-permission correspondence table. The jth permission assigned to Ri is hereinafter assumed to be Pj in the role-permission correspondence table.

In step S1604, the policy checking/modifying unit 116 checks whether or not the permission Pj identified in step S1603 is registered to the permission assignment prohibition rules 1403 by referencing a simultaneous possession prohibition permission list of the permission assignment prohibition rules 1403 obtained in step S1601.

If the Pj is registered to the permission assignment prohibition rules 1403, the flow goes to step S1605.

In step S1605, the policy checking/modifying unit 116 obtains permission (hereinafter referred to as Pj') that is registered to the permission assignment prohibition rules 1403 along with Pj. Then, the policy checking/modifying unit 116 checks whether or not the permission Pj' is assigned to Ri by referencing the role-permission correspondence table.

If Pj' is assigned to Ri in the role-permission correspondence table, the flow goes to step S1606, in which the policy checking/modifying unit 116 stores the violating Ri, Pj and Pj' in the storage device, etc. as one data combination.

Then, in step S1607, the policy checking/modifying unit 116 checks whether or not permission that is assigned to Ri and not checked yet is left by referencing the role-permission correspondence table. If the permission yet to be checked is left, the flow goes to step S1608, in which the policy checking/modifying unit 116 increments j by 1. Then, the flow goes back to step S1603.

If the permission yet to be checked is not left in step S1607, the flow goes to step S1609.

In step S1609, the policy checking/modifying unit 116 checks whether or not another role to be checked is left by referencing the role-permission correspondence table. If another role to be checked is left, the flow goes to step S1610, in which the policy checking/modifying unit 116 increments i by 1. Then, the flow goes back to step S1602.

If another role to be checked is not left in step S1609, the flow goes to step S1611, in which the policy checking/modifying unit 116 terminates the process for checking whether or not permission that violates the permission assignment prohibition rules 1403 is possessed.

A violation list depicted in Table 10 can be obtained as a result of the above described process. For example, Table 10 indicates that R3 violates the rule that prohibits the permissions p2 and p4 from being simultaneously assigned.

TABLE 10

| ROLE | PERMISSION |
|---|---|
| R3 | p2, p4 |
| R5 | p6, p12 |
| ... | ... |
| Ri | pj, pj' |
| ... | ... |

As described above, the unused assignment and the assignment that violates the permission assignment prohibition rules 1403 are detected with the processes in steps S1501 and 1502. Then, the policy checking/modifying unit 116 calculates a risk evaluation value depending on the cases classified in Table 11. Risk scores are not limited to those depicted in Table 11 as a matter of course.

TABLE 11

| No | CASE | RISK | SCORE |
|---|---|---|---|
| 1 | USES TWO PERMISSIONS VIOLATING PERMISSION ASSIGNMENT PROHIBITION RULE | HIGH RISK DUE TO DUTY SEGREGATION VIOLATION | 3 |
| 2 | USES ONE OF TWO PERMISSIONS VIOLATING PERMISSION ASSIGNMENT PROHIBITION RULE | MIDDLE RISK DUE TO NON-USE DESPITE BEING VIOLATION SETTING | 2 |
| 3 | USES NONE OF TWO PERMISSIONS VIOLATING PERMISSION ASSIGNMENT PROHIBITION RULE | HIGH RISK DUE TO VIOLATION AND USING TWO ROLES | 1 |
| 4 | NON-VIOLATION ASSIGNMENT. UNUSED. | LOW RISK DUE TO NON-USE DESPITE BEING VIOLATION | 1 |

For example, the case 1 depicted in Table 11 indicates that if both of two permissions among permissions (such as the permissions depicted in Table 10) that violate the permission assignment prohibition rules 1403 and are detected with the process of step S1502 are used, the risk score is 3.

Additionally, the policy checking/modifying unit 116 calculates the total value of scores respectively obtained for roles, and outputs the total value to the display device, etc., which in turn displays the total value in a predetermined format.

FIG. 17 is a schematic diagram depicting a display example of a policy compliance level in the unsuitable permission-role assignment process. In this embodiment, permission violating the permission assignment prohibition rules 1403, unused permission, a violation description, and a risk score are displayed for each role, and their total value is displayed as a risk evaluation value (FIG. 17 depicts the case where the risk evaluation value is 7).

3.4 Unsuitable Role Detection Process

The policy checking/modifying unit 116 obtains access logs 1801, for example, depicted in Table 22 from the audit log storing unit 103. The policy checking/modifying unit 116 also obtains from the RBAC policy storing unit 113 permission-role information, for example, depicted in Table 20, and role hierarchical information 1803, for example, depicted in Table 12.

Then, the policy checking/modifying unit 116 detects an unused role from the access logs 1801, the permission-role information 1802 and the role hierarchical information 1803.

Next, the policy checking/modifying unit 116 detects an unsuitable role on the basis of the detected unused role, the role assignment prohibition rules 1804, for example, depicted in Table 5, and the permission assignment prohibition rules 1805, for example, depicted in Table 8. Then, the policy checking/modifying unit 116 puts the results of the detection into numerical values by using the prepared unsuitable role risk score table 1806, for example, depicted in Table 3.

In this embodiment, an unsuitable role is defined as follows.

(a) an unused role ∪
(b) a "role violating the role assignment prohibition rules" ∪
(c) a "role violating the permission assignment prohibition rules"

Figure 19:
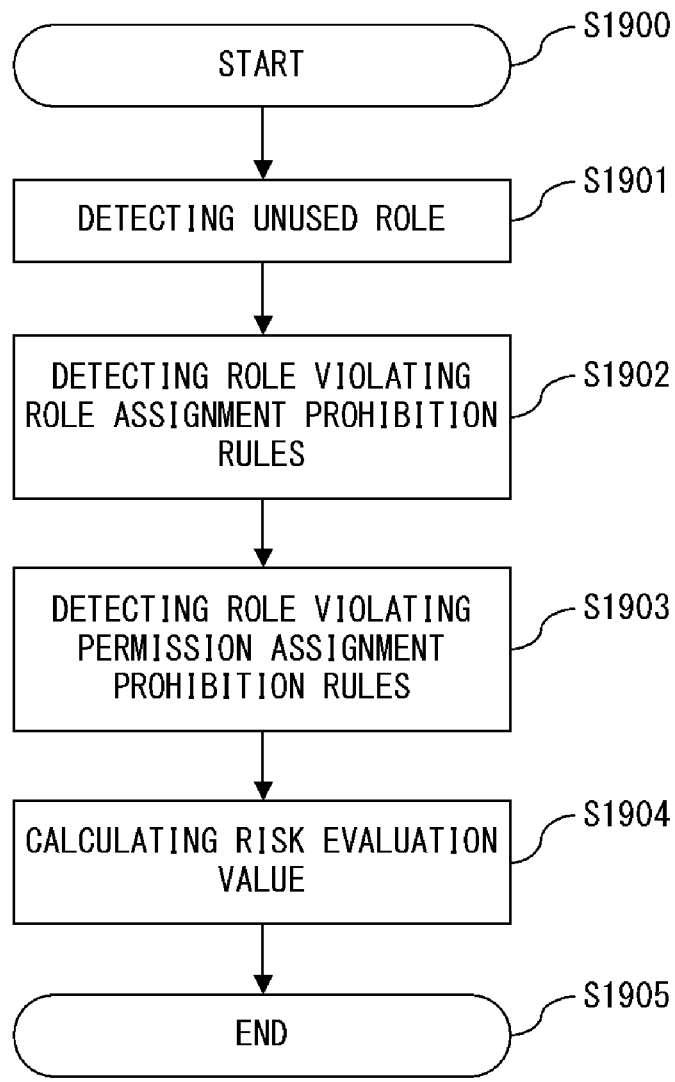
FIG. 19 is a flowchart depicting the outline of an unsuitable role detection process in the embodiment.

FIG. 19 is a flowchart depicting the outline of the unsuitable role detection process in this embodiment.

After the policy checking/modifying unit 116 obtains the access logs 1801, for example, depicted in Table 22 from the audit log storing unit 103, and also obtains the permission-role information 1802, for example, depicted in Table 20 and the role hierarchical information 1803, for example, depicted in Table 12 from the RBAC policy storing unit 113 in step S301 depicted in FIG. 3, the flow goes to step S1901, in which the policy checking/modifying unit 116 starts the unsuitable role detection process.

In step S1901, the policy checking/modifying unit 116 detects an unused role from the access log 1801 and the permission-role information 1802.

In step S1902, the policy checking/modifying unit 116 detects a role violating the role assignment prohibition rules 1804 in the role hierarchical information 1803 on the basis of the preset role assignment prohibition rules 1804.

In step S1903, the policy checking/modifying unit 116 detects a role that violates the permission assignment prohibition rules 1805 on the basis of the preset permission assignment prohibition rules 1805.

In step S1904, the policy checking/modifying unit 116 calculates a risk evaluation value from the results of the detection made in steps S1901, S1902 and S1903 on the basis of the unsuitable role risk score table 1806.

Upon termination of the above described process, the flow goes to step S304, in which the policy checking/modifying unit 116 outputs the risk evaluation value calculated as a policy compliance level to the display device, etc., which in turn displays the risk evaluation value.

3.4.1 Unused Role Detection Process

Figure 20:
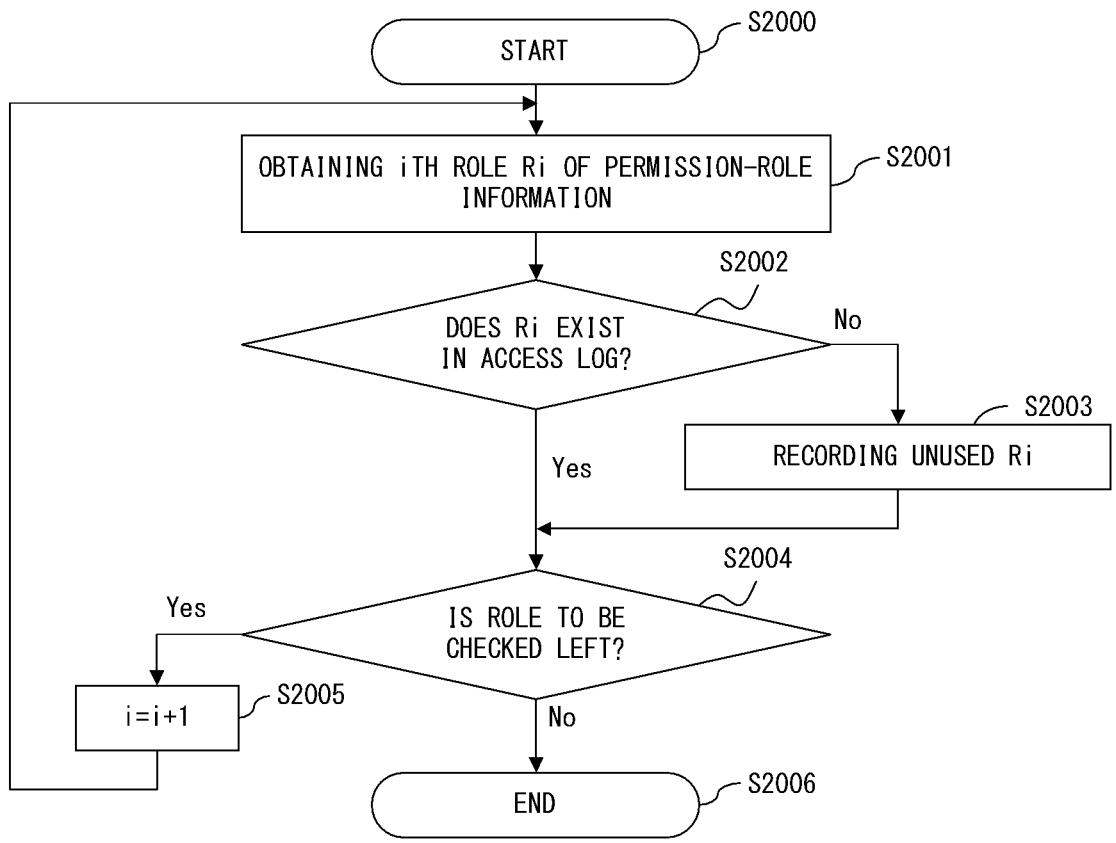
FIG. 20 is a flowchart depicting a specific example of an unused role detection process (step S1901) in the embodiment.

FIG. 20 is a flowchart depicting a specific example of the unused role detection process in this embodiment.

In step S2001, the policy checking/modifying unit 116 obtains the role Rj registered as the ith role in the permission-role information 1802 by referencing the permission-role information 1802.

In step S2002, the policy checking/modifying unit 116 checks whether or not an access log corresponding to Rj obtained in step S2001 is recorded by referencing the access logs 1801. If the access log corresponding to Rj is not recorded, the flow goes to step S2003. Alternatively, if the access log corresponding to Rj is recorded, the flow goes to step S2004.

In step S2003, the policy checking/modifying unit 116 stores Rj in the storage device, etc. as an unused role.

In step S2004, the policy checking/modifying unit 116 checks whether or not another role yet to be checked is left by referencing the permission-role information 1802. If another role yet to be checked is left, the flow goes to step S2005, in which the policy checking/modifying unit 116 increments i by 1. Then, the flow goes back to step S2001.

If another role yet to be checked is not left in step S2004, the flow goes to step S2006, in which the policy checking/modifying unit 116 terminates the unused role detection process.

Figure 21:
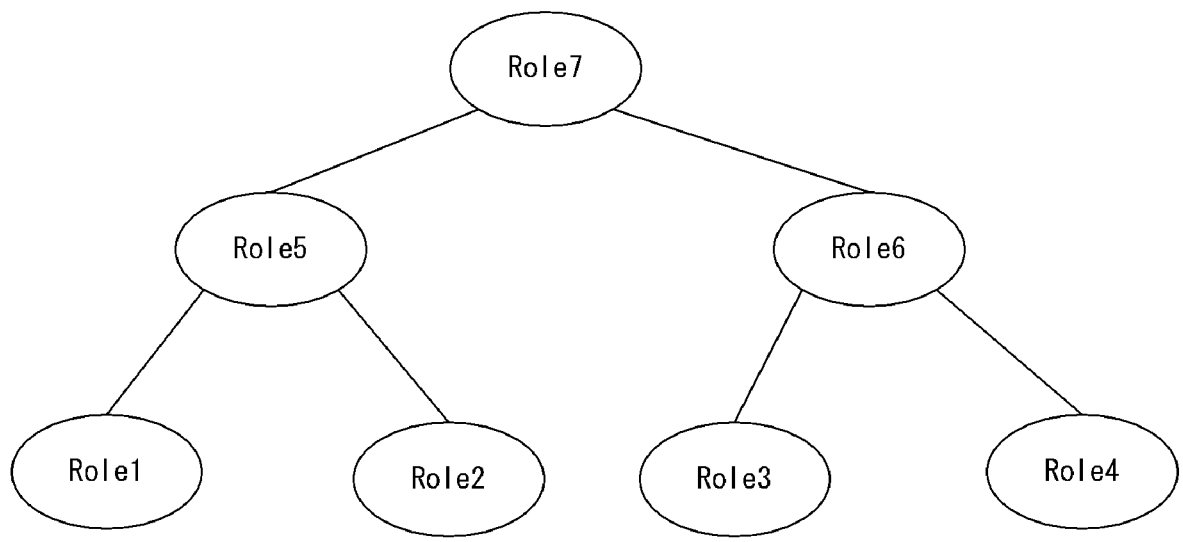
FIG. 21 is a schematic diagram depicting a configuration example of roles having a hierarchical structure in the embodiment.

3.4.2 Process for Detecting a Role that Violates the Role Assignment Prohibition Rules A configuration example of roles in this embodiment is depicted in FIG. 21. Roles having a role hierarchy of the RBAC system proposed by NIST (National Institute of Standard and Technology) are used as the roles in this embodiment. Accordingly, a higher-order role is defined as a role which has permission of a lower-order role, and a user belonging to the higher-order role is defined as a member of the lower-order role.

Since the role hierarchy of the RBAC system proposed by NIST is the conventional technique, its detailed explanation is omitted. Here, roles whose order is higher or lower than a particular role is hereinafter referred to as an ancestor or a descendant respectively.

The role hierarchy depicted in FIG. 21 is stored in the RBAC policy storing unit 113 as the role hierarchical information 1803 depicted in Table 12. For the sake of simplicity, Role Ri is represented as Ri.

TABLE 12

| SENIOR (PARENT) | JUNIOR (CHILD) |
|---|---|
| — | R7 |
| R7 | R5 |
| R7 | R6 |
| R5 | R1 |
| R5 | R2 |
| R6 | R3 |
| R6 | R4 |
| R1 | — |
| R2 | — |
| R3 | — |
| R4 | — |

With the process for detecting a role-to-user assignment prohibition rule violation in this embodiment, a role violating the role assignment prohibition rules depicted in Table 5 is detected from the role hierarchical information 1803 depicted in Table 12.

Figure 22:
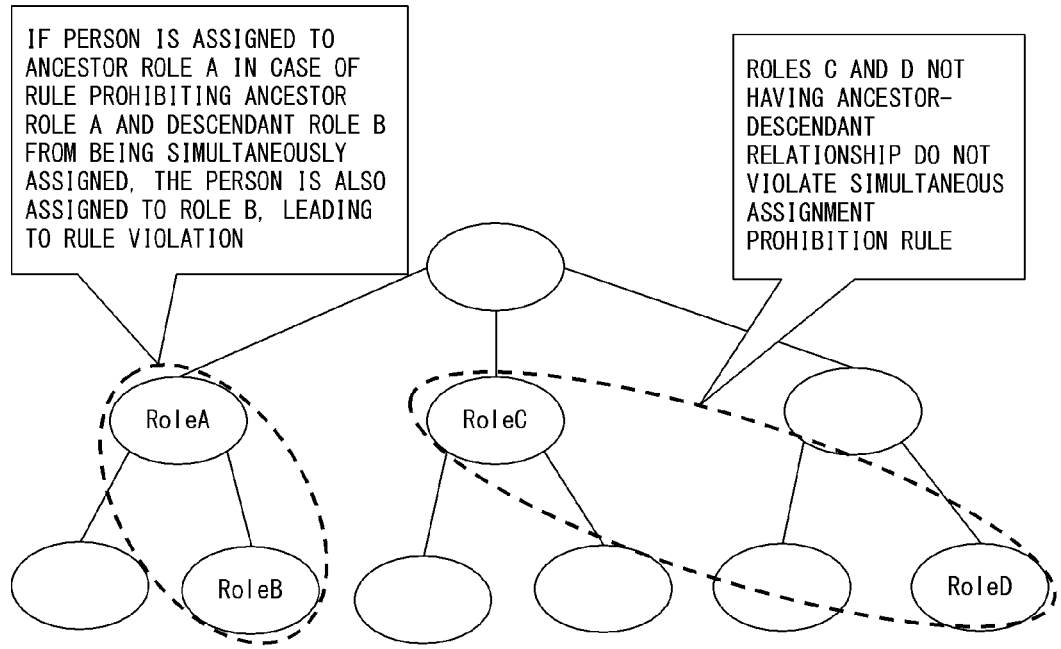
FIG. 22 is a schematic diagram for explaining a check range of roles having the hierarchical structure in the embodiment.

Roles to be detected are depicted in FIG. 22. Namely, a pair of roles that are defined in the role assignment prohibition rules 1804 and have an ancestor-descendant relationship are detected. For example, Role A and Role B depicted in FIG. 22 are detected.

With the definitions of the role hierarchy proposed by NIST, a higher-order role inherits lower-order permission. Therefore, the higher-order role includes the permissions of the lower-order role. Accordingly, if these two roles are roles violating the role assignment prohibition rules 1804, users cannot be assigned to higher-order roles (or a role whose order is further higher than the higher-order role). Since a role to which a person cannot be assigned is meaningless, such a role is detected as a role that violates the role assignment prohibition rules 1804.

Additionally, Role C and Role D, which do not have an ancestor-descendant relationship, are recognized to be roles that do not violate the role assignment prohibition rules 1804 as depicted in FIG. 22.

With the process for detecting a role that violates the role assignment prohibition rules in this embodiment, a role hierarchical tree is scanned for one role of a role pair defined by a role simultaneous assignment prohibition rule, and whether or not the other role exists as a descendant or an ancestor of the one role is checked.

Figure 23:
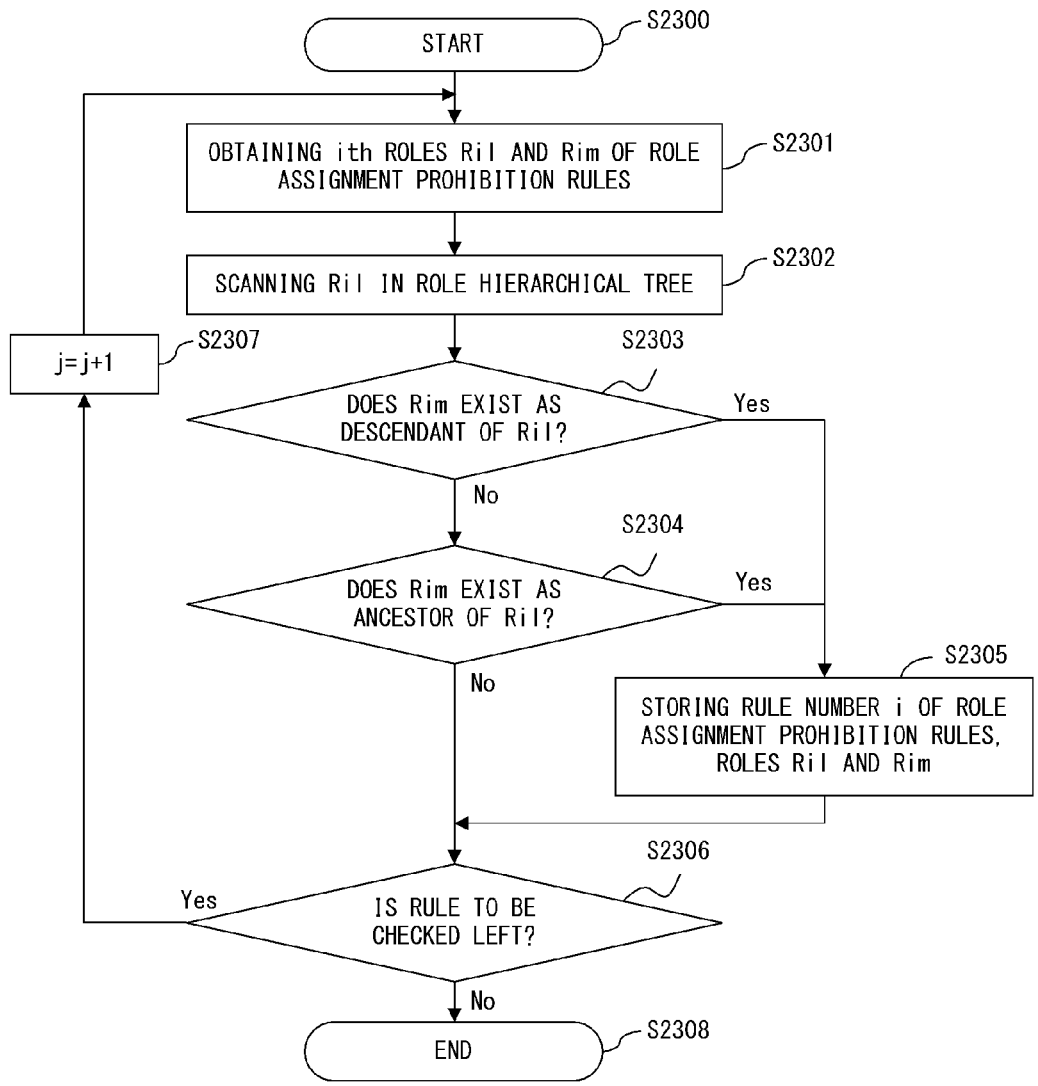
FIG. 23 is a flowchart depicting a specific example of a process (step S1902) for detecting a role that violates a role assignment prohibition rule in the embodiment.

FIG. 23 is a flowchart depicting a specific example of the process (step S1902) for detecting a role that violates the role assignment prohibition rules in this embodiment.

In step S2301, the policy checking/modifying unit 116 obtains roles Ril and Rim, which are registered as ith roles, by referencing the role assignment prohibition rules 1804.

In step S2302, the policy checking/modifying unit 116 operates and searches the role hierarchical tree for Ril obtained in step S2301 by referencing the role hierarchical information 1803.

In step S2303, the policy checking/modifying unit 116 checks whether or not Rim exists as a descendant of Ril. If Rim exists as a descendant of Ril, the flow goes to step S2305.

In step S2304, the policy checking/modifying unit 116 checks whether or not Rim exists as an ancestor of Ril. If Rim exists as an ancestor of Ril, the flow goes to step S2305.

In step S2305, the policy checking/modifying unit 116 stores the rule number i of the corresponding role assignment prohibition rule 1804, the roles Ril and Rim in the storage device, etc. after detecting Rim with the process of step S2303 or S2304.

In step S2306, the policy checking/modifying unit 116 checks whether or not another rule to be checked is left by referencing the role assignment prohibition rules 1804. If another rule to be checked is left, the flow goes to step S2307, in which the policy checking/modifying unit 116 increments i by 1. Then, the flow goes back to step S2301.

If another role to be checked is not left in step S2306, the policy checking/modifying unit 116 terminates the process for detecting a role, which violates the role assignment prohibition rules, from the role hierarchy. For example, results depicted in Table 13 are obtained,

TABLE 13

| RULE NO. | ROLE ASSIGNMENT PROHIBITION RULE |
|---|---|
| 1 | R1, R5 |
| 4 | R1, R7 |
| ... | ... |

3.4.3 Process for Detecting a Role that Violates the Permission Assignment Prohibition Rules With the process for detecting a role that violates the permission assignment prohibition rules in this embodiment, a role having a parent-child relationship is extracted from the role hierarchical information 1803, for example, depicted in Table 12, and the corresponding permission of the role is obtained from the role-permission correspondence table, for example, depicted in Table 23.

Then, whether or not the obtained permission violates the permission assignment prohibition rules 1805, for example, depicted in Table 8 is checked. Specifically, whether or not the permissions possessed by Ri and Rj, which have a parent-child relationship in the role hierarchical tree, violate the rules is checked as will be described later. Then, violated permission assignment prohibition rules are output, for example, as depicted in Table 14.

Here, the following cases (1) through (4) are considered as roles that violate the permission assignment prohibition rules.

Figure 24:
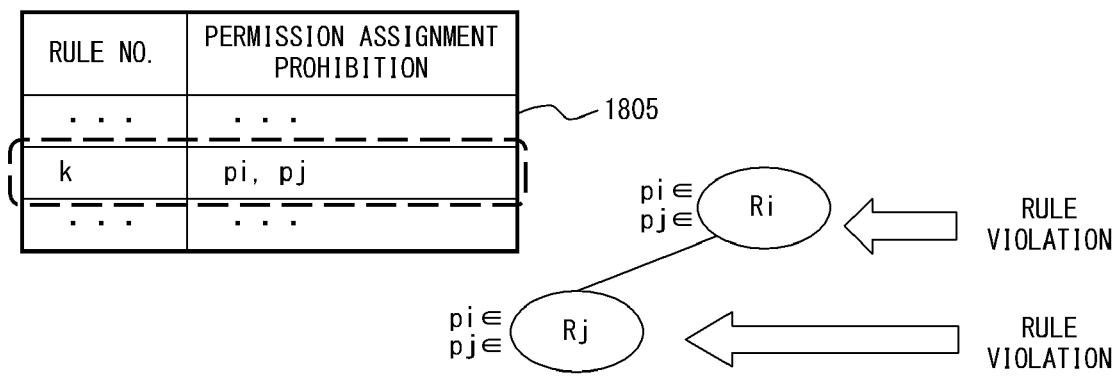
FIG. 24 is a schematic diagram for explaining a role hierarchy when both roles Ri and Rj violate a permission assignment prohibition rule.

(1) the case where both the roles Ri and Rj violate the permission assignment prohibition rules FIG. 24 is a schematic diagram for explaining the role hierarchy in the case where both the roles Ri and Rj violate the permission assignment prohibition rules. The role hierarchy depicted in FIG. 24 depicts the case where Ri having a relationship of ($pi \in Ri$) and ($pj \in Ri$) ($pi$ and $pj$ are permissions), and Rj having a relationship of ($pi \in Ri$) and ($pj \in Ri$) have a parent-child relationship.

For example, if the rule of a number k among the permission assignment prohibition rules 1805 defines the simultaneous assignment prohibition of pi and pj, the policy checking/modifying unit 116 checks whether or not Rj, which is a descendant of Ri violating the rule, is a leaf of the role hierarchical tree. If Rj is a leaf of the role hierarchical tree, it is determined as one of causes of the rule violation.

Accordingly, for the role hierarchy depicted in FIG. 24, both Ri and Rj are determined to violate the permission assignment prohibition rules 1805. If Rj is not a leaf, the policy checking/modifying unit 116 similarly checks a descendant of Rj.

Figure 25:
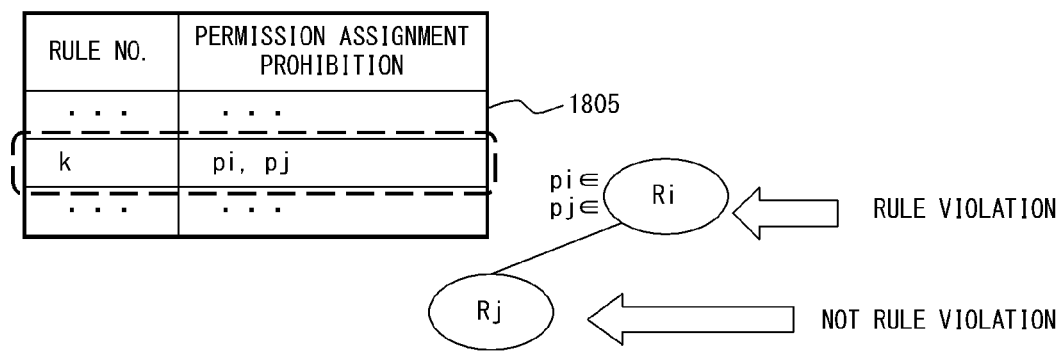
FIG. 25 is a schematic diagram for explaining a role hierarchy when the role Ri violates the permission assignment prohibition rule, and the role Rj does not violate the rule.

(2) the case where the role Ri violates the permission assignment prohibition rules and Rj does not violate the permission assignment rules FIG. 25 is a schematic diagram for explaining a role hierarchy in the case where the role Ri violates the permission assignment prohibition rules and the role Rj does not violate the permission assignment prohibition rules. The role hierarchy depicted in FIG. 25 represents the case where Ri having a relationship of (pi∈Ri) and (pj∈Ri), and Rj having neither a relationship of (pi∈Ri) nor (pj∈Ri) have a parent-child relationship.

For example, if the rule of the number k among the permission assignment prohibition rules 1805 defines the simultaneous assignment prohibition of pi and pj, Ri is determined to violate the permission assignment prohibition rules, and Rj is determined not to violate the permission assignment prohibition rules.

Here, the following three cases (a) through (c) are considered as a relationship between Rj and the permissions.

(a) "Rj possesses pi", and "Rj does not possess pj"
(b) "Rj does not possess pi", and "Rj possesses pj"
(c) "Rj does not possess pi", and "Rj does not possess pi"

In the case of (a) or (b), Rj is expected to be one of causes of the rule violation. This is because the rule violation can be resolved by deleting the permission pi or pj, which violates the rule and have been assigned to Rj, consequently pi or pj becomes enable to be deleted from the senior Ri in the role hierarchical structure of the RBAC system.

Figure 26:
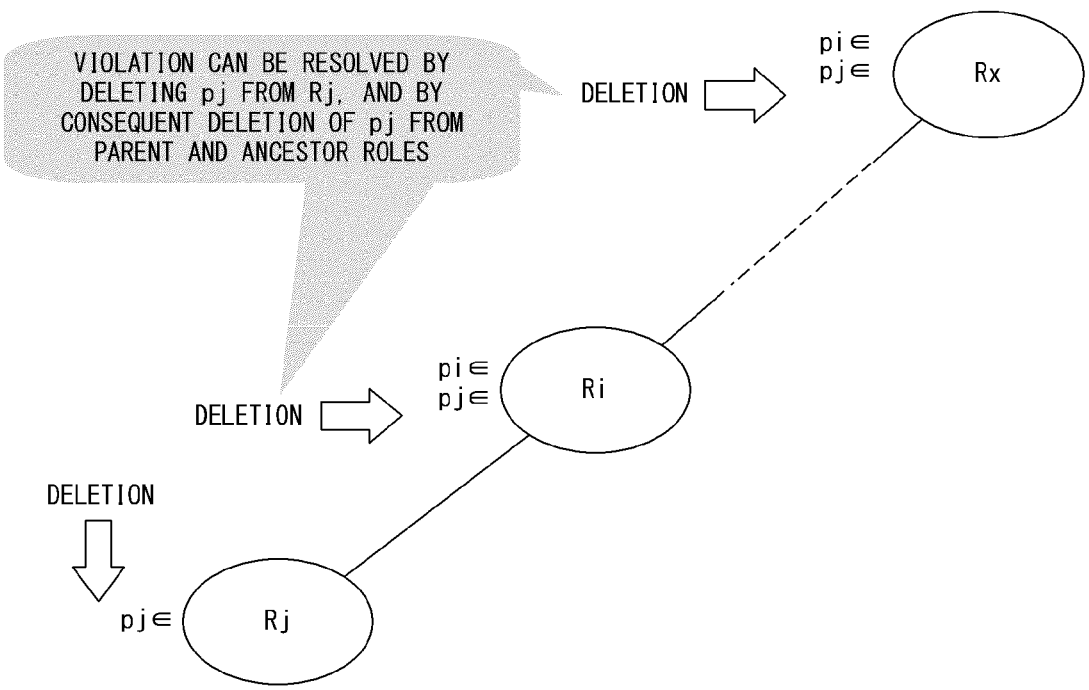
FIG. 26 is a schematic diagram for explaining a role that causes violation.

For example, if pj is assigned to Rj as depicted in FIG. 26, pj can be deleted from the roles Ri and Rn, which violate the rule, among the ancestors (Rn, Rn+1, . . . , Ri) of Rj by deleting pj from Rj. As a result, the rule violation of Ri and Rn can be resolved.

Additionally, in the case of (c), Rj (or a partial tree the order of which is lower than Rj) is not a cause of the rule violation. Therefore, Ri that is the parent of Rj, or a descendant of Ri other than Rj is expected to be a possible cause of the rule violation.

Figure 27:
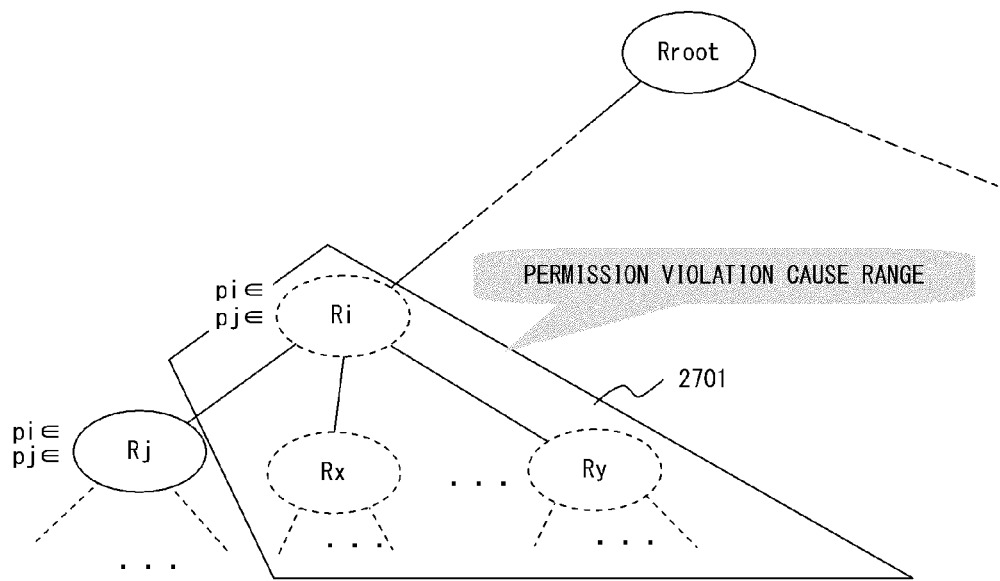
FIG. 27 is a schematic diagram for explaining a role that causes a violation.

In this case, permission violating the permission assignment prohibition rules 1805 is checked in a permission violation cause range 2701 depicted in FIG. 27.

(3) the case where neither Ri nor Rj violate the permission assignment prohibition rules Since the roles do not violate the rules in this case, the permission assignments to the roles are determined to have no problems.

(4) the case where the role Ri does not violate the permission assignment prohibition rules and the role Rj violates the rules In this case, it can be determined that the specifications of the RBAC system are violated.

FIG. 28 is a flowchart depicting a process for detecting a role that violates the permission assignment prohibition rules in this embodiment.

In step S2801, the policy checking/modifying unit 116 obtains the permissions pil and pim, which are registered to the ith rule of the permission assignment prohibition rules 1805, by referencing the permission assignment prohibition rules 1805.

In step S2802, the policy checking/modifying unit 116 obtains the root of the role hierarchical tree by referencing the role hierarchical information 1803. Then, the policy checking/modifying unit 116 checks whether or not pil or pim is assigned to the role at the root by referencing the permission-role information 1802.

If neither pil nor pim is assigned to the role at the root, the policy checking/modifying unit 116 determines that no roles violate the permission assignment prohibition rules 1805. Then, the flow goes to step S2803.

In step S2803, the policy checking/modifying unit 116 checks whether or not another rule to be checked is left by referencing the permission assignment prohibition rules 1805. If another rule to be checked is left, the flow goes to step S2804, in which the policy checking/modifying unit 116 increments i by 1. The flow then goes back to step S2801.

If another rule to be checked is not left in step S2803, the flow goes to step S2815, in which the policy checking/modifying unit 116 terminates the process for detecting a role violating the permission assignment prohibition rules.

In the meantime, if pil or pim is assigned to the role at the root in step S2802, the policy checking/modifying unit 116 determines that the role at the root violates the permission-role information 1802. Then, the flow goes to step S2805.

In step S2805, the policy checking/modifying unit 116 scans the role hierarchy up to a hierarchical level, on which the senior role Ria violates the permission and the junior role Rib does not violate the permission, by making a depth-first search for the role hierarchy. Then, the policy checking/modifying unit 116 stores the violating role, the violated rule number, and the violating permission in the violation list.

In step S2806, the policy checking/modifying unit 116 checks whether neither pil nor pim is assigned to Rib. If neither pil nor pim is assigned to Rib, the flow goes to step S2807.

In step S2807, the policy checking/modifying unit 116 checks whether or not another role yet to be examined is left in the senior role Ria. If another role yet to be examined is left, the flow goes to step S2808.

In step S2808, the policy checking/modifying unit 116 sets a sub-tree whose root is Ria (for example, the permission violation cause range 2701 depicted in FIG. 27) as an operation target. Then, the flow goes to step S2809.

If another role yet to be examined is not left in step S2807, the flow goes to step S2809.

In step S2809, the policy checking/modifying unit 116 stores the rule number i, Ria, and pil and pim, which violate the rules assigned to Ria, in the violation list. Then, the flow goes to step S2810.

In step S2810, the policy checking/modifying unit 116 checks whether or not the senior role of Ria is the role at the root. If the senior role of Ria is the role at the root, the flow goes back to step S2803. Alternatively, if the senior role of Ria is not the role at the root, the flow goes to step S2811.

In step S2811, the policy checking/modifying unit 116 sets the senior role of Ria as Ria. Then, the flow goes to step S2813.

In the meantime, if pil or pim is assigned to Rib in step S2806, the flow goes to step S2812.

In step S2812, the policy checking/modifying unit 116 stores the rule number i, Rib, and the permission (pil or pim)

that violates the rule assigned to Rib in the violation list. Then, the flow goes to step S2813.

In step S2813, the policy checking/modifying unit 116 checks whether or not another junior role yet to be examined is left in the senior role Ria. If another junior role yet to be examined is left, the flow goes to step S2814.

In step S2814, the policy checking/modifying unit 116 sets the subset whose root is Ria as an operation target. The flow then goes to step S2805.

With the above described process, results depicted in Table 14 can be obtained for the roles violating the permission assignment prohibition rules.

TABLE 14

| VIOLATED RULE NO. | ROLE CAUSING VIOLATION | PERMISSION CAUSING VIOLATION |
|---|---|---|
| 3 | Ri | P3i, P3j |
| 3 | Rj | P3i, P3j |
| ... | ... | ... |

TABLE 14-continued

| VIOLATED RULE NO. | ROLE CAUSING VIOLATION | PERMISSION CAUSING VIOLATION |
|---|---|---|
| 5 | Rj | P5i |
| ... | ... | ... |

As described above, an unused role, violating user-role assignments (such as Table 13), and violating role-permission assignments (such as Table 14) are detected with the processes in steps S1901, S1902 and S1903. The policy checking/modifying unit 116 calculates a risk evaluation value depending on the cases classified in the next table. Risk scores are not limited to those depicted in Table 15 as a matter of course.

TABLE 15

| No | USE/ UNUSE OF ROLE | ROLE ASSIGNMENT PROHIBITION SETTING VIOLATION | PERMISSION ASSIGNMENT PROHIBITION SETTING | | DESCRIPTION | RISK SCORE |
|---|---|---|---|---|---|---|
| | | | SETTING VIOLATION | CAUSE OF SETTING VIOLATION | | |
| 1 | UNUSED | — | — | — | LOW RISK DUE TO NON-VIOLATION AND NON-USE | 1 |
| 2 | UNUSED | — | — | CAUSE | MIDDLE RISK DUE TO CAUSING SETTING VIOLATION OF HIGHER-ORDER ROLE DESPITE BEING NON-VIOLATION | 2 |
| 3 | UNUSED | — | VIOLATION | — | HIGH RISK DUE TO PERMISSION ASSIGNMENT VIOLATION | 3 |
| 4 | UNUSED | — | VIOLATION | CAUSE | VIOLATION DUE TO THIS PERMISSION ASSIGNMENT | 3 |
| 5 | UNUSED | VIOLATION | — | — | ROLE ASSIGNMENT SETTING VIOLATION | 3 |
| 6 | UNUSED | VIOLATION | — | CAUSE | PERMISSION ASSIGNMENT NON-VIOLATION DESPITE BEING ROLE ASSIGNMENT PROHIBITION VIOLATION, AND CAUSES PERMISSION ASSIGNMENT VIOLATION OF HIGHER-ORDER ROLE ... DOES NOT USE ROLE. | 3 |
| 7 | UNUSED | VIOLATION | VIOLATION | — | ROLE ASSIGNMENT AND PERMISSION ASSIGNMENT VIOLATIONS. DOES NOT USE ROLE. | 4 |
| 8 | UNUSED | VIOLATION | VIOLATION | CAUSE | ROLE ASSIGNMENT AND PERMISSION ASSIGNMENT VIOLATIONS. PERMISSION ASSIGNMENT CAUSES VIOLATION OF HIGHER-ORDER ROLE ... DOES NOT USE ROLE. | 4 |
| 9 | USED | — | — | — | USES ROLE. | 0 |
| 10 | USED | — | — | CAUSE | MIDDLE RISK DUE TO CAUSING OF SETTING VIOLATION OF HIGHER-ORDER ROLE DESPITE BEING NON-VIOLATION | 2 |
| 11 | USED | — | VIOLATION | — | HIGH RISK DUE TO PERMISSION ASSIGNMENT VIOLATION AND USED | 4 |
| 12 | USED | — | VIOLATION | CAUSE | VIOLATION DUE TO THIS PERMISSION ASSIGNMEN, AND BEING USED | 4 |
| 13 | USED | VIOLATION | — | — | ROLE ASSIGNMENT SETTING VIOLATION, AND BEING USED | 4 |
| 14 | USED | VIOLATION | — | CAUSE | ROLE ASSIGNMENT PROHIBITION VIOLATION, PERMISSION ASSIGNMENT NON-VIOLATION, BUT CAUSES | 4 |

TABLE 15-continued

| No | USE/ UNUSE OF ROLE | ROLE ASSIGNMENT PROHIBITION SETTING VIOLATION | PERMISSION ASSIGNMENT PROHIBITION SETTING SETTING VIOLATION | CAUSE OF SETTING VIOLATION | DESCRIPTION | RISK SCORE |
|---|---|---|---|---|---|---|
| 15 | USED | VIOLATION | VIOLATION | — | PERMISSION ASSIGNMENT VIOLATION OF HIGHER-ORDER ROLE . . . USES THE ROLE. ROLE ASSIGNMENT AND PERMISSION ASSIGNMENT VIOLATIONS. USES THE ROLE | 5 |
| 16 | USED | VIOLATION | VIOLATION | CAUSE | ROLE ASSIGNMENT AND PERMISSION ASSIGNMENT VIOLATIONS. PERMISSION ASSIGNMENT CAUSES VIOLATION OF HIGHER-ORDER ROLE . . . USES THE ROLE. | 5 |

In Table 15, the case where the setting of a role itself is a violation due to the setting of permission assigned to the role, or the case where permission assignment to a higher-order role is a violation although the role itself is not a violation is defined as a "cause" of a setting violation.

Additionally, the policy checking/modifying unit 116 calculates the total of scores obtained for the roles, outputs the total to the display device, etc., which in turn displays the total in a predetermined format.

Figure 29:
FIG. 29 is a schematic diagram depicting a configuration example of a screen for displaying a policy compliance level in an unsuitable role detection process in the embodiment.

FIG. 29 is a schematic diagram depicting a display example of a policy compliance level in the unsuitable role detection process. In this embodiment, the use/nonuse of a role, a role prohibited based on the role assignment prohibition rules 1804, permission prohibited based on the permission assignment prohibition rules 1805, a violation description, and a risk score are displayed for each role, and their total is displayed as a risk evaluation value (FIG. 29 depicts the case where the risk evaluation value is 72).

3.5 Duty Segregation Violation Detection Process

If an unsuitable setting violating duty segregation is made in the access right management, it causes an illegal access, information leakage or falsification. Accordingly, access right settings must be suitably managed.

In this embodiment, access right settings are suitably managed by defining duty segregation rules utilizing the role assignment prohibition rules 3001, for example, depicted in Table 5, the permission-to-role assignment prohibition rules 3002, for example, depicted in Table 8, and permission-to-user assignment prohibition rules 3003 to be described later, and by detecting a rule violation from access right setting information (the user-role assignment information and the permission-role assignment information).

In this embodiment, the duty segregation rules are defined as follows.

(a) an "assignment to a user, which violates the role assignment prohibition rules" ∪

(b) an "assignment to a role, which violates the permission assignment prohibition rules" ∪

(c) an "assignment to a user, which violates the permission assignment prohibition rules"

The process for detecting (a) an "assignment to a user, which violates the role assignment prohibition rules", and the process for detecting (b) an "assignment to a role, which violates the permission assignment prohibition rules" are already described in sections 2.2 and 2.3. Therefore, their explanations are omitted.

3.5.1 Process for Detecting an Assignment to a User, Which Violates the Permission Assignment Prohibition Rules The policy checking/modifying unit 116 reads the permission-role information 3001 from the RBAC policy storing unit 113, and also reads the user information 3002 from the integrated ID managing unit 120. The permission-role information 3001 is, for example, the role-permission correspondence table depicted in Table 9, whereas the user information 3002 is, for example, the role-user correspondence table depicted in Table 21.

Then, the policy checking/modifying unit 116 creates a permission list (ACL) for each user, for example, depicted in Table 16 from the permission-role information 3001 and the user information 3002. Then, the policy checking/modifying unit 116 detects an assignment to a user, which violates the permission assignment prohibition rules, in the ACL on the basis of the permission assignment prohibition rules, for example, depicted in Table 17.

TABLE 16

| USER ID | p1 | p2 | p3 | p4 | p5 |
|---|---|---|---|---|---|
| U1 | 1 | 0 | 0 | 1 | 1 |
| U2 | 1 | 1 | 0 | 1 | 1 |
| U3 | 0 | 1 | 1 | 0 | 1 |
| ... | ... | ... | ... | ... | ... |

TABLE 17

| RULE NO. | ASSIGNMENT PROHIBITION PERMISSIONS |
|---|---|
| 1 | p2, p4 |
| 2 | p3, p8 |
| 3 | p7, p8 |
| ... | ... |

Figure 31:
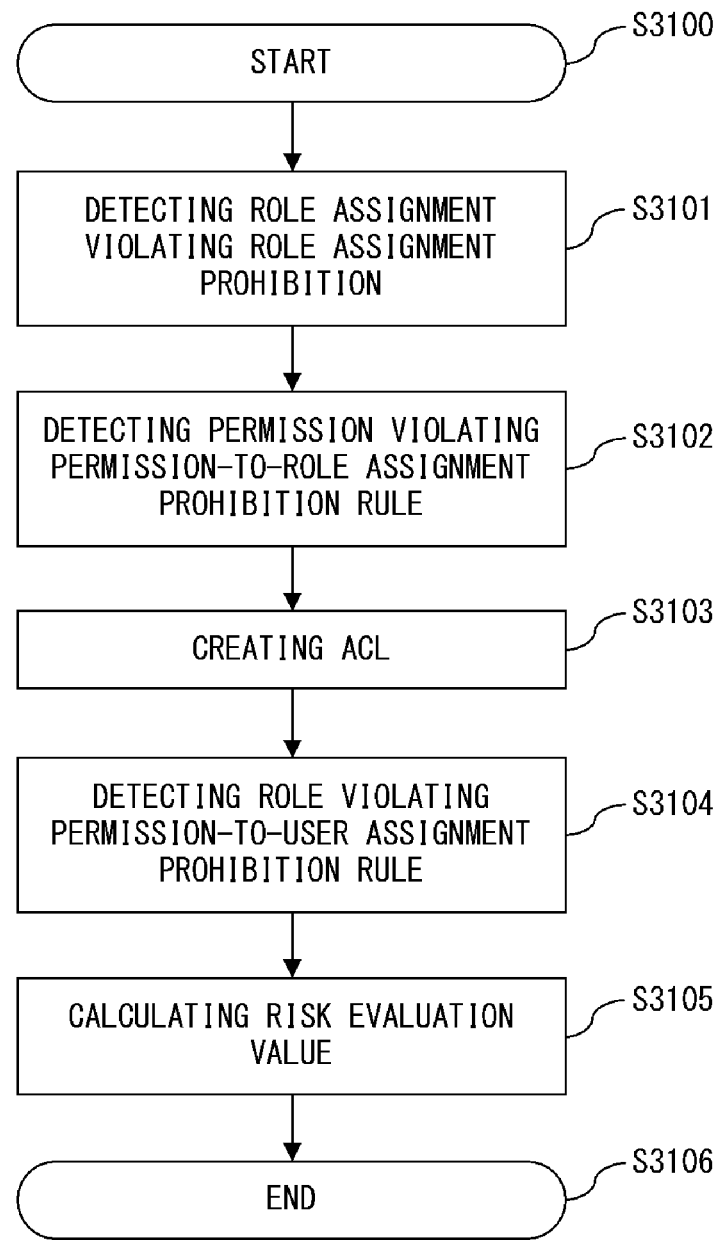
FIG. 31 is a flowchart depicting the outline of a duty segregation violation detection process in the embodiment.

FIG. 31 is a flowchart depicting the outline of the duty segregation violation detection process in this embodiment.

After the policy checking/modifying unit 116 obtains, for example, the permission-role information 3001 and the user information 3002 respectively from the RBAC policy storing unit 113 and the integrated ID managing unit 120 in step S301 depicted in FIG. 3, the flow goes to step S3101, in which the policy checking/modifying unit 116 starts the duty segregation violation detection process.

In step S3101, the policy checking/modifying unit 116 detects a role assignment violating the role assignment prohibition in the user-to-role assignment on the basis of the preset role assignment prohibition rules 903.

In step S3102, the policy checking/modifying unit 116 detects a permission assignment violating the permission assignment prohibition in the permission-to-role assignment on the basis of the preset permission-to-role assignment prohibition rules 1403.

In step S3103, the policy checking/modifying unit 116 creates a permission list (ACL) for each user from the permission-role information 3001 and the user information 3002.

In step S3104, the policy checking/modifying unit 116 detects a permission assignment violating the permission assignment prohibition in the permission-to-user assignment on the basis of the preset permission-to-user assignment prohibition rules.

In step S3105, the policy checking/modifying unit 116 sets risk scores for the results of the detection made in steps S3101, S3102 and S3104.

Upon termination of the above described process, the flow goes to step S304, in which the policy checking/modifying unit 116 outputs the risk evaluation value set as a policy compliance level to the display device, etc., which in turn displays the risk evaluation value.

FIG. 32 is a flowchart depicting an ACL creation process in this embodiment.

In step S3201, the policy checking/modifying unit 116 sorts each user ID in the role-user correspondence table by referencing the role-user correspondence table, and creates a list of roles to which a user belongs for each user ID.

Instep S3202, the policy checking/modifying unit 116 sets Ui as user IDs to be processed subsequently.

In step S3203, the policy checking/modifying unit 116 assigns the permissions possessed by all the roles, to which Ui belongs, to the user, and stores the permissions in the ACL. For example, in Table 16, the permissions p1, p4 and p5 are assigned to U1.

In step S3204, the policy checking/modifying unit 116 checks whether or not another user ID to be checked is left by referencing the list created in step S3201. If another user ID to be checked is left, the flow goes to step S3205, in which the policy checking/modifying unit 116 increments i by 1. Then, the flow goes to step S3202.

If another user ID to be checked is not left in step S3204, the flow goes to step S3206, in which the policy checking/modifying unit 116 terminates the ACL creation process.

Figure 33:
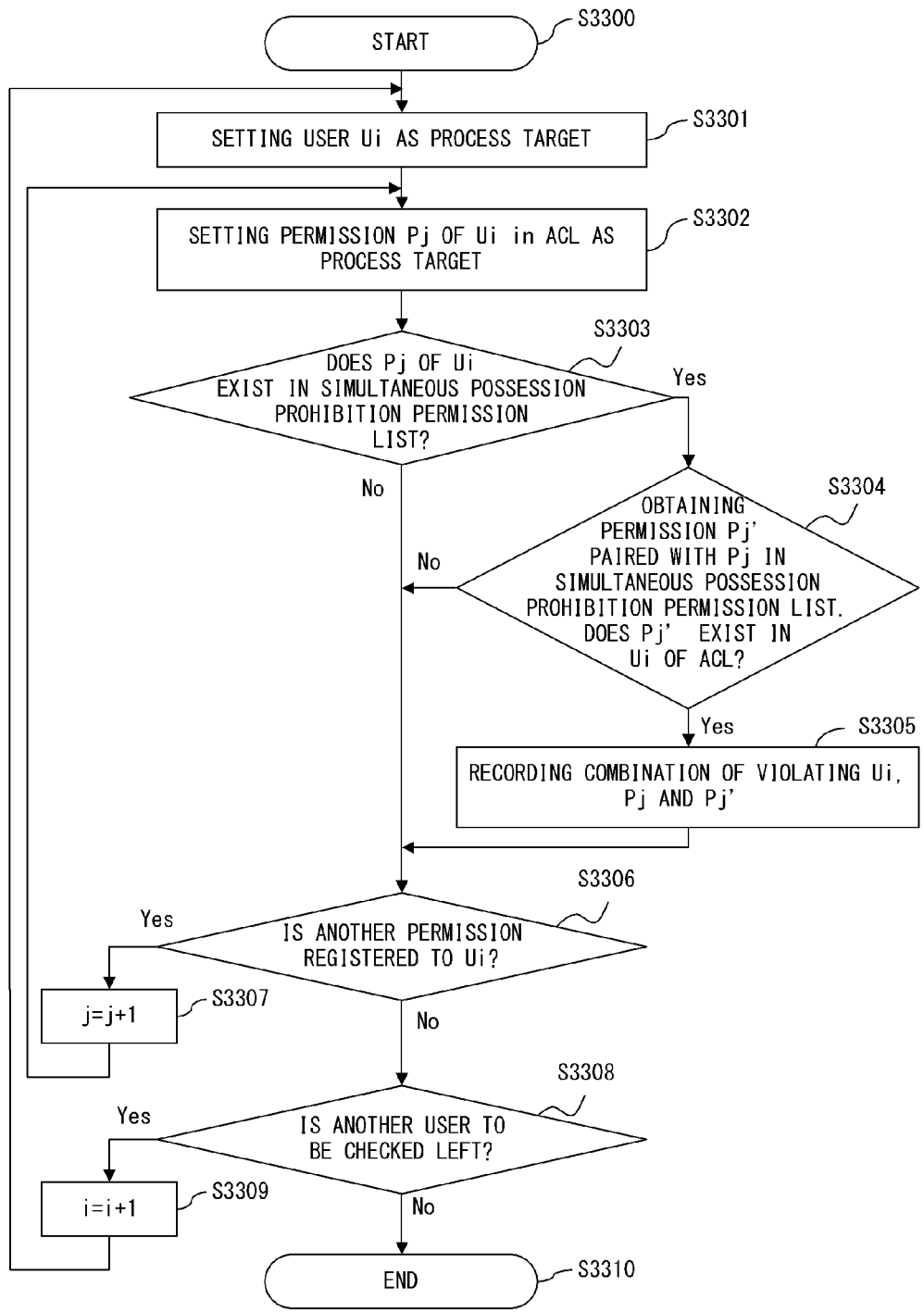
FIG. 33 is a flowchart depicting a process for detecting an assignment to a user, which violates a permission assignment prohibition rule in the embodiment.

FIG. 33 is a flowchart depicting a process for detecting an assignment that violates the permission-to-user assignment prohibition rules in this embodiment.

In step S3301, the policy checking/modifying unit 116 sets Ui as a user ID to be processed subsequently by referencing the ACL. Then, in step S3302, the policy checking/modifying unit 116 sets the permission Pj of Ui as a target to be processed subsequently by referencing the ACL.

In step S3303, the policy checking/modifying unit 116 checks whether or not Pj is registered as permission that is prohibited from being simultaneously possessed and registered to the rules by referencing the permission-to-user assignment prohibition rules 3003.

If Pj is registered as the permission that is prohibited from being simultaneously possessed, the flow goes to step S3304.

In step S3304, the policy checking/modifying unit 116 obtains the permission Pj', which is registered as a pair with Pj, by referencing the permission-to-user assignment prohibition rules 3003. Then, the policy checking/modifying unit 116 checks whether or not Pj' is registered to Ui by referencing the ACL.

If Pj' is registered to Ui, the flow goes to step S3305, in which the policy checking/modifying unit 116 stores the violating Ui, Pj and Pj' in the storage device, etc. as one data combination.

In step S3306, the policy checking/modifying unit 116 checks whether or not another permission is registered to Ui by referencing the ACL. If another permission is registered, the flow goes to step S3307, in which the policy checking/modifying unit 116 increments i by 1. Then, the flow goes back to step S3302.

If another permission is not registered in step S3306, the flow goes to step S3308.

In step S3308, the policy checking/modifying unit 116 checks whether or not another user to be checked is left by referencing the ACL. If another user to be checked is left, the flow goes to step S3309, in which the policy checking/modifying unit 116 increments i by 1. Then, the flow goes back to step S3301.

If another user to be checked is not left in step S3308, the flow goes to step S3310, in which the policy checking/modifying unit 116 terminates the process for detecting an assignment that violates the permission-to-user assignment prohibition rules 3003.

With the above described processes, for example, the user-permission assignment list depicted in Table 18 is obtained.

TABLE 18

| USER | PERMISSION |
|---|---|
| U2 | p2, p4 |
| U7 | p3, p8 |
| ... | ... |
| Ui | pj, pj' |
| ... | ... |

After obtaining the results of the detection made in steps S3101, S3102 and S3104 as described above, the policy checking/modifying unit 116 sets scores respectively for the results of the detection, and enables a risk calculation.

Since all the detection results obtained with these processes are expected to have a high risk, the risk scores of the detection results are assumed to be 3 in this embodiment. The policy checking/modifying unit 116 calculates their total value, outputs the calculated value to the display device, etc., which in turn displays the total value in a predetermined format.

FIG. 34 is a schematic diagram depicting a display example of a policy compliance level in the duty segregation violation detection process. In this embodiment, a violation rule type (the permission-to-role assignment prohibition rules 3002 or the permission-to-user assignment prohibition rules 3003), a violating user, an assignment prohibition role based on the role assignment prohibition rules 1804, a violating role, assignment prohibition permission based on the permission assignment prohibition rules 3002 or 3003, a violation description, and a risk score are displayed, and their total value is displayed as a risk evaluation value (FIG. 34 depicts the case where the risk evaluation value is 84).

4.1 Policy Compliance Level Measurement Method

A method for measuring the policy compliance level of a system by using the detection method and the risk scoring described in the above sections 3.1 through 3.5 is described. With the following procedures, total score of risks that can be compared can be calculated even among the systems in which the number of users and the number of pieces of access right setting information are different.

4.1.1. Unsuitable User Account

Numerical values of systems can be compared by being divided by the number of users of each system (the number of users in the user list like Table 2). The numerical value ranges from 0 to 4 of the real numbers.

4.1.2 Unsuitable User-Role Assignment

Assuming that the size (the number of rows) of an input user-role correspondence table is m (m is a natural number equal to or large than 1), the number of users is n (n is a natural number equal to or larger than 1), and the number of role assignment prohibition rules is k (k is a natural number equal to or larger than 1), numerical values of systems can be compared by dividing the results of the calculation described in the section 3.2 by a possible number of violations m+k*n. FIG. 35 depicts an example of the user-role correspondence table.

4.1.3 Unsuitable Permission-Role Assignment

Assuming that the size (the number of rows) of an input role-permission correspondence table is q (q is a natural number equal to or large than 1), the number of roles is r (r is a natural number equal to or larger than 1), and the number of permission assignment prohibition rules is 1 (1 is a natural number equal to or larger than 1), numerical values of systems can be compared by dividing the results of the calculation described in the section 3.3 by a possible number of violations q+l*r. FIG. 36 depicts an example of the role-permission correspondence table.

4.1.4. Unnecessary Role

Assuming that the size (the number of rows) of an input role-permission correspondence table is q (q is a natural number equal to or large than 1), the number of roles is r, the number of role assignment prohibition rules is k, and the number of permission assignment prohibition rules is 1, numerical values of system scan be compared by dividing output results by a possible number of violations r+k*r+l*r.

4.1.5 Duty Segregation Violation

Assuming that the number of users is n, the number of role assignment prohibition rules is k, the number of roles is r, the number of permission assignment prohibition rules is 1, and the number of permission-to-user assignment prohibition rules is s (s is a natural number equal to or larger than 1), numerical values of systems can be compared by dividing a possible number of violations resulting from the calculation described in the section 3.5 by k*n+l*r+s*n.

4.2 Access Right Management Overall Evaluation Value Calculation Method

By calculating the sum of the results obtained in the above described sections 4.1.1 through 4.1.5, an overall evaluation value in the access right management can be obtained to compare the degree of thoroughness of management. Alternatively, the sum can be calculated by assigning weights as follows.

overall management evaluation value=$K1 \times a/4 + K2 \times b/3 + K3 \times c/1 + K4 \times d/3 + K5 \times e/3$ where K1, K2, K3, K4 and K5 are coefficients, a is the risk evaluation value of an unsuitable user account, b is the risk evaluation value of an unsuitable user-role assignment, c is the risk evaluation value of an unnecessary role, d is the risk evaluation value of an unsuitable permission-role assignment, and e is the risk evaluation value of a duty segregation violation.

Assuming {K1,K2,K3,K4,K5}={3,2,1,2,3}, Table 19 is obtained.

TABLE 19

| | a. UNSUITABLE USER ACCOUNT | b. UNSUITABLE USER-ROLE ASSIGNMENT | c. UNNECES-SARY ROLE | d. UNSUITABLE PERMISSION-ROLE ASSSIGNMENT | e. DUTY SEGREGATION VIOLATION | TOTAL MANAGEMENT EVALUTION VALUE OF ACCESS RIGHT MANAGEMENT |
|---|---|---|---|---|---|---|
| SERVER A | 1.2 | 1.5 | 0.3 | 2.1 | 1.5 | 5.1 |
| SERVER B | 3 | 2 | 0.4 | 1.7 | 1.2 | 6.3 |
| . . . | . . . | . . . | . . . | . . . | . . . | . . . |

Figure 37:
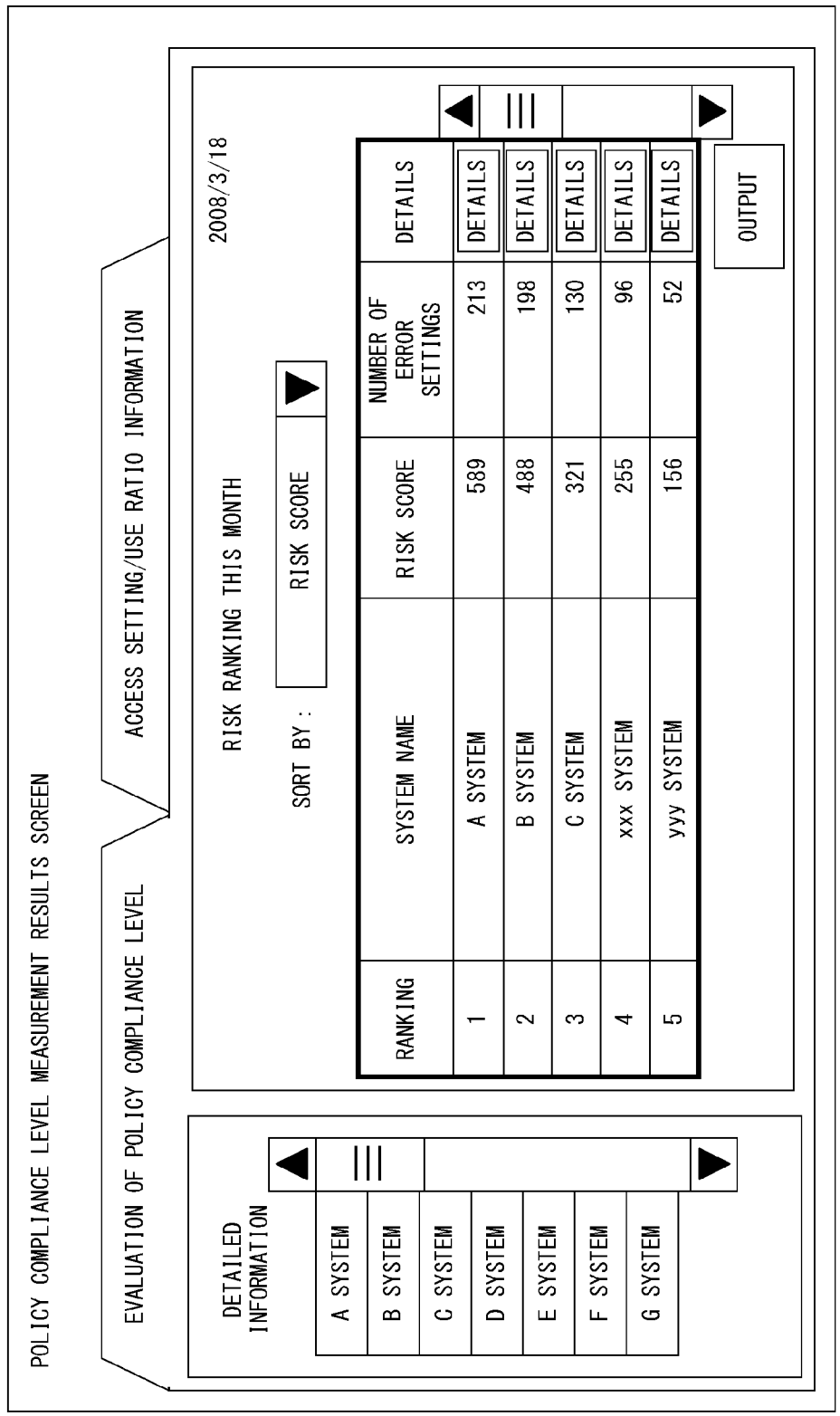
FIG. 37 is a schematic diagram depicting a configuration example of a screen for displaying measurement results of a policy compliance level for each server in the embodiment.

FIG. 37 is a schematic diagram depicting a configuration example of a screen for displaying measurement results of a policy compliance level for each server.

With the press of a "details" button on the screen depicted in FIG. 37, detailed information of each system can be also displayed. FIG. 38 depicts a screen of policy compliance level evaluation results of each system, which is displayed with the press of the "details" button.

Figure 39:
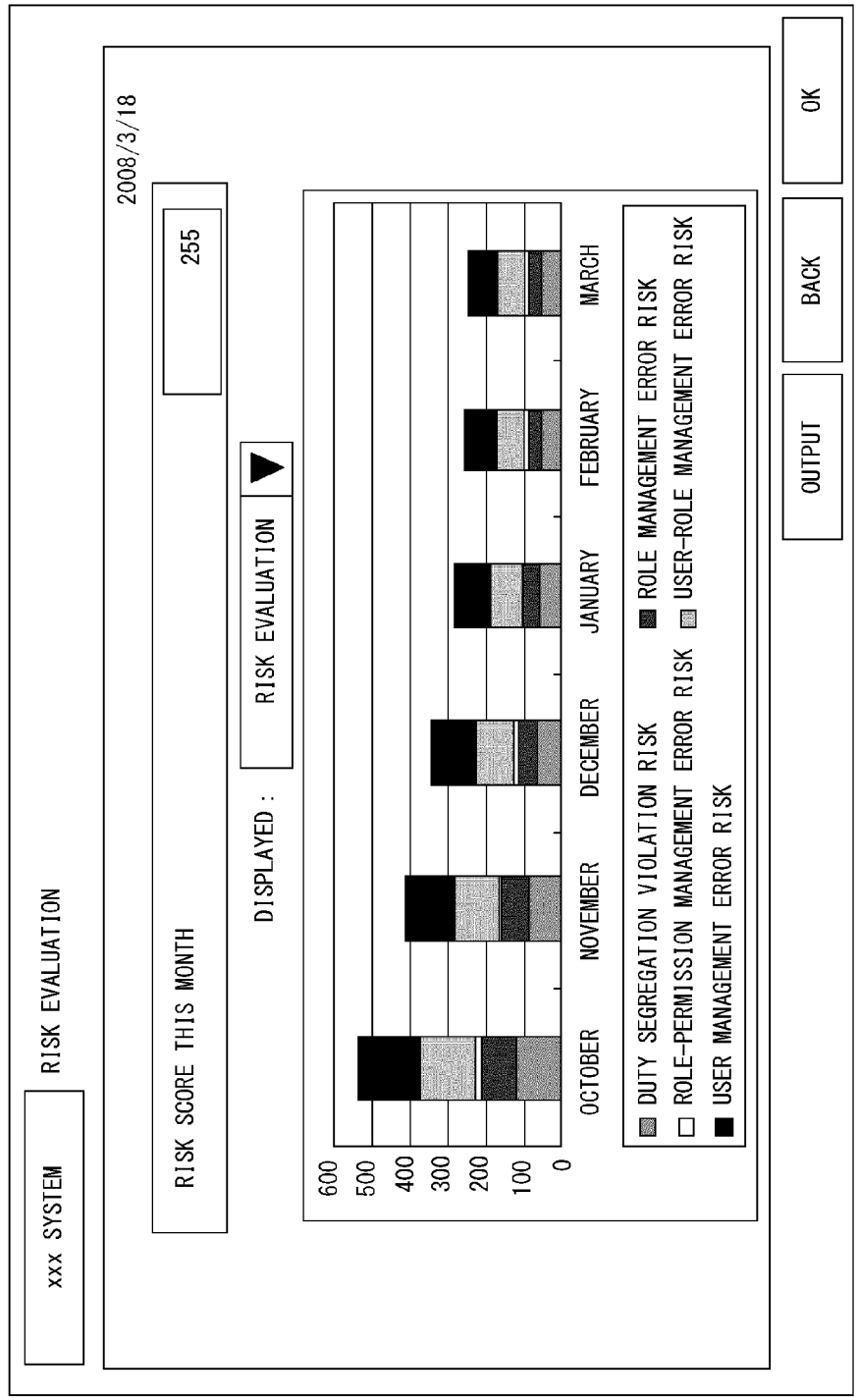
FIG. 39 is a schematic diagram depicting a configuration example of a screen for a risk value transition, which is displayed when a monthly transition display button is pressed.

Additionally, transitions of risk values of entries depicted in FIG. 39 maybe displayed with the press of a "monthly transition display" button on the above described screen.

5. Method for Checking Whether or Not there is a Wasteful Access Right Setting

Access right information that is set but not used is included in access right settings. This is expected to be unnecessary from the viewpoint of the principle of the least privilege of security or management cost. A method for detecting such a wasteful setting is described below.

Figure 40:
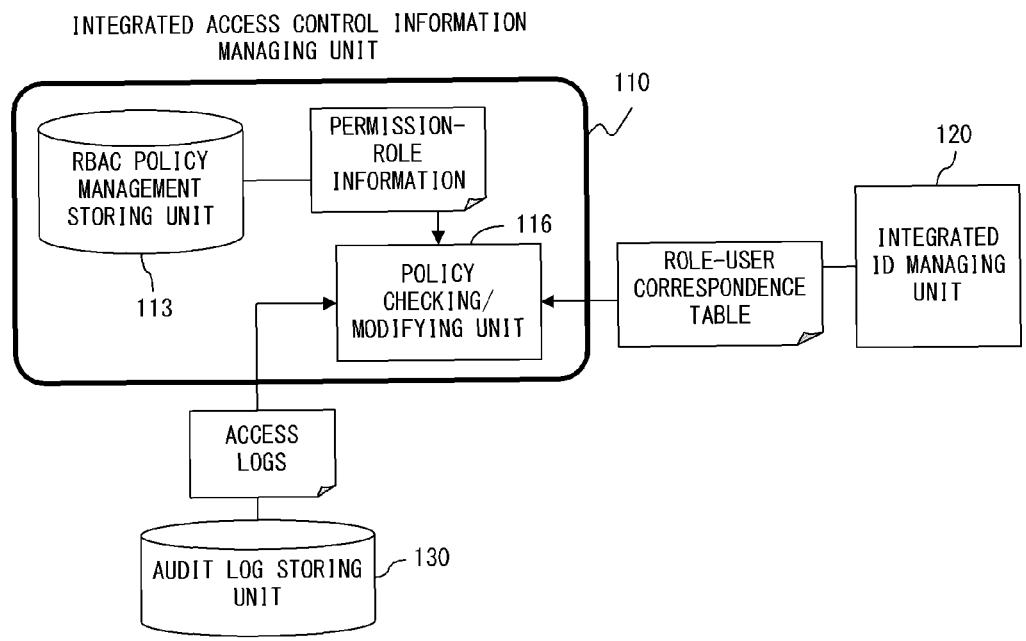
FIG. 40 is a block diagram depicting the outline of a configuration example for detecting a wasteful access right setting in the embodiment.

FIG. 40 is a schematic diagram depicting the outline of a configuration example in the case where a wasteful access right setting is detected.

The policy checking/modifying unit 116 obtains permission-role information, for example depicted in Table 20, the role-user correspondence table, for example, depicted in Table 21, and access logs, for example, depicted in Table 22 respectively from the RBAC policy storing unit 113, the integrated ID managing unit 120, and the audit log storing unit 130, and detects the following assignment and role with the detecting method described below.

(a) a permission assignment that is set for a user or a role and is not used (b) an unused role An access log is used for the detecting method. For (a) an access right that is given to a user or a role but not used is detected. For (b), an unused role is detected. Whether or not there is a wasteful access right setting is checked by detecting such an assignment and a role.

5.1 Unused Permission Set for a User or a Role

Here, a method for detecting unused permission set for a user or role is described. The setting information of access rights are data depicted in Tables 20 and 21. Moreover, the information depicted in Table 22 is assumed to be obtained as access logs.

TABLE 20

| ROLE | RESOURCE | ACTION |
|---|---|---|
| R1 | X1 | r |
| R1 | X2 | r |
| R1 | X3 | r/w |
| . | . | . |
| . | . | . |
| . | . | . |
| R2 | Y1 | r |
| . | . | . |
| . | . | . |
| . | . | . |

TABLE 21

| ROLE | USER ID (UID) |
|---|---|
| R1 | taro |
| R1 | jiro |
| R1 | hanako |
| . | . |
| . | . |
| . | . |
| R2 | maeda |
| . | . |
| . | . |
| . | . |

TABLE 22

| | ENTITY | | | | | ACCESS CONTROL |
|---|---|---|---|---|---|---|
| DATE AND TIME | UID | ROLE | SITE | RESOURCE | ACTION | RESULT |
| 2008/03/26/1200 | taro | R1 | server1 | X1 | write | deny |
| 2008/03/26/0903 | taro | R1 | server1 | X3 | write | allow |
| . | . | . | . | . | . | . |
| . | . | . | . | . | . | . |
| . | . | . | . | . | . | . |

It is desirable that access log information whose duration is long enough, for example, one month, three months, six months, as the duration of an access log to be targeted etc. is used.

FIG. 41 is a flowchart depicting the process for detecting unused permission set for a user or a role. Permission is a pair of information composed of a resource and an action.

In step S4101, the policy checking/modifying unit 116 obtains access right setting information and access logs respectively from the RBAC policy storing unit 113 and the audit log storing unit 130.

In step S4102, the policy checking/modifying unit 116 set the ith role Ri, which is registered to the access right setting information, as a subsequent process target by referencing the access right setting information. Table 23 obtained by changing the representation of Table 20 is used in the subsequent process for ease of explanation.

TABLE 23

| ROLE | PERMISSION |
|---|---|
| R1 | P11 |
| R1 | P12 |

TABLE 23-continued

| ROLE | PERMISSION |
|---|---|
| R1 | P13 |
| . | . |
| . | . |
| . | . |
| Ri | Pi1 |
| ... | ... |
| Ri | Pij |
| . | . |
| . | . |
| . | . |

In step S4103, the policy checking/modifying unit 116 sets the jth permission Pij, which is registered to Ri, as a subsequent process target by referencing the access right setting information.

In step S4104, the policy checking/modifying unit 116 checks whether or not the access log of Pij is stored in the access logs by referencing the access logs. If the access log of Pij is not stored, the flow goes to step S4105.

In step S4105, the policy checking/modifying unit 116 stores Ri and Pij in the storage device, etc. Then, the flow goes to step S4106.

In step S4106, the policy checking/modifying unit 116 checks whether or not another permission to be checked is registered to Ri by referencing the access right setting information. If another permission to be checked is registered, the flow goes to step S4107.

In step S4107, the policy checking/modifying unit 116 increments j by 1. Then, the flow goes back to step S4103.

If another permission to be checked is not registered in step S4106, the flow goes to step S4108, in which the policy checking/modifying unit 116 checks whether or not another role to be checked is left by referencing the access right setting information.

If another role to be checked is left, the flow goes to step S4109, in which the policy checking/modifying unit 116 increments i by 1. Then, the flow goes back to step S4102.

If another role to be checked is not left in step S4108, the flow goes to step S4110, in which the policy checking/modifying unit 116 terminates the process for detecting permission that is set for a user or a role and is not used.

With the above described processes, a list of unused permissions, for example, depicted in Table 24 can be obtained.

TABLE 24

| ROLE | PERMISSION |
|---|---|
| R1 | p13 |
| R1 | p14 |
| ... | ... |
| Ri | ... |

TABLE 24-continued

| ROLE | PERMISSION |
|------|------------|
| Ri   | pij        |
| ...  | ...        |

The unused role detection process is already described in detail with reference to FIG. 20. Therefore, its explanation is omitted.

6. Method for Assisting the Detection of a Setting Error by Visualizing a Difference or a Temporal Change in the Access Right Settings of Organizations A method for displaying a ratio of access right setting information for each organization in information managed by each organization, and for detecting information expected to be a setting error or a suspicious setting is described below.

Figure 42:
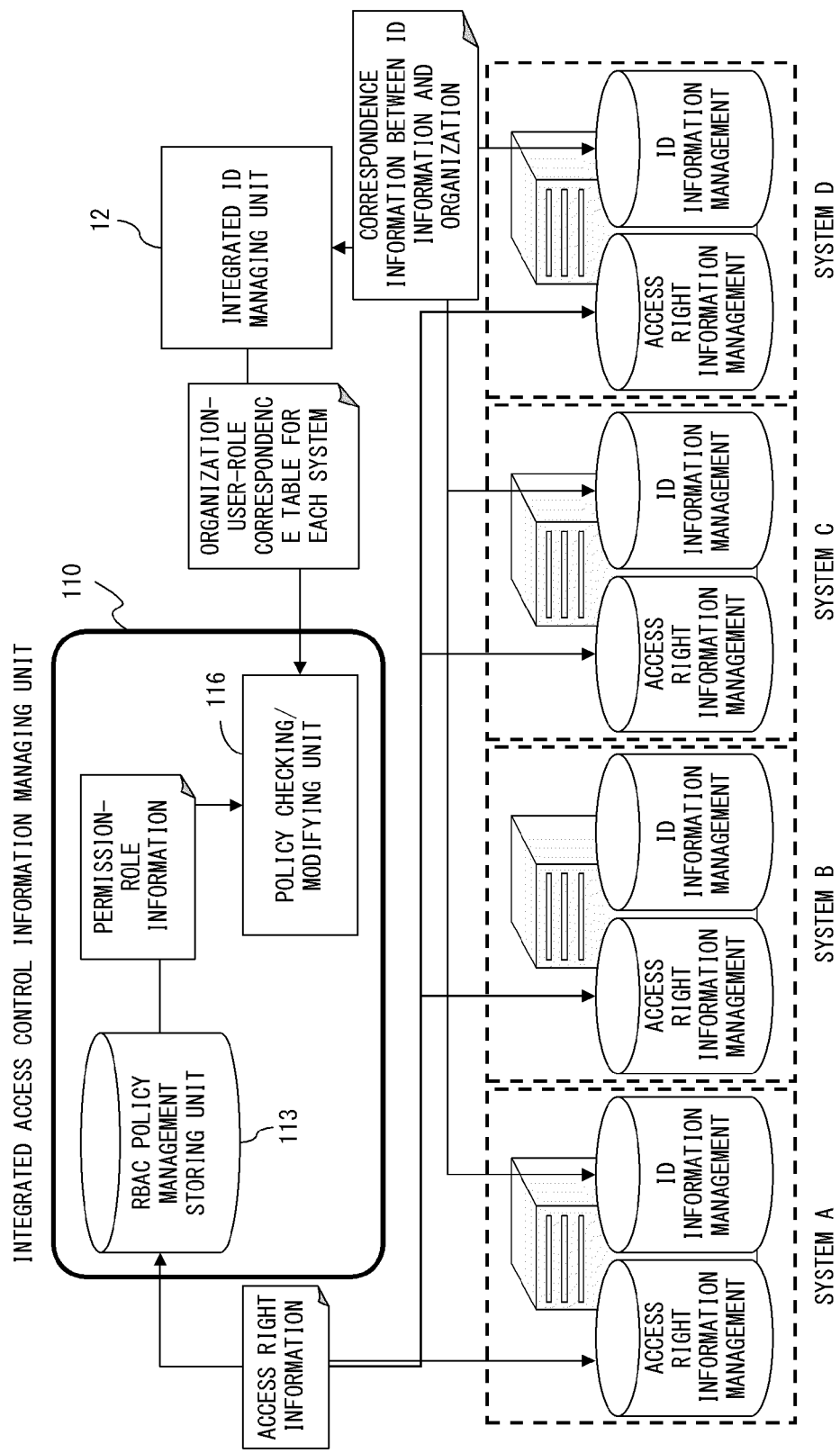
FIG. 42 is a block diagram depicting a configuration example for visualizing a difference or a change in access right settings of organizations in the embodiment.

FIG. 42 is a block diagram depicting a configuration example for implementing the visualization of a difference or a change in the access right settings of organizations. The policy checking/modifying unit 116 obtains the permission-role information, for example, depicted in Table 20 and an organization-user-role correspondence table, for example, depicted in Table 25 respectively from the RBAC policy storing unit 113 and the integrated ID managing unit 120, and calculates an access right setting ratio to be described later for each organization.

TABLE 25

| ORGANIZATION | USER | ROLE |
|--------------|------|------|
| DEPT A       | $U_{A1}$ | R1 |
| DEPT B       | $U_{A1}$ | R2 |
| ...          | ...  | ... |
| DEPT X       | $U_{Xi}$ | Rx |
| ...          | ...  | ... |

6.1 Calculation of an Access Right Setting Ratio for Each Organization

The policy checking/modifying unit 116 calculates an access right setting ratio for each organization from the access right setting information of a system managed by each organization. Then, the policy checking/modifying unit 116 displays the results of the calculation, and stores the results in the storage device, etc.

Assume that a set of users of an organization x is U(x) a set of permissions of a user u in a system A is PRM(A,u), a union of permissions possessed by users who belong to the organization x of the system A is PRM(A,x), a set of resources managed by the system A is R(A), and a set of actions for the resources managed by the system A is ACT (A). In this case, an access right setting ratio in the organization x of the system A can be defined with the following equation.

[math 1]

$$\text{AC Rate }(A, x) := \frac{|PRM(A, x)|}{|U(x)| \times 2^{R(A)ACT(A)}} \times 100(\%) \quad (1)$$

PRM(A,u) can be calculated from the permission-role information, for example, depicted in Table 20, and the organization-user-role correspondence table, for example, depicted in Table 25 in the system A. PRM (A,x) that is the union of permissions in the organization x can be calculated from PRM(A,u), and the organization-user-role correspondence table, for example, depicted in Table 25. For example, if the resources are only files, ACT(A) is {read,write}.

Here, PRM having three arguments are defined as follows if the ratio of a particular action is desired to be obtained. Namely, if a set of permissions for an action a1 within PRM (A,u) is defined to be PRM(A,u,a1), and a set of permission for an action a1 within the PRM(A,x) is defined to be PRM (A,x,a1), the access right setting ratio of the action a1 in the organization x of the system A can be defined with the following equation.

[math 2]

$$\text{AC Rate }(A, x, a1) := \frac{|PRM(A, x, a1)|}{|U(x)| \times 2^{R(A)}} \times 100(\%) \quad (2)$$

6.2 Periodical Recording of Calculation Results of an Access Right Setting Ratio for Each Organization To record an addition or a temporal change in access right settings, the policy checking/modifying unit 116 can periodically calculate the access right setting ratio ACRate for each organization, and can record the calculated ratio in the storage device, etc . . . At this time, the change may be displayed on the display device, and stored in the storage device, etc . . . Table 26 depicts an example of results of calculating ACRate for each system.

TABLE 26

|        | SYSTEM A | SYSTEM B | SYSTEM C | SYSTEM D | SYSTEM E |
|--------|----------|----------|----------|----------|----------|
| DEPT A | R: 70%<br>W: 70% | R: 35%<br>W: 20% | R: 1%<br>W: 1% | R: 3%<br>W: 1% | R: 80%<br>W: 10% |
| DEPT B | R: 40%<br>W: 15% | R: 70%<br>W: 70% | —        | —        | R: 80%<br>W: 5% |
| DEPT C | R: 50%<br>W: 20% | —        | R: 80%<br>W: 80% | —        | R: 80%<br>W: 3% |
| DEPT D | —        | —        | —        | R: 80%<br>W: 75% | R: 80%<br>W: 5% |

6.3 Detection and Alarm of a Significant Change in an Access Right Setting Ratio for Each Organization Additionally, the policy checking/modifying unit 116 may detect an organization, to which a significant change is made, from among temporal changes in access right setting ratio ACRate values for organizations, and may make a notification to urge the confirmation of whether or not an access right setting in an organization is proper.

Figure 43:
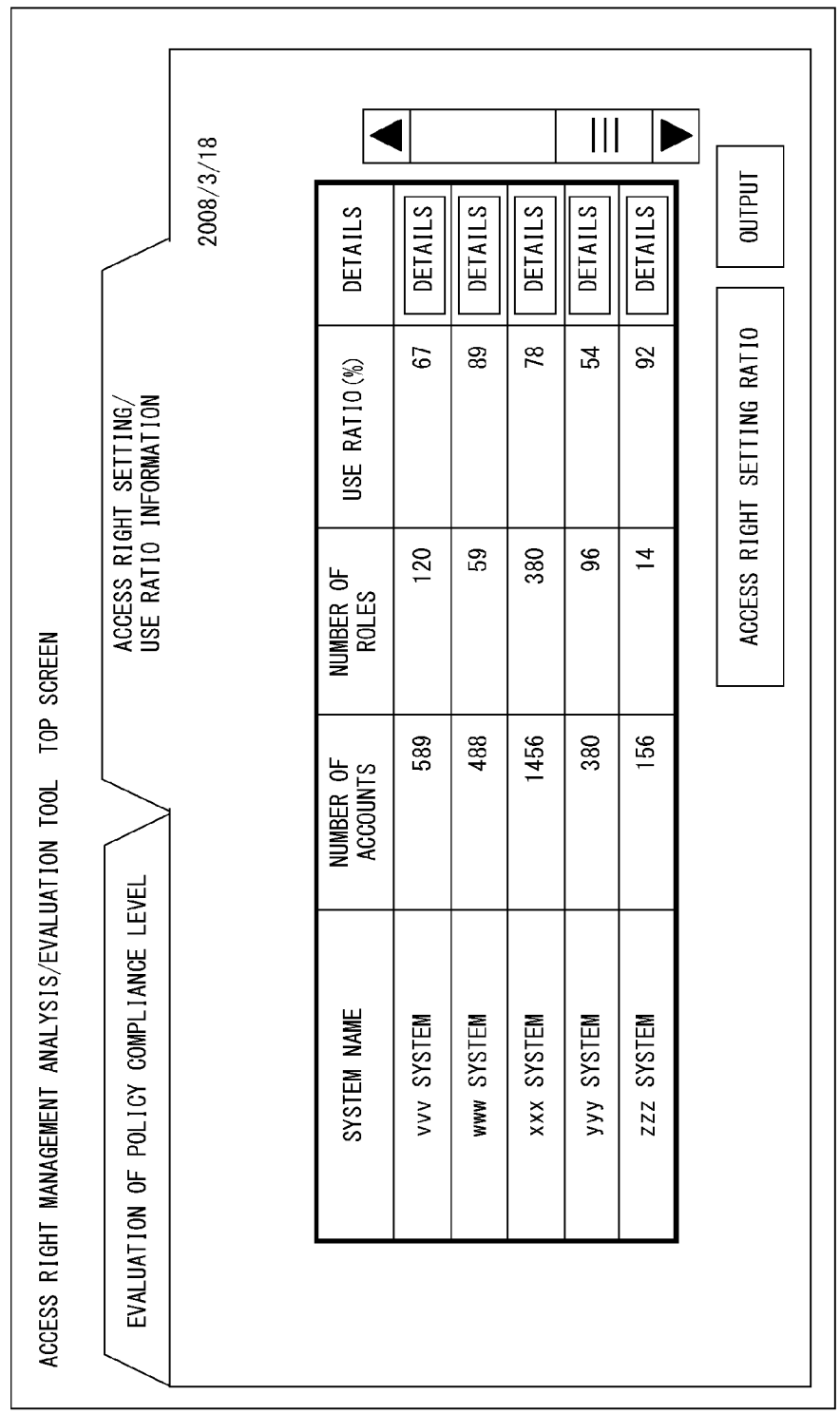
FIG. 43 is a schematic diagram depicting a configuration example of a screen for displaying results obtained by calculating the number of access right settings and a use ratio in each organization in each system.

FIG. 43 is a schematic diagram depicting a configuration example of a screen for displaying results of calculating the number of access right settings and the use ratio of each organization in each system. The use ratios depicted in FIG. 43 are the scale representing whether or not roles are used in the system. The use ratios can be calculated, for example, with the following equation.

use ratio=the number of log records accessed by a role recorded to an access log÷((the total number of access log records×the number of users of a role)÷ (the sum of the number of users of roles in a system))×100

At this time, it is desirable to use an access log having a suitable duration such as one day, one week, one month, three months, six months, etc. For example, the case where there are three roles Role A, Role B and Role C in the system, the number of users and that of access log records of each role, and the total number of users and that of access log records are those depicted in Table 27 is considered.

TABLE 27

|  | Role A | Role B | Role C | TOTAL |
|---|---|---|---|---|
| NUMBER OF USERS | 50 | 80 | 60 | 100 |
| NUMBER OF LOG RECORDS | 500 | 200 | 300 | 1000 |

In Table 27, users can redundantly belong to roles. Therefore, the number of users is not always the sum of the numbers of users of Role A, Role B and Role C.

At this time, the use ratio of Role A is obtained by 500÷((1000×50)÷(50+80+60))×100=190. The use ratios of Role B and Role C, which are calculated similarly, result in 47.5 and 95 respectively.

Figure 44:
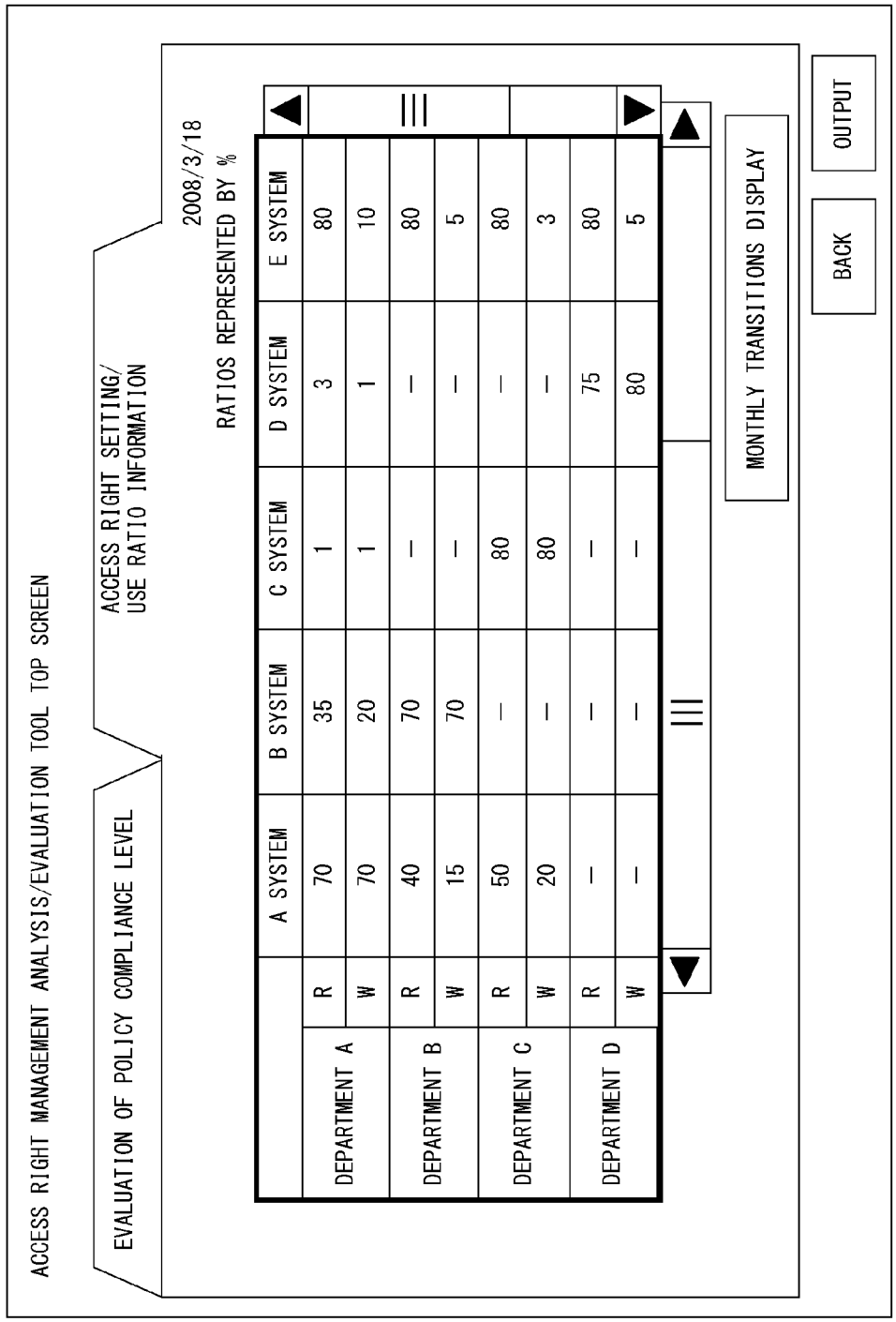
FIG. 44 is a schematic diagram depicting a configuration example of a screen for displaying an access right setting ratio of each organization in the embodiment.

FIG. 44 is a schematic diagram depicting an example of a screen for displaying access right setting ratios respectively for organizations in this embodiment.

ACRate may be calculated with the above described method by pressing the access right setting ratio button on the screen depicted in FIG. 43, and the access right setting ratio display screen for the organizations depicted in FIG. 44 may be displayed. Moreover, the average ratio transitions of access right settings of the systems depicted in FIG. 45 may be displayed with the press of the monthly transition display button on the screen depicted in FIG. 43. The average is an average of the access right ratios of departments using each system.

FIG. 46 is a schematic diagram depicting an example of a screen for displaying an access right setting/use ratio information for each system in this embodiment.

The access right setting/use ratio information display screen for each system depicted in FIG. 46 may be displayed with the click of the details button of each system on the access right setting/use ratio information display screen of each system depicted in FIG. 43. A role ratio depicted in FIG. 46 indicates the ratio of the number of roles to the number of accounts, and is obtained by the number of roles÷the number of accounts×100.

7. Method for Detecting a Matching or Similar Role and for Presenting a Modification Plan For role management, a scheme not to manage a redundant role is required in terms of management cost. Therefore, a method for detecting a matching or similar role and for presenting a modification plan to implement an optimum role setting from the current role setting (a relationship between a user and a role, and a relationship between a role and permission) information is described.

FIG. 47 is a block diagram depicting a configuration example for detecting a matching or similar role.

The policy checking/modifying unit 116 obtains the permission-role information, for example, depicted in Table 20 and the role-user correspondence table, for example, depicted in Table 21 respectively from the RBAC policy storing unit 113 and the integrated ID managing unit 120, calculates the degree of similarity to be described later, classifies calculation results into the six cases depicted in Table 3, and presents a modification plan of each of the cases.

7.1 Similarity Degree Calculation

The degree of similarity is calculated, for example, with a method for calculating a matching coefficient. In this embodiment, a user and permission are used as the attributes of a role, and a matching coefficient is calculated for each role. A matching coefficient for a user, and a matching coefficient for permission are hereinafter referred to as a user similarity degree usmc and a permission similarity degree psmc respectively.

Here, the user similarity degree can be defined with the following equation (3) if the number of users belonging to both of the roles R1 and R2, the number of users belonging to only R1, the number of users belonging to only R2, the number of users belonging to none of R1 and R2, and the number of all users are assumed to be a, b, c, d and n (n=a+b+c+d) respectively.

$$\text{user similarity degree usmc} = (a+d)/n \qquad (3)$$

Additionally, the permission similarity degree can be defined with the following equation (4) if the number of permissions assigned to both of the roles R1 and R2, the number of permissions assigned to only R1, the number of permissions assigned to only R2, the number of permissions assigned to none of R1 and R2, and the number of all permissions are assumed to be o, p, q, r and m (m=o+p+q+r) respectively.

$$\text{permission similarity degree psmc} = (o+p)/m \qquad (4)$$

By using the equations (3) and (4), for example, when a role and a user have the relationship depicted in Table 28, and a role and permission have the relationship depicted in Table 29, the similarity degrees (usmc, psmc) depicted in Table 30 can be calculated.

TABLE 28

| ROLE | taro | jiro | hanako | maeda | saito |
|---|---|---|---|---|---|
| R1 | 1 | 1 | 0 | 0 | 0 |
| R2 | 1 | 0 | 1 | 0 | 0 |
| R3 | 1 | 0 | 1 | 1 | 1 |
| R4 | 0 | 1 | 1 | 1 | 1 |

TABLE 29

| ROLE | p1 | p2 | p3 | p4 | p5 |
|---|---|---|---|---|---|
| R1 | 1 | 0 | 0 | 1 | 1 |
| R2 | 1 | 1 | 0 | 1 | 1 |
| R3 | 0 | 1 | 1 | 0 | 1 |
| R4 | 1 | 0 | 1 | 1 | 0 |

TABLE 30

|  | R1 | | R2 | | R3 | | R4 | |
|---|---|---|---|---|---|---|---|---|
| ROLE | $us_{mc}$ | $ps_{mc}$ | $us_{mc}$ | $ps_{mc}$ | $us_{mc}$ | $ps_{mc}$ | $us_{mc}$ | $ps_{mc}$ |
| R1 | — | — | | | | | | |
| R2 | 0.6 | 0.8 | — | — | | | | |
| R3 | 0.2 | 0.2 | 0.6 | 0.4 | — | — | | |
| R4 | 0.2 | 0.6 | 0.2 | 0.4 | 0.6 | 0.2 | — | — |

TABLE 31

| No | CASE | MODIFICATION PLAN |
|---|---|---|
| 1 | ONLY USERS OF ROLES MATCH | MUST BE MERGED INTO ROLE AFTER MERGING TWO PERMISSIONS. NOTE: USER ONLY IN EITHER ROLE CAN POSSIBLY CHANGE |

TABLE 31-continued

| No | CASE | MODIFICATION PLAN |
|---|---|---|
| 2 | ONLY USER SIMILARITY DEGREE OF ROLE IS HIGH | PRESENTS USER BELONGING TO ONLY ONE ROLE, AND PRESENTS THAT ROLES CAN BE MERGED BY DELETING THE USER OR BY MAKING THE USER BELONG TO THE OTHER ROLE (SAME AS CASE 1) |
| 3 | ONLY PERMISSIONS OF ROLES MATCH | PRESENTS ROLE OBTAINED BY MERGING TWO USER GROUPS. SUCH MERGING IS RECOMMENDED IF USER GROUPS BELONG TO SAME DEPARTMENT |
| 4 | ONLY PERMISSION SIMILARITY DEGREE OF ROLE IS HIGH | PRESENTS PERMISSION ASSIGNED ONLY TO ONE ROLE, AND NOTIFIES THAT ROLES OBTAINED BY MERGING USER GROUPS BY DELETING THE PERMISSION OR ASSIGNING THE PERMISSION TO THE OTHER ROLE (SAME AS CASE 3) |
| 5 | USERS AND PERMISSIONS OF ROLES MATCH | REDUNDANT ROLE . . . PRESENTS DELETION OF REDUNDANCY |
| 6 | USER SIMILARITY DEGREE AND PERMISSION SIMILARITY DEGREE OF ROLES ARE HIGH | PRESENTS FOLLOWING TWO ROLE CONFIGURATIONS (1) ROLE CONFIGURATION BASED ON USER. (SAME AS CASE 2) (2) ROLE CONFIGURATION BASED ON PERMISSION. (SAME AS CASE 4) |

Figure 48:
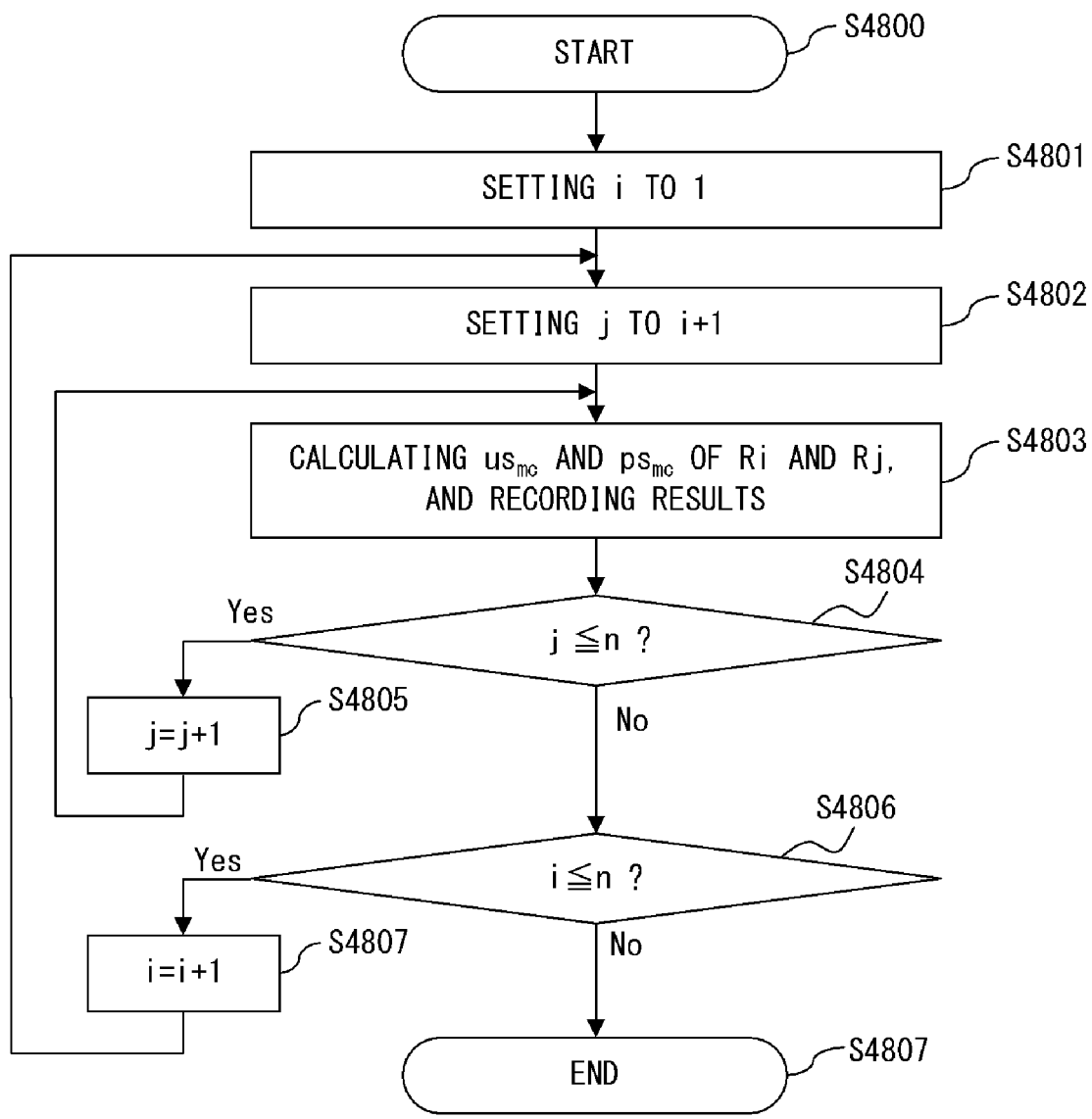
FIG. 48 is a flowchart depicting a specific process of a similarity degree calculation in the embodiment.

FIG. 48 is a flowchart depicting a specific process of the similarity degree calculation in this embodiment.

In step S4801, the policy checking/modifying unit 116 sets a count variable i to 1. Then, the flow goes to step S4802, in which the policy checking/modifying unit 116 sets a variable j to i+1.

In step S4803, the policy checking/modifying unit 116 calculates the user similarity degree usmc and the permission similarity degree psmc for Ri and Rj in accordance with the definitions represented by the equations (3) and (4). Then, the policy checking/modifying unit 116 stores the results of the calculation in the storage device, etc . . .

In step S4804, the policy checking/modifying unit 116 determines whether or not j is equal to or smaller than n. If j is equal to or smaller than n, the flow goes to step S4805, in which the policy checking/modifying unit 116 increments j by 1. Then, the flow goes back to step S4803.

In step S4806, the policy checking/modifying unit 116 determines whether or not i is equal to or smaller than n. If i is equal to or smaller than n, the flow goes to step S4807, in which the policy checking/modifying unit 116 increments i by 1. Then, the flow goes back to step S4802.

If i is larger than n in step S4806, the flow goes to step S4807, in which the policy checking/modifying unit 116 terminates the similarity degree calculation process.

There is a high possibility that a role to which a small number of users belongs or the use ratio of which is low is expected to be a wasteful role that does not exert a significant influence on a system in comparison with other roles. Therefore, filtered results satisfying conditions may be displayed by setting the number of users and a use ratio as the filtering conditions as depicted in FIG. 49. The similarity degree calculation may be made to a role having a small numerical value obtained with the filtering process when a role similarity degree calculation button is pressed.

Upon completion of the similarity degree calculation depicted in FIG. 48, the policy checking/modifying unit 116 outputs calculation results, for example, depicted in FIG. 50 to the display device, etc., which in turn displays the results. Moreover, with the press of a modification plan display button, the policy checking/modifying unit 116 references modification plan presentation rules for the similarity degree calculation results, for example, depicted in Table 31, and outputs the modification plans of case numbers, which correspond to the calculation results, to the display device, etc., which in turn displays the plans. FIG. 51 is a schematic diagram depicting a configuration example of a screen for displaying a role modification plan presentation.

Additionally, details of the modification plan of each role pair may be displayed with the press of the details button depicted in FIG. 51. FIG. 52 is a schematic diagram depicting a configuration example of a screen for displaying the details of role modification plans.

Figure 53:
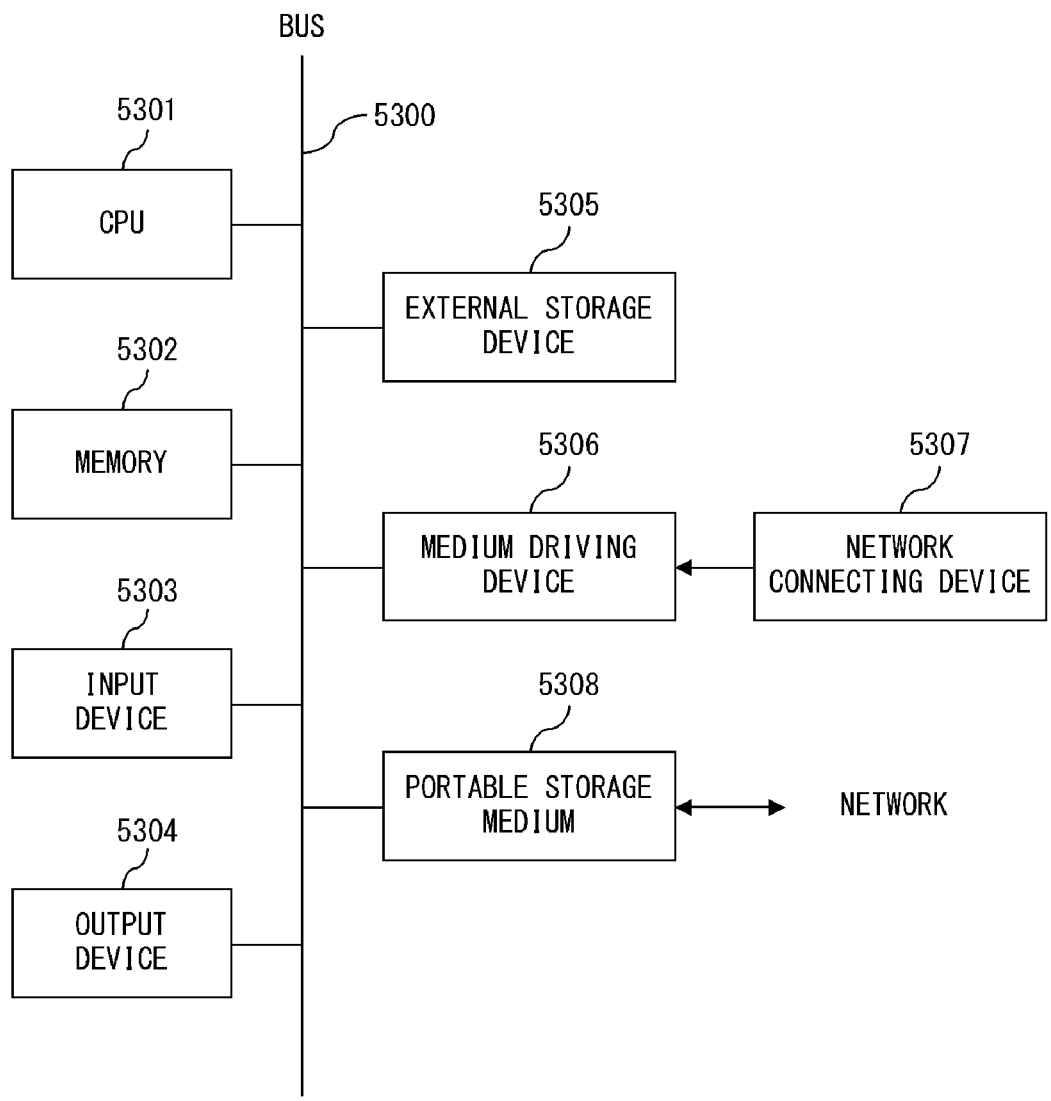
FIG. 53 is a block diagram depicting a specific configuration example of an integrated security managing system according to the embodiment.

FIG. 53 is a block diagram depicting a specific configuration example of the integrated security managing system 100 according to this embodiment.

The integrated security managing system 100 depicted in FIG. 53 comprises a CPU 5301 for executing a program for implementing the policy check/modification processes in this embodiment in addition to the execution of peripheral devices or various types of software, a volatile memory 5302 (such as a RAM) used to execute the program, an input device (such as a keyboard or a mouse) that is an external data input unit, an output device 5304 for displaying data, etc., an external storage device 5305 for storing a program for implementing the policy check/modification processes in this embodiment in addition to a program and data, which are required by the integrated security managing system 100 to operate, a medium driving device 5306 for outputting data of the memory 5302 or the external storage device 5305 to a portable storage medium 5307 (such as a floppy disk, an MO disk, a CD-R, a DVD-R, etc.) or for reading a program, data, etc. from the portable storage medium 5307, and a network connecting device 5308 for making a connection to another system, etc. via a network. These constituent elements are interconnected by a bus 5300, and can mutually transmit/receive data.

The program for implementing the policy check/modification processes in this embodiment may be stored not in the external storage device 5305 but on the portable storage medium 5307.

As described above, the integrated security managing system 100 according to this embodiment detects a rule violation in accordance with one or more policy check rules (such as the detection of an unsuitable user account described in 3.1, the detection of an unsuitable user-role assignment described in 3.2, the detection of an unsuitable permission-role assignment described in 3.3, the detection of an unnecessary role described in 3.4, and the detection of a duty segregation violation described in 3.5, and the like) for the access right setting information of resources comprised by a system to be controlled (such as the server system composed of the server A, B and C depicted in FIG. 1). As a result, access control policies can be checked in various aspects and comprehensively.

Additionally, a policy compliance level is calculated and displayed for all or each predetermined violation based on detection results, whereby check results can be easily and objectively grasped.

With the above described processes, access right management information that does not comply with a policy is detected as a violation, and a policy compliance level is calculated for all detected violations or for each particular violation. Then, the policy compliance level is output, for example, to a display device for all the violations or for each violation, and stored in a storage device as display data.

The above described processes enable a check for an access control policy to be made in various aspects and comprehensively, and implement an access control policy compliance check that enables check results to be easily and objectively grasped.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable non-transitory medium storing a program that causes a processor to execute a control of an information processing device to execute a procedure, the procedure comprising:

obtaining access right management information from an access right management information storing unit for storing the access right management information that collectively or partially restricts an access to an arbitrary resource;

obtaining a policy from a policy storing unit for storing the policy set for the resource or the access to the resource, for checking whether the access right management information complies with the policy, and for detecting access right management information, which does not comply with the policy, as a violation;

calculating a risk score for evaluating a degree of risk of the violations detected by the process of detecting the access right management information, the violations are detected when user information included in the access right management information corresponds to any of an unused user account, an account of an unidentifiable user, and an account that is to be deleted but remains, when a role assignment included in the access right management information corresponds to any of an unused role assignment, and a role assignment violating a rule that prohibits a role assignment, when a permission assignment included in the access right management information corresponds to any of an unused permission assignment, and a permission assignment violating a rule that prohibits a permission assignment, when a role included in the access right management information corresponds to any of an unused role, a role violating a rule that prohibits a role-to-user assignment, and a role violating a rule that prohibits a permission-to-role assignment, and when any one of a role assignment violating a rule that prohibits a role-to-user assignment, permission violating a rule that prohibits a permission-to-role assignment, and permission violating a rule that prohibits a permission-to-user assignment exists, and calculating a compliance level which represents a degree in which the policy was complied with from the calculated risk score by calculating the sum of the degree of risk of the violations; and outputting a result of the calculating the compliance level.

2. The computer-readable non-transitory medium according to claim 1, wherein
the detecting the access right management information includes checking whether the access right management information complies with a policy, which is set for a resource comprised by a server or for a predetermined resource, for each server or for each predetermined resource.

3. The computer-readable non-transitory medium according to claim 2, wherein
the calculating the compliance level includes calculating a risk score for each server or for each predetermined resource, and calculating the level of compliance with the policy from a result of the calculation.

4. The computer-readable non-transitory medium according to claim 1, wherein
the policy is detected to be violated when user information included in the access right management information corresponds to any of an unused user account, an account of an unidentifiable user, and an account that must be deleted but remains.

5. The computer-readable non-transitory medium according to claim 1, wherein
the policy is detected to be violated when a role assignment included in the access right management information corresponds to any of an unused role assignment, and a role assignment violating a predetermined role assignment prohibition rule.

6. The computer-readable non-transitory medium according to claim 1, wherein
the policy is detected to be violated when a permission assignment included in the access right management information corresponds to any of an unused permission assignment, and a permission assignment violating a predetermined permission assignment prohibition rule.

7. The computer-readable non-transitory medium according to claim 1, wherein
the policy is detected to be violated when a role included in the access right management information corresponds to any of an unused role, a role violating a predetermined role-to-user assignment prohibition rule, and a role violating a predetermined permission-to-role assignment prohibition rule.

8. The computer-readable non-transitory medium according to claim 7, wherein
the role has a hierarchical structure.

9. The computer-readable non-transitory medium according to claim 1, wherein
the policy is detected to be violated when any one of a role assignment violating a role-to-user assignment prohibition rule, permission violating a permission-to-role assignment prohibition rule, and permission violating a permission-to-user assignment prohibition rule exists.

10. An information processing device comprising:

an integrated circuit;

an access right management information obtaining unit to obtain access right management information from an access right management information storing unit for storing the access right management information that collectively or partially restricts an access to an arbitrary resource;

a violation detecting unit to obtain a policy from a policy storing unit for storing the policy set for the resource or the access to the resource, to check whether the access right management information complies with the policy, and to detect access right management information that does not comply with the policy as a violation;

a policy compliance level calculating unit to calculate a risk score for evaluating a degree of risk of the violations detected by the violation detection unit, the violations are detected when user information included in the access right management information corresponds to any of an unused user account, an account of an unidentifiable user, and an account that is to be deleted but remains, when a role assignment included in the access right management information corresponds to any of an unused role assignment, and a role assignment violating a rule that prohibits a role assignment, when a permission assignment included in the access right management information corresponds to any of an unused permission assignment, and a permission assignment violating a rule that prohibits a permission assignment, when a role included in the access right management information corresponds to any of an unused role, a role violating a rule that prohibits a role-to-user assignment, and a role violating a rule that prohibits a permission-to-role assignment, and when any one of a role assignment violating a rule that prohibits a role-to-user assignment, permission violating a rule that prohibits a permission-to-role assignment, and permission violating a rule that prohibits a permission-to-user assignment exists, and to calculate a compliance level which represents a degree in which the policy was complied with from the calculated risk score by calculating the sum of the degree of risk of the violations; and a result outputting unit to output a result of calculating the compliance level calculated by the policy compliance level calculating unit.

\* \* \* \* \*